(12) United States Patent
Müller

(10) Patent No.: US 7,503,583 B2
(45) Date of Patent: Mar. 17, 2009

(54) AIRBAG DEVICE AND TRIGGERING PROCESS THEREFORE

(75) Inventor: Olaf Müller, Rüsselsheim (DE)

(73) Assignee: Inova GmbH, Russelsheim (DE)

( * ) Notice: Subject to any disclaimer, the term of this patent is extended or adjusted under 35 U.S.C. 154(b) by 420 days.

(21) Appl. No.: 10/860,806

(22) Filed: Jun. 3, 2004

(65) Prior Publication Data

US 2005/0017485 A1    Jan. 27, 2005

Related U.S. Application Data

(63) Continuation-in-part of application No. PCT/DE02/04097, filed on Nov. 5, 2002.

(30) Foreign Application Priority Data

| Dec. 3, 2001 | (DE) | ............................. 201 19 506 U |
| Mar. 5, 2002 | (DE) | ............................. 202 03 496 U |
| Jun. 11, 2002 | (DE) | ............................. 202 09 047 U |

(51) Int. Cl.
*B60R 21/016* (2006.01)
(52) U.S. Cl. .................. 280/743.1; 280/728.3; 280/742
(58) Field of Classification Search .............. 280/728.3, 280/729, 743.1, 742, 738
See application file for complete search history.

(56) References Cited

U.S. PATENT DOCUMENTS

| 3,473,824 | A | * | 10/1969 | Carey et al. ................. 280/729 |
| 3,774,936 | A | * | 11/1973 | Barnett et al. ............ 280/730.1 |
| 3,801,127 | A | * | 4/1974 | Katter et al. ................. 280/738 |
| 3,883,154 | A | * | 5/1975 | McCullough ............... 280/735 |
| 4,536,008 | A | * | 8/1985 | Brown, Jr. ............... 280/730.1 |
| 4,773,673 | A | * | 9/1988 | Sakurai .................... 280/728.3 |
| 5,193,847 | A | * | 3/1993 | Nakayama ................. 280/738 |
| 5,542,695 | A | * | 8/1996 | Hanson ..................... 280/729 |
| 5,901,979 | A | * | 5/1999 | Schneider et al. ........... 280/738 |
| 6,053,527 | A | * | 4/2000 | Gans et al. ............... 280/728.3 |
| 6,250,668 | B1 | * | 6/2001 | Breed et al. .............. 280/730.2 |
| 6,260,877 | B1 | * | 7/2001 | Rasmussen, Sr. ........... 280/729 |
| 6,378,895 | B1 | * | 4/2002 | Brucker et al. ........... 280/730.2 |
| 6,402,190 | B1 | * | 6/2002 | Heudorfer et al. ........... 280/729 |
| 6,422,592 | B2 | * | 7/2002 | Reiter et al. ............. 280/728.3 |
| 6,428,041 | B1 | * | 8/2002 | Wohllebe et al. ............ 280/736 |
| 6,439,600 | B1 | * | 8/2002 | Adkisson .................... 280/733 |
| 6,508,486 | B1 | * | 1/2003 | Welch et al. ............. 280/730.2 |

(Continued)

FOREIGN PATENT DOCUMENTS

DE    296 06 709    9/1996

(Continued)

OTHER PUBLICATIONS

International Search Report of PCT/DE02/04097 filed Nov. 5, 2002.

*Primary Examiner*—Paul N. Dickson
*Assistant Examiner*—Timothy Wilhelm
(74) *Attorney, Agent, or Firm*—Martin Fleit; Paul D. Bianco; Fleit Gibbons Gutman Bongini & Bianco PL

(57) ABSTRACT

An airbag system including an airbag and gas generating device provided with deployment control devices that enable the airbag to be at least partially deployed before it is inflated with gas from the gas generating device, and to a method of deploying the airbag.

95 Claims, 58 Drawing Sheets

U.S. PATENT DOCUMENTS

| | | | |
|---|---|---|---|
| 6,536,799 B2 * | 3/2003 | Sinnhuber et al. | 280/735 |
| 6,554,316 B2 * | 4/2003 | Schneider et al. | 280/743.1 |
| 6,726,240 B2 * | 4/2004 | Riha | 280/728.3 |
| 6,830,262 B2 * | 12/2004 | Sonnenberg et al. | 280/730.2 |
| 6,832,776 B1 * | 12/2004 | Soderstrom | 280/730.1 |
| 6,848,714 B2 * | 2/2005 | Varcus | 280/743.1 |
| 6,857,655 B2 * | 2/2005 | Muller et al. | 280/728.3 |
| 7,066,488 B2 * | 6/2006 | Steinbruck et al. | 280/729 |
| 2001/0019204 A1 * | 9/2001 | Reiter et al. | 280/736 |
| 2001/0035634 A1 * | 11/2001 | Breed | 280/730.2 |
| 2002/0135162 A1 * | 9/2002 | Muller | 280/728.3 |
| 2003/0205886 A1 * | 11/2003 | Riha | 280/728.3 |

FOREIGN PATENT DOCUMENTS

| | | |
|---|---|---|
| DE | 197 26 878 | 10/1998 |
| DE | 197 33 896 | 2/1999 |
| DE | 198 58 690 | 6/2000 |
| DE | 100 25 417 | 11/2000 |
| DE | 100 13 759 | 1/2001 |
| DE | 201 02 990 | 7/2001 |
| DE | 201 06 598 | 9/2001 |
| DE | 201 06 599 | 9/2001 |
| EP | 1 101 665 | 5/2001 |
| EP | 1 059 210 | 10/2004 |
| EP | 1084052 | 5/2007 |
| JP | 03281460 A * | 12/1991 |
| WO | WO 99/61288 | 12/1999 |
| WO | WO 01/07297 | 2/2001 |
| WO | WO 01/10684 | 2/2001 |
| WO | WO 01/14172 | 3/2001 |
| WO | WO 01/76918 | 10/2001 |
| WO | WO 01/81126 | 11/2001 |

\* cited by examiner

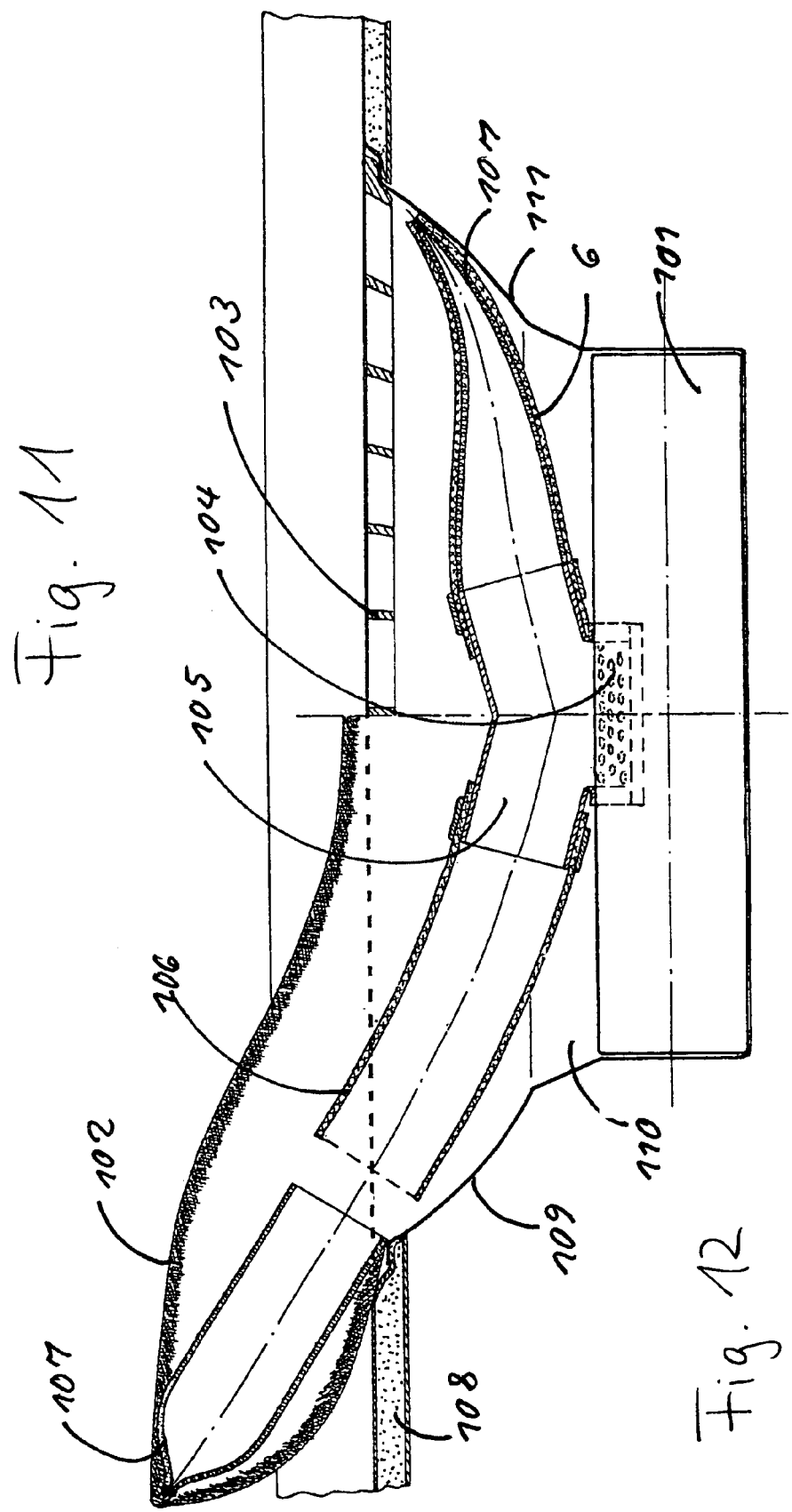

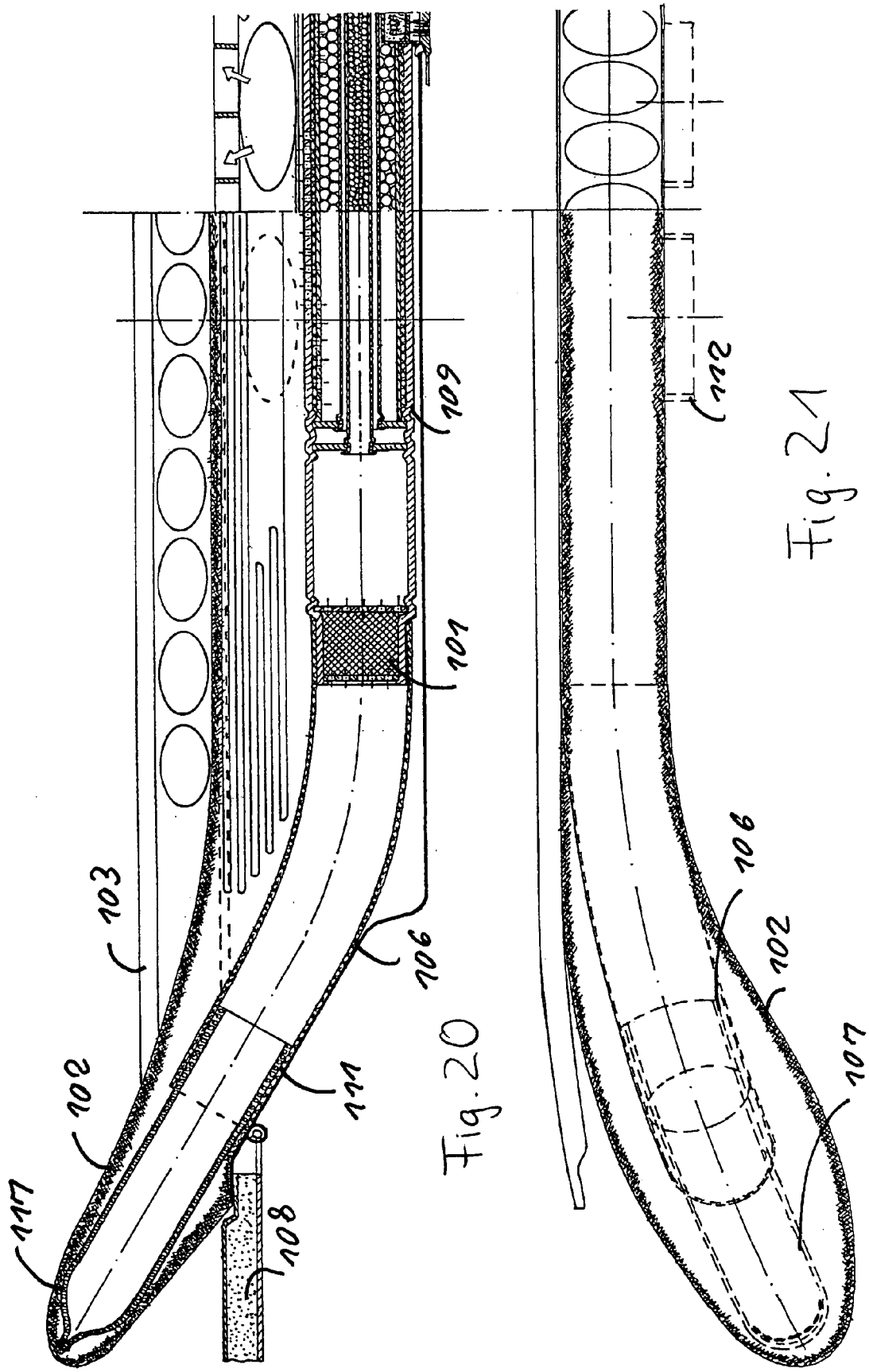

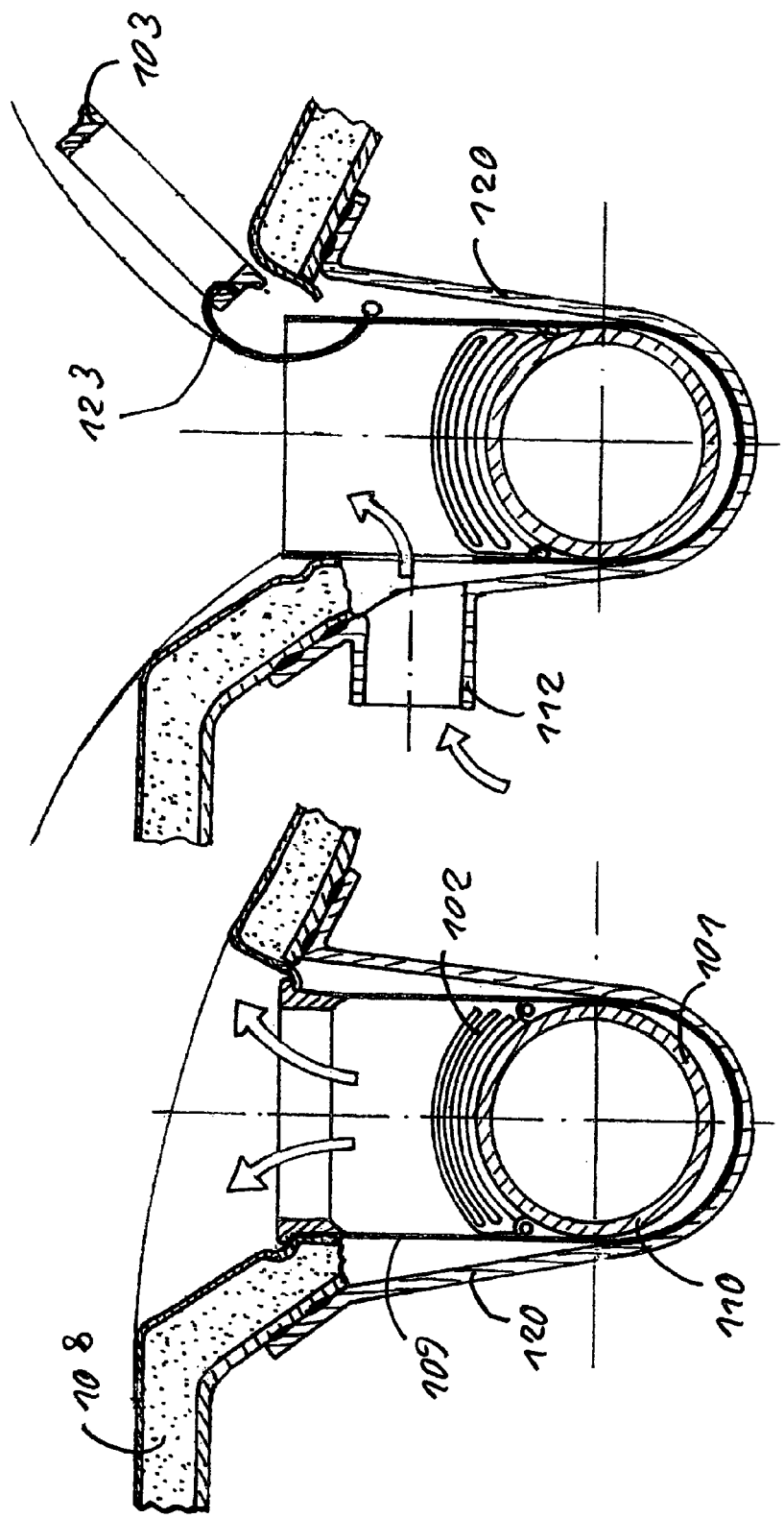

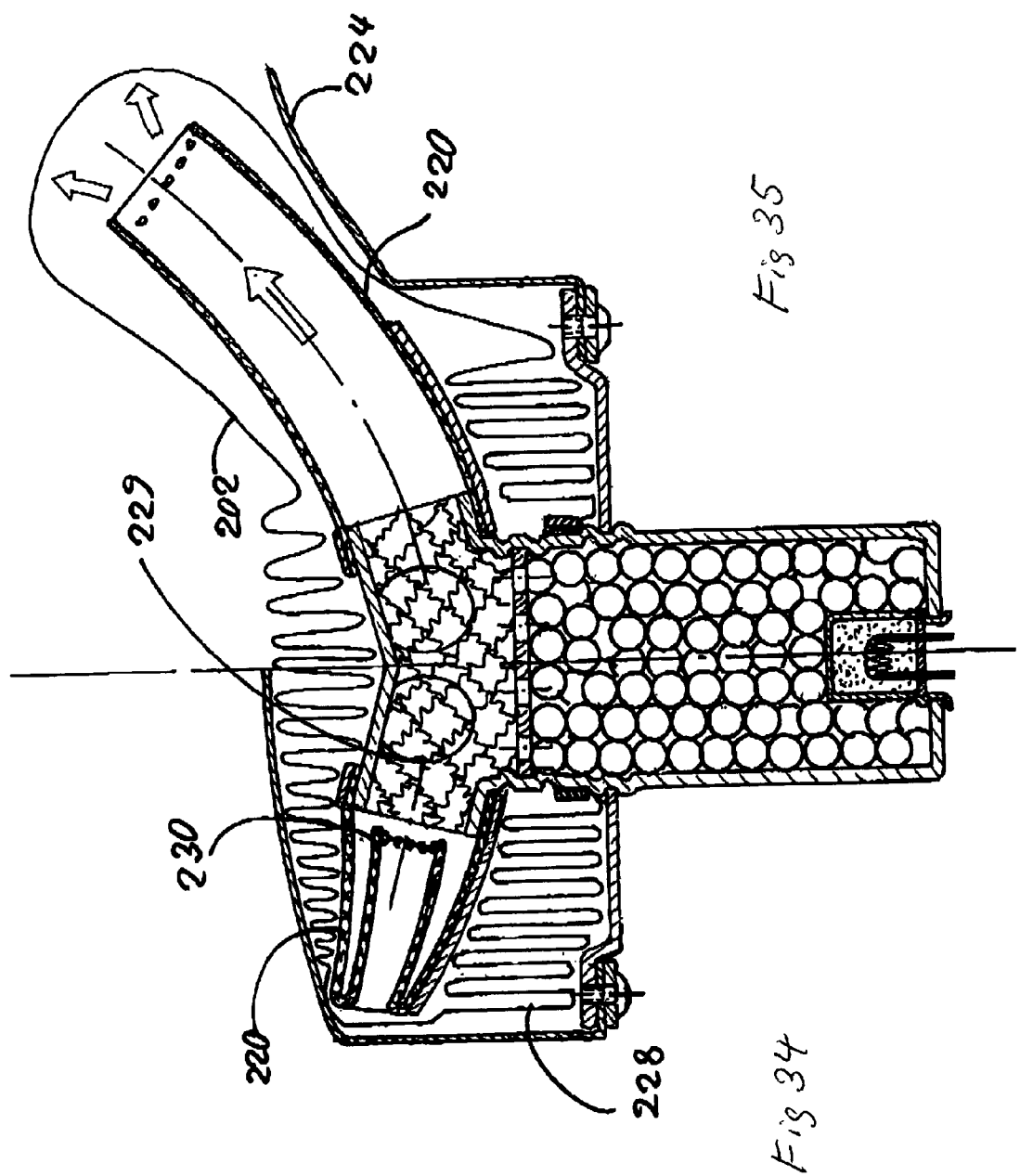

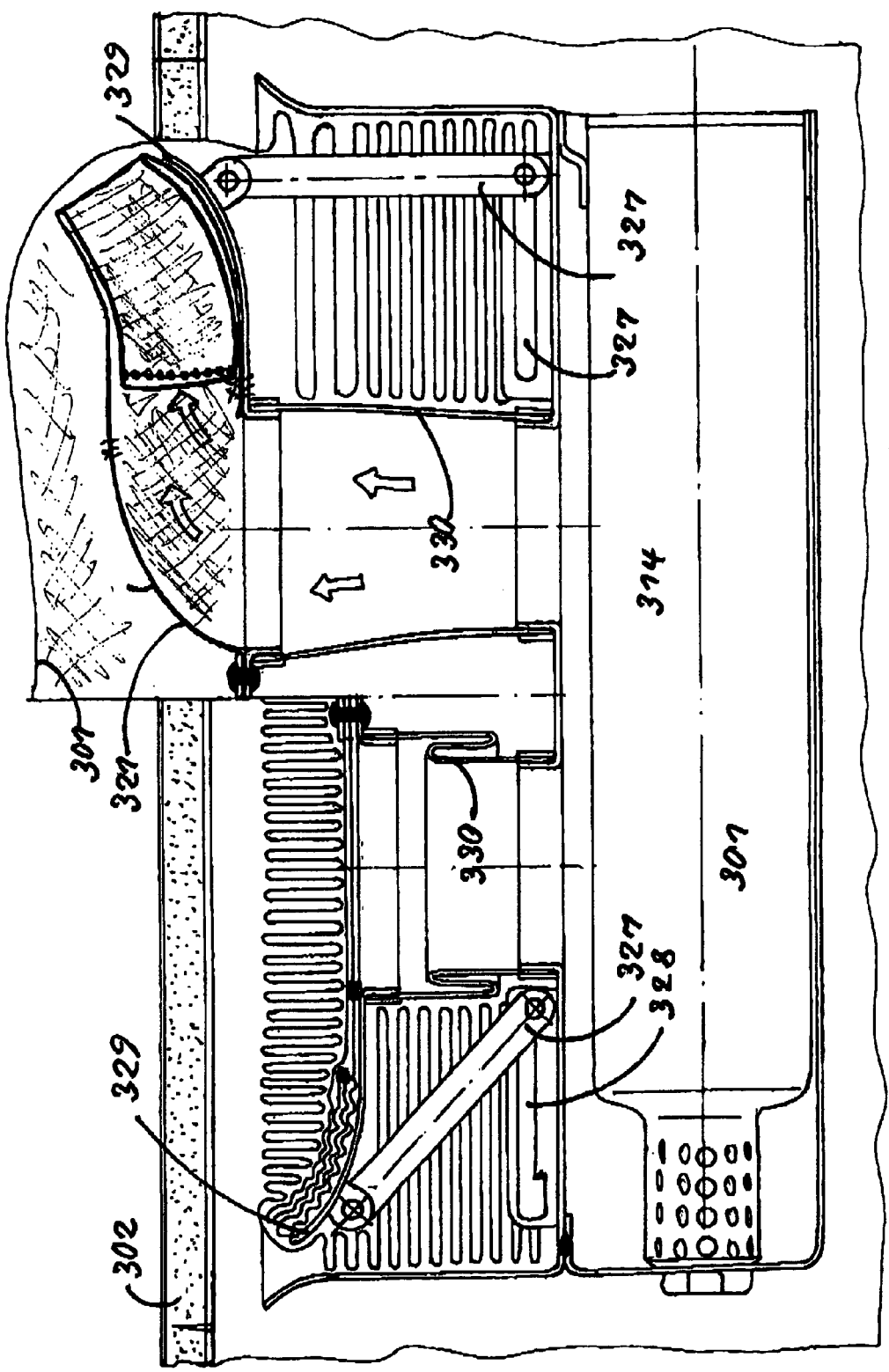

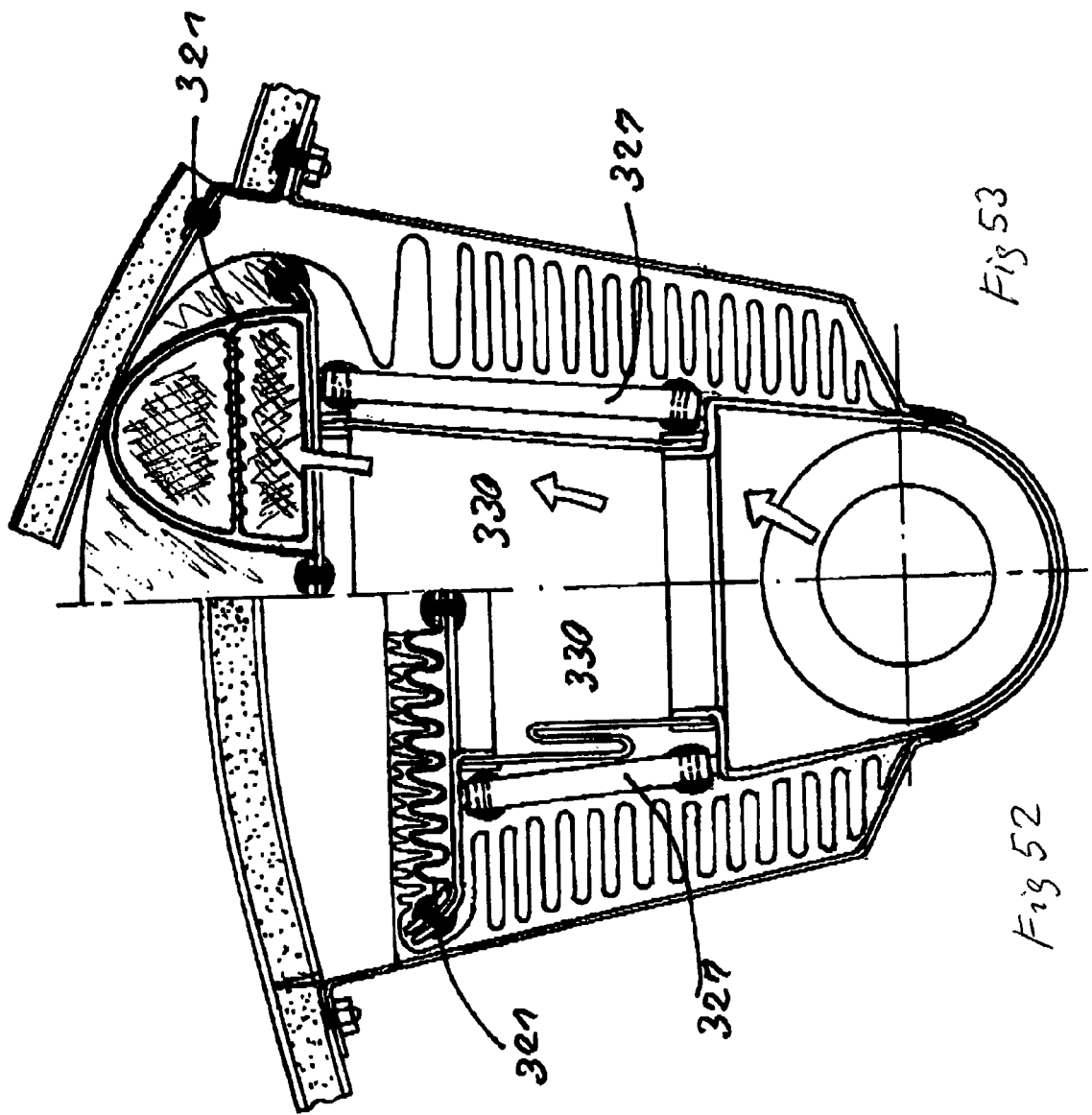

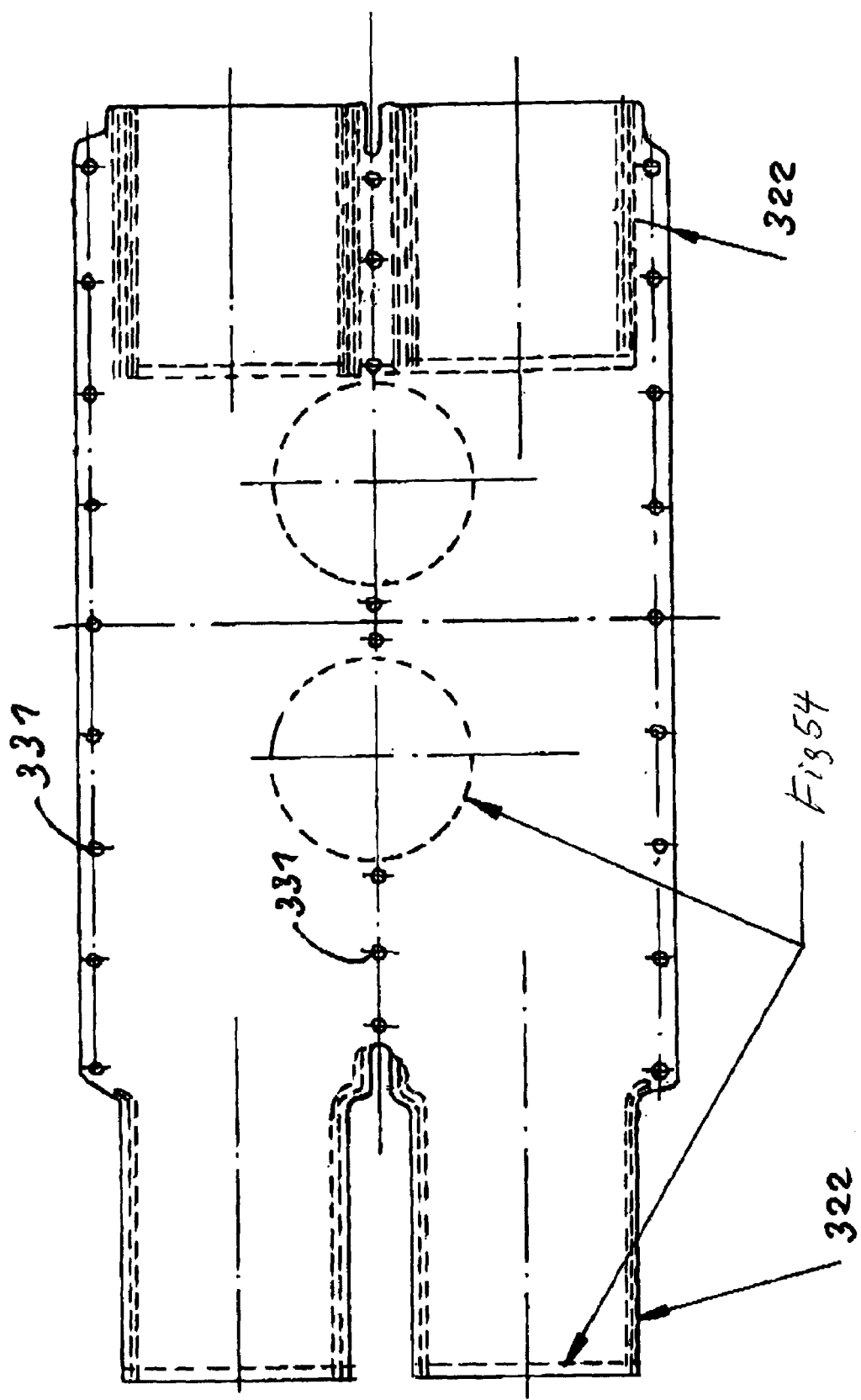

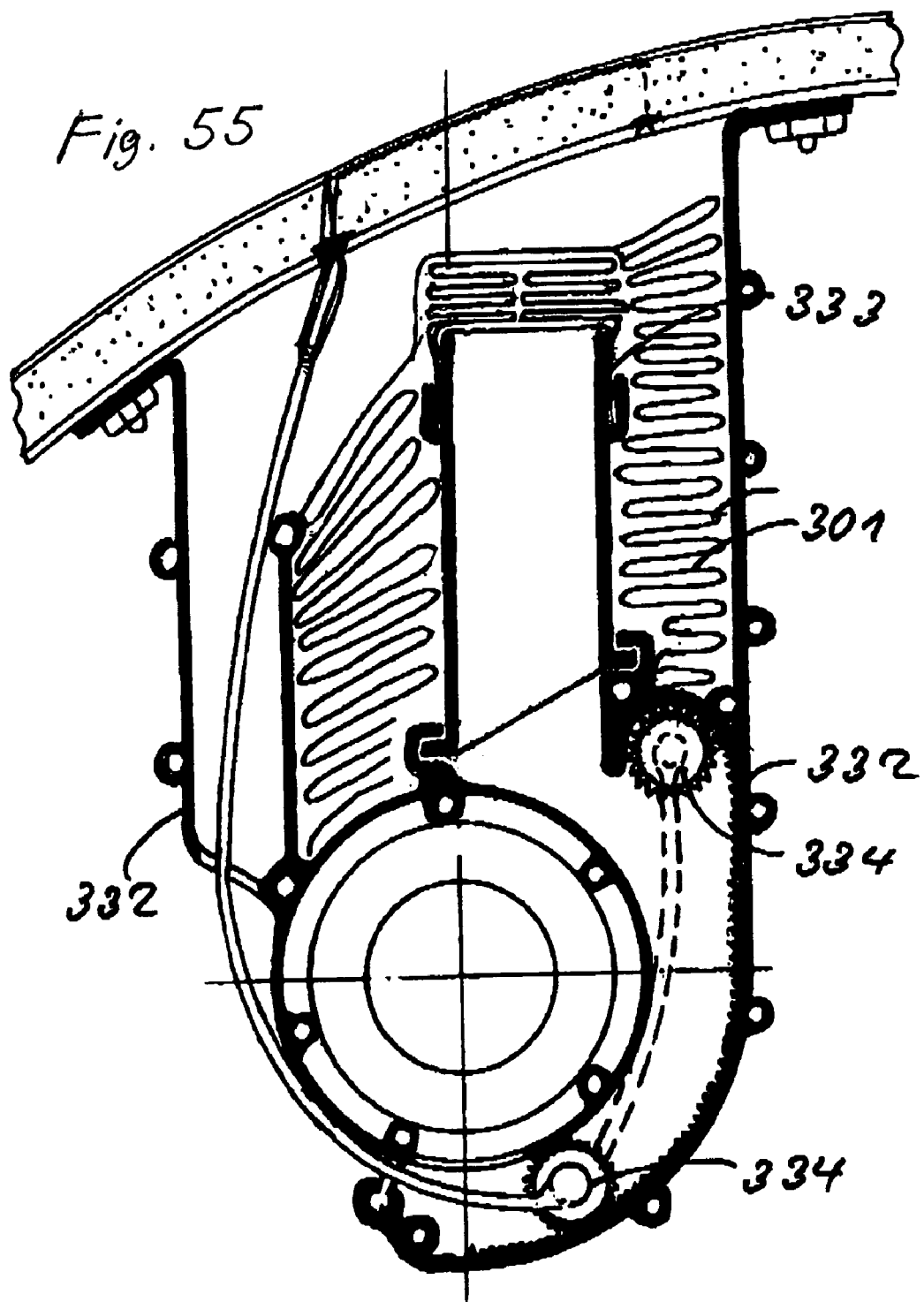

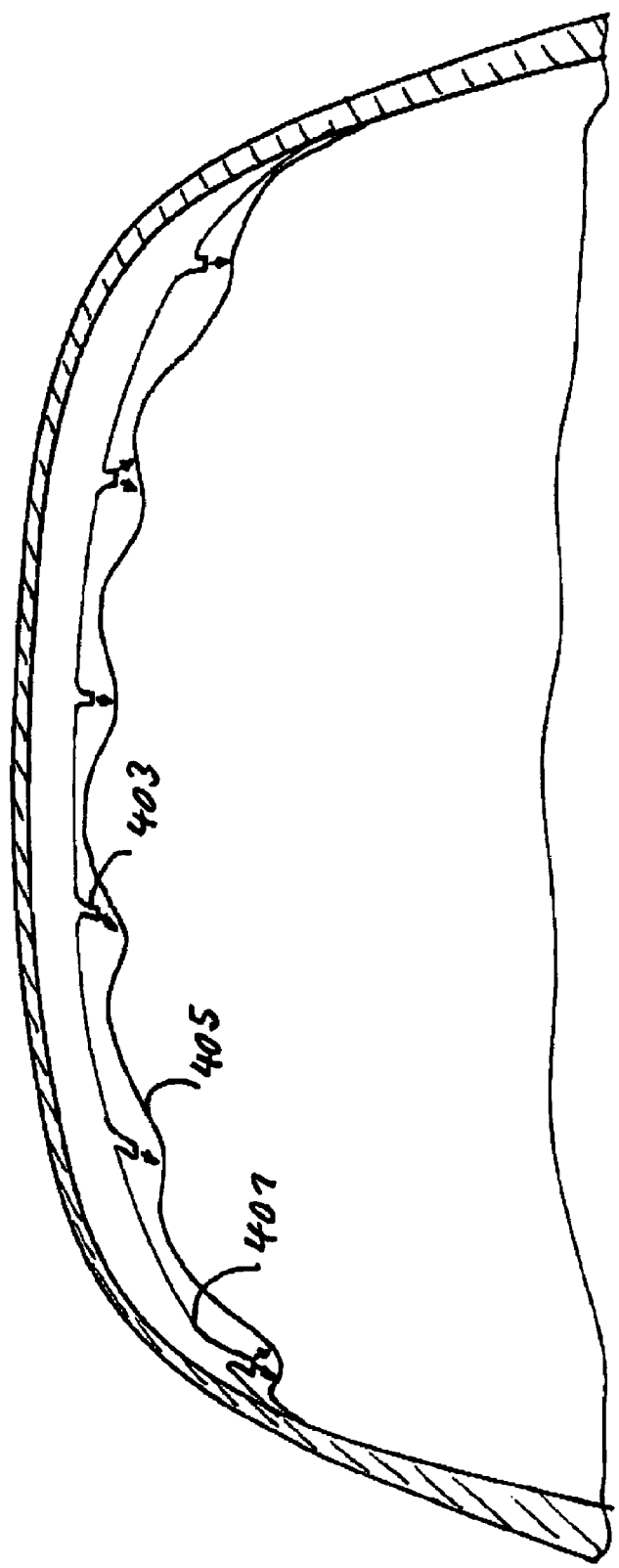

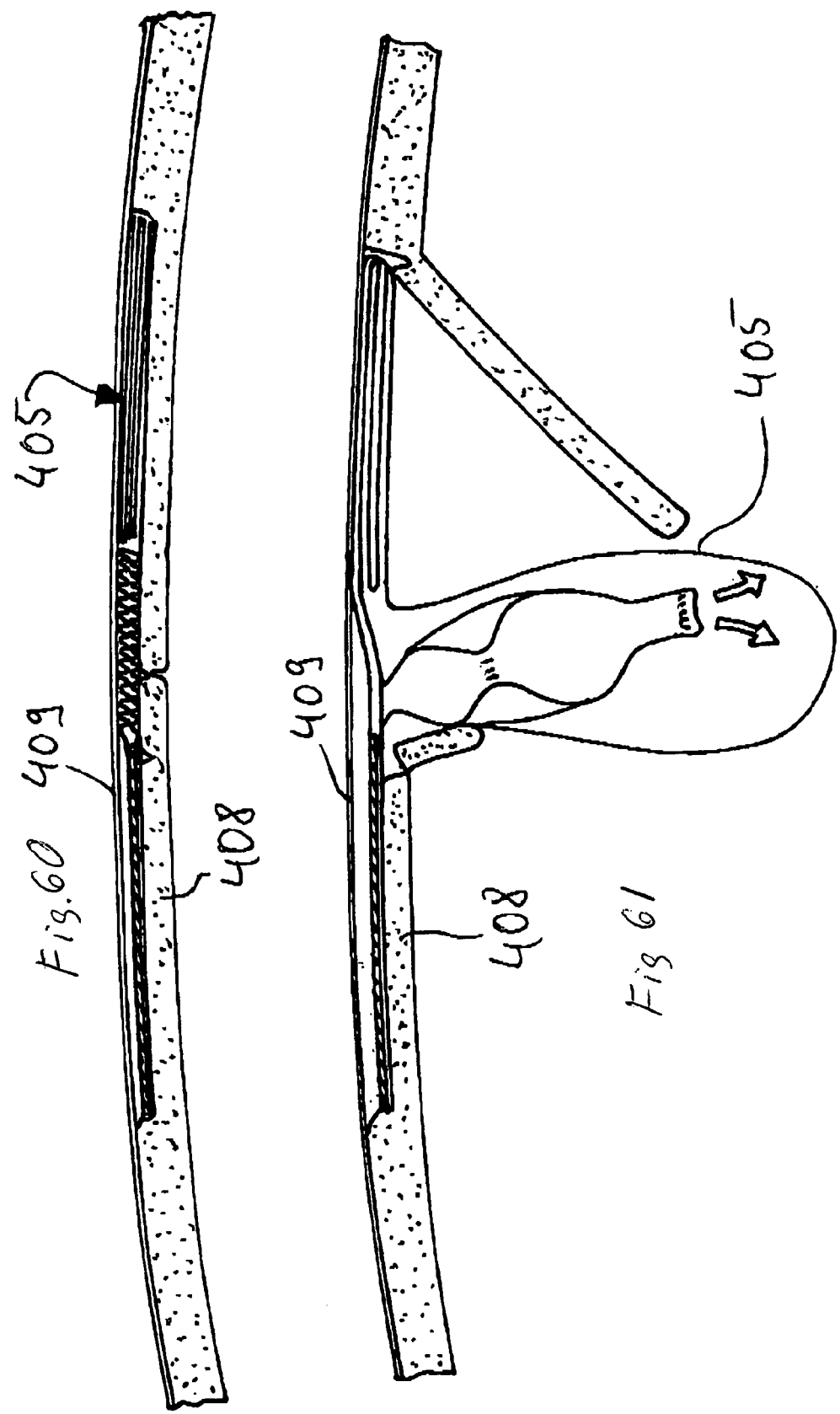

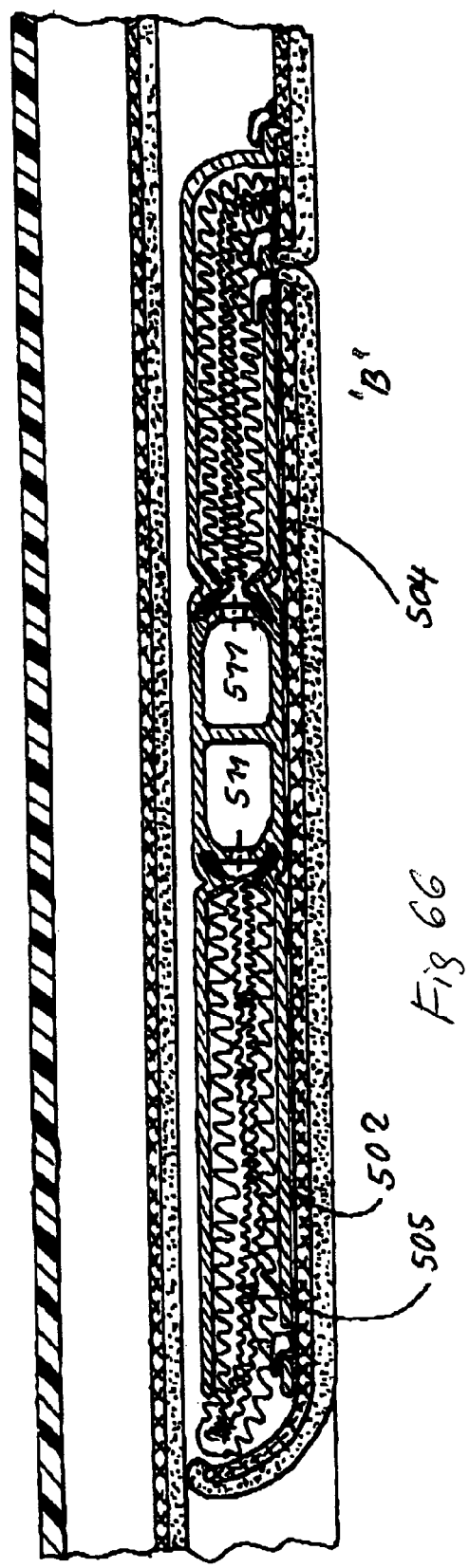

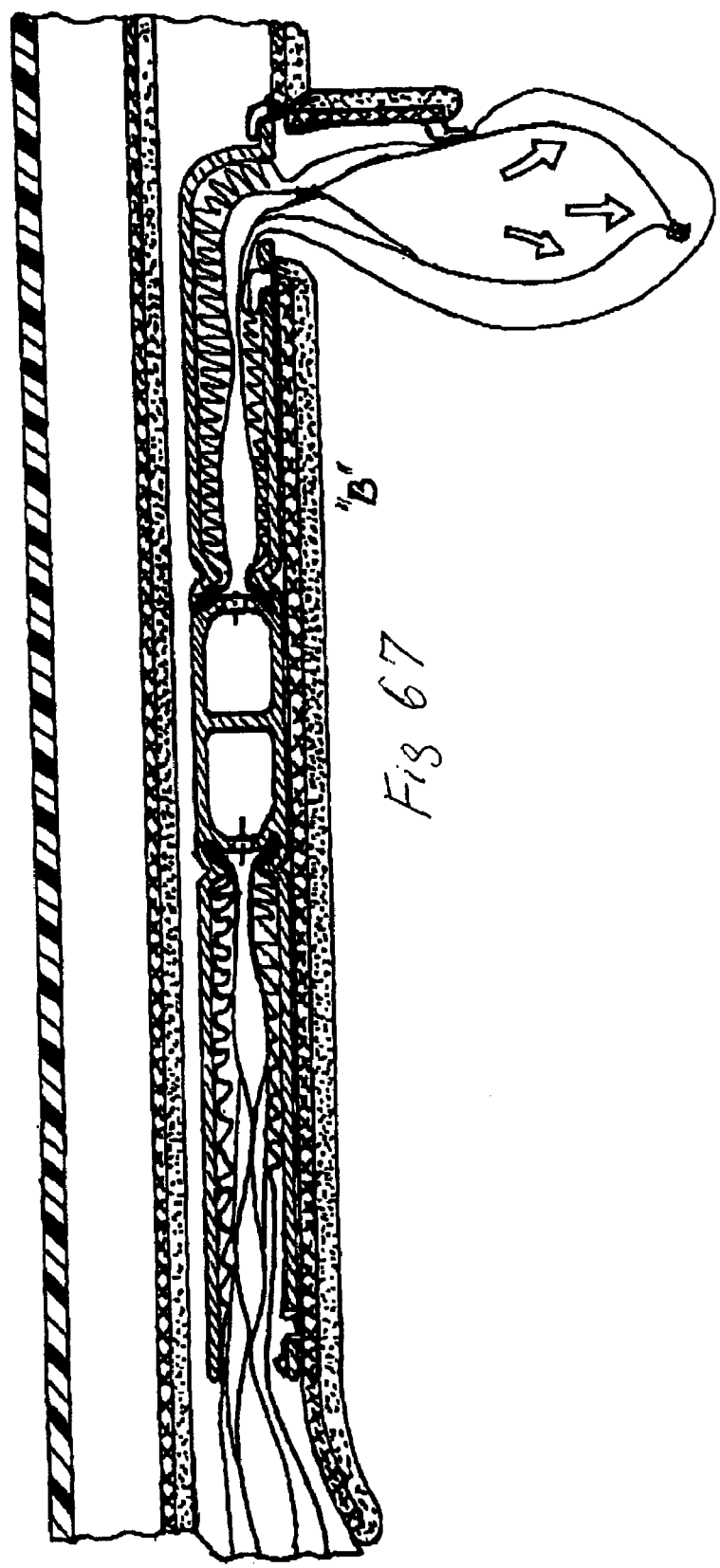

ND TRIGGERING
AIRBAG DEVICE AND TRIGGERING PROCESS THEREFORE

RELATED APPLICATION

This application is a continuation-in-part of International Application No. PCT/DE02/04097 filed Nov. 5, 2002, the contents of which are here incorporated in their entirety; applicant claims the benefit of 35 USC 120.

BACKGROUND OF THE INVENTION

1. Field of the Invention

The invention relates in general to an airbag device and its triggering process.

2. Prior Art

The former patent applications from the same inventor (German applications 197 12 782.7, 197 26 878.1, 197 33 896.8, 100 13 759.8, 100 25 417.9, European patent applications 98 105 551.0, 99 936 335.1, 00 112 432.0 and 00 125 150.3, international patent applications PCT/DE 99/01564, PCT/DE 00/02625, PCT/DE 00/02892, PCT/DE 00/02391, PCT/DE 01/01379, PCT/DE 01/01594 as well as the German utility model applications 298 09554.8, 298 19165.2, 298 20722.2, 299 0500.9, 299 05919.7, 299 08946.0, 299 10059.6, 299 13628.0 200 11391.7, 200 12707.1, 200 16554.2, 201 02990.6 and 201 09976.4) in general deal with an airbag device as well as with its layout, triggering method and the airbag guide, and in connection with "active" to open airbag lids and their central mechanism. The complete disclosure of these earlier applications is included in the present invention.

Today's airbags protect people during an accident when the distance between the person and the airbag outlet is appropriate. Within 40 milliseconds the gas floats into the airbag. Measured on the outlet of the gas generator chamber at an opening of 20 cm$^2$ the speed of the gas is 280 km/h and the pressure can be 60 bars when something stops the gas flow. This energy is like bullet and kills people when they are not belted and as a result are too close to the airbag outlet.

To fulfill the US Law FMVSS 208 starting September 2000.

1. all airbags fire in 2 stages
2. airbag outlet is on top of the instrument panel
3. load detection mats which can tell if the passenger is heavy, light or if it is a child seat, are used
4. in development is a video detection of the movement of the occupants; and
5. seat belt or no seat belt detection.

All these measures are necessary as a "state of the art" to switch off the bag, or fire only one stage of the cartridge when a child seat is in use or a child is the seated passenger. This amounts in addition costs up to $200 and leaves many problems unsolved.

A better solution would be to let the airbag deploy with an alternative in the law: With LOW RISK DEPLOYMENT.

If an airbag can not be fully deploy as designed because an OOP (out of position) occupant does not let it deploy, the pressure can rise up to 40 bars and 7500 Newton power. This situation will kill the occupant.

Patent applications exist like the German utility model 201 09976.4, where the central gas flow is moved by 90° tangentially to the side.

The following invention achieves a further improvement.

One object of the invention is to set up a system and its function for a simple fool proof and low cost mechanism to reduce the aggressiveness of the airbag at its outlet, to eliminate severe injuries to the occupants.

To achieve this object the invention creates an airbag module and defolding mechanism perpendicular to current defolding. We call it "Active Defolding"

The advantage of this active defolding is to achieve a larger deployment base and pass by the occupant in the beginning when the bag defolding is aggressive.

Furthermore the mechanism includes the opening of the lids first, and directs the airbag deployment into a non aggressive direction.

The airbag gas has a very low weight, and it usually has a speed of 280 km/h passing a hole of 20 cm$^2$ size. Based on the physical law mass divided by two times velocity squared, it will move the airbag about 10% to the side. This is used today as state of the art.

The present invention preliminarily uses the pressure of the gas. When for example "stopping" the gas on its through pass of 20 cm$^2$ up to 50 bars more can be achieved for a moment without influencing the gas flow to the bag considerably.

With appropriate technical measures a power of 20 cm$^2$×50 bars can be achieved. The law is pressure times area. This is approximately 500 times more power for a tailored transverse defolding than today's airbags use with just the gas flow.

To obtain the pressure, the gas will be caught for a little moment inside of tubes, hoses or guide bags. These elements open lids and direct, with their power, the defolding of the final bag to a tailored direction. After 1 or 2 milliseconds the pressure will exceed a predetermined level such that the tubes will open, the hoses will crack, or the sewing of the guide bags will opened on their ends and the gas will continue its flow into the bubbles of the final airbag on the sides of the OOP-occupant. These mechanical aids will move the gas outlet to new less aggressive locations or at least divide the center gas outlet into multiple gas outlets.

Furthermore the airbag may be packaged underneath defroster grids, loudspeaker covers, moldings and other existing covers. The tubes and hoses as well will be able to move the airbag from these locations to the "protection" location in a turn. As a result the airbag layout can be achieved in such a manner that the instrument panel shell will not be damaged. After the crash the airbag module and the molding will have to be replaced only.

As a result up to 2 insurance classes can be saved in some countries like Germany.

SUMMARY OF THE INVENTION

The present invention as well can be used in connection with the "Active Door" from earlier inventions from the same inventor. "Active Door" means that the airbag lids are pulled into the module in the time before the airbag deploys out of its opening by pyrotechnical means like a piston, driven by the gas leaving the cartridge first.

The present invention focuses primarily to the pull of the airbag deployment tangential to the OOP-occupant by several mechanical means driven by the pressure of the airbag gas.

A further object is to change the ball deployment shape of the bag to a large flat starting area of the bag deploying "around" the OOP-occupant first.

Furthermore the invention shows alternative solutions for different airbag systems, not only passenger airbags (which is most critical).

One advantage of the invention is that the injuries resulting from airbag deployment are reduced because the invention optimizes the gas flow to both sides, respective to all sides, that with occupants which are to close to the airbag the airbag will deploy more to the opposite side.

Furthermore in connection with the "Active Door" (before the airbag deploys out of the chamber behind the trim cover the lids open) the aggressiveness is lowered such that a multi stage generator and load detection is not necessary anymore.

In a preferred embodiment the triggering and deployment mechanism for passenger bags is located below defroster grids.

As already stated, to fulfill the FMVSS 208 standard it is today's common practice to let the passenger bag deploy out of the instrument panel shell, to ensure the head can not be at OOP. Usually this location is close to the windshield root. For out glazing and stylistic reasons usually no visible cover is accepted. As a result, the instrument panel shell will be destroyed with the appropriate influence to the insurance rate.

The windshield defroster grids are very practical to house a wide largely spread airbag underneath.

The first closed hoses by corks are sewn outlets which when pressurized push the grid upwards. Parallel the tubes or hoses pull the final airbag through the defroster slot and then leave their gas into the textile of the bag on top of the instrument panel. No pressure will be in the module or underneath the instrument panel shell. The shell will not be destroyed.

To improve the efficiency in some embodiments the tubes and hoses could be closed with a cork which will behave like a bullet respective a champagne cork and move the airbag fabric even further.

The present invention related to the airbag mechanism layout always assures that the final airbag will have a guide which most times opens the lids first, push the beginning of the deployment to several predetermined locations and then open the gas flow to multiple spots as well.

Usually the airbag is defolded rectangular tangential to the OOP occupant. Also the deployment usually starts away from the occupant. Only after the deployment has reached its predetermined base will the airbag defold towards the occupant but with a large non aggressive area.

The embodiment with the airbag underneath the defroster grid always requires the pull of the airbag fabric to the upper side of the instrument panel. There always the escape of the gas out of tubes or hoses has to be achieved. In this manner the instrument panel and the module are not pressurized and the instrument panel will stay intact. Measures are taken so that tubes or hoses do not fall back underneath the surface of the instrument panel. Some embodiments show pistons moving the tubes into their predetermined locations.

In another embodiment tubes with links alternatively made out of corrugated tubes as shown in the drawings are used. These tubes are tilted towards or above the surface of the instrument panel. In case of a head impact the tubes are moving back into the module. This only is necessary when OOP occupants are able to come to the airbag outlet.

Telescopic tubes are another embodiment to move the gas outlet and the power of the guide bags on top of the outside of the instrument panel surface.

In another embodiment a pin holds the guide bag respective the bullet in place as long as the telescope mechanism needs to move the gas distribution tubes to or above the instrument panel surface. This is necessary because the telescopic tubes have to be moved first to their predetermined upper location before the hoses unfold or the corks or bullets are able to move the fabric of the final airbag to the predetermined direction.

One shown embodiment is a travel control of a pin. It releases the guide bag, folded tubes etc. only after the telescopic gas distribution tubes have moved completely.

Another embodiment for the guide bag is a textile sewn with cells like an air mattress. The guide bag has several cells. The cells start to be blown up from the center. Cell after cell is blown up and its sewing cracks after exceeding a predetermined pressure level. Cell by cell guide bag moves forward until the last cell is opened and the gas can escape into the final bag. To let the mattress guide bag move rectangular around a corner the sewing has to be accordingly. The lower layer of the textile has to be shorter than the upper one or a third shorter layer has to be sewn on to the inner radius.

The mattress type guide bag is mounted to tubes, telescopic tubes in the center or more sideways in the module box as shown in the drawings.

A further preferred embodiment is the modular layout of the airbag modules. Usually a pressure channel is included to let the gas move to the guide respective more equipment inside the main airbag. Usually to the pressure channel or duct a telescopic unit is connected to move the guide bag or the like to the working place on or above the surface. Further a guide sheet metal might be included to let the guide bag slide to the surface and not to be able to get caught by the corners of the module housing.

Another embodiment is just tubes closed on their ends and folded on the bottom of the defroster channel. During deployment they become "round", tilt the defroster grid, and then their sewing on the ends will crack, the gas will escape outside the instrument panel shell into the final airbag or corks or bullets are shot against the textile of the final bag to move it sideways.

In normal use of the car, the air to defrost the windshield will bypass the airbag without resistance. Only during crash deployment of the bag the defroster grid will be lifted or tilted to let the airbag move through.

One major advantage of the system is that the guide bags, hoses or tubes pull the final airbag out of the slot with their movement and the gas pressure like a paper tissue out of its box. The slot can remain small, because only one layer of airbag fabric must move through simultaneously. In the middle of the slot, space is required for the guide bag, hose, tube and the like.

A further embodiment is based on the possibility that the airbag can be moved from a hole anyhow existing to the required protection area.

In a still further embodiment the airbag module and in the module the gas generator have the shape of the defroster channel to be able to achieve a tailored fit.

As an alternative, gas outlets on both sides of the pyrotechnical generator could be suitable for an airbag covering driver and passenger with one main airbag.

A further embodiment for the telescopic tubes is moving either straight or along a radius whatever the package and the dynamics require.

Another embodiment is to sew the guide bag completely around the generator with sewn-on tubes made out of this fabric. The tubes unfold during gas flow. They have to be stabilized in the longitudinal direction that they do not fold bag when the gas escape is open.

Another embodiment is two airbags per passenger. For the protection of the upper area the bag is located inside the windshield defroster channel. For the lower body, thorax and knees, just for softening of the most near corner of the instrument panel, the airbag might be located behind a molding which is moved away via "Active door" mechanism as a first step. Inside the lower airbag a guide airbag will eliminate the possibility that the gas will move the final bag directly and aggressive towards the passenger. Further, it might be equipped with multiple first folded "legs" respective hoses.

These hoses will be pressurized and defold the bag sideways during its start period. Then these hoses will crack and the gas will escape into the final bag. Tailoring of these hoses in length, diameter and sewing will tailor the deployment of the final bag.

Alternatively, the channels moving the gas to the airbag behind the molding are divided into two sections to each side (left and right). The divider is a simple valve. Pressurizing the valve it will move the molding rearwards into the instrument panel and open the gas flow through the channels to the "lower" final bag.

Another embodiment is the use of a guide bag to open the lids of an airbag system first. Therefore the guide bag is fixed to a platform. The platform is moved towards the airbag lids by the gas pressure. When pressurized gas moves into the guide bag to apply load to the lids it puts reverse load to the platform. But the platform can not move down because of a linkage of levers in a "non reserve" guide, which can move forward only. After the lids are open the guide bag will defold its legs, move the final bag to the side for a wide non aggressive bag. After the pressure level exceeds a predetermined level the sewing of the legs will open and the gas will flow into the final bag.

A further embodiment of the layout of the airbag module for a combination of the "Active door" and the "Active Defolding" is an airbag housing manufactured out of two aluminum extruded profiles. One profile housing houses the gas generator. Between the two profiles a "rolling" piston is installed. This rolling piston is connected by usually 2 ribbons to the airbag lids. During a crash the piston is powered by the gas pressure of the generator inside the space of the two profiles. The piston will roll inside this space and pull the airbag lid into the module. To eliminate twisting and champing of the lid, it has teeth to roll it straight. In the end location the piston will move into an "escape station". It will open the gas flow into the gas chimney with the gas distribution hoses on its top end.

A further embodiment of the use of a guide airbag is the roof airbag. The frame of a sunroof usually consists of aluminum profiles. In the present invention the roof airbags are located in specific areas of these extruded profiles. Inside these final roof airbags the guide bags are mounted. As already shown with the passenger bag, the roof guide bag will move the headliner or other trim parts out of the way first while it is pressurized. Next legs and/or openings will appear by rising the pressure. The guide bag will through its opened holes distribute the gas flow exact to the predetermined locations. The gas distribution channels are incorporated into the extruded profiles and are connected via holes to the guide bag. The roof airbags are not only located outside in the area of the outer roof like today. Alternatively they are as well located in the aluminum extruded profiles between rear and front passengers. Alternatively, the bag system as well is located sideways, in the front, or in the rear of the profiles around the sunroof to close it by a bag in case of a crash.

Besides the shown embodiments, all kinds of covers or vent openings as long as they are large enough and not too far away from the production area might be usable to house airbags.

Furthermore, one important aspect of the invention is transverse bag deployment not only by gas speed, but by gas pressure.

A further aspect is the gas distribution after the guide bag has done its work.

BRIEF DESCRIPTION OF THE DRAWINGS

Further parts of the invention are shown in the examples, the combination of the examples and expressed in the appropriate claims.

Related to the following drawings the invention will be explained in more detail:

FIG. 11 shows an 8th embodiment of the invention.

FIG. 12 shows the 8th embodiment during the beginning of the crash and the beginning of the defolding of the airbag.

FIG. 20 shows a schematic section of the 10th embodiment of the invented airbag unit according to FIG. 18 after ignition during the defolding of the airbag.

FIG. 21 shows a schematic "bird's view" of the invented airbag unit after ignition during defolding of the airbag according to FIG. 18.

FIG. 22 shows a schematic section of the 10th embodiment of the invented airbag triggering system according to FIG. 18 in a 90° turn.

FIG. 23 shows a schematic section of the invented airbag system after ignition during deployment of the airbag according to FIG. 22.

FIG. 34 shows in a half section a 12th embodiment of a driver bag before crash.

FIG. 35 shows in a half section the 12th embodiment in the beginning of the airbag deployment.

FIG. 50 shows in a schematic section a 21st embodiment before crash.

FIG. 51 shows the 21st embodiment (FIG. 50) in the early crash phase.

FIG. 52 shows in a schematic section the 21st embodiment before crash (FIG. 50) in a perpendicular section.

FIG. 53 shows in a schematic section the 21st embodiment (FIG. 51) in the early crash stage in a perpendicular section.

FIG. 54 shows in a schematic view the guide bag/active defolding bag of embodiment 21—right side folded and left side defolded.

FIG. 55 shows a schematic section of a 22nd embodiment of a combination of active door and active defolding.

FIG. 59 shows a principal layout of the 23rd embodiment across the roof between front and rear passengers in an early crash stage.

FIG. 60 shows the layout of FIG. 59 as perpendicular cross section before crash.

FIG. 61 shows FIG. 60 in an early crash phase.

FIG. 66 shows as a schematic section the package of the roof bags between front- and rear passengers and an alternative bag in the sunroof frame, to close the sunroof opening.

FIG. 67 shows as a schematic section the roof bags in FIG. 66 at an early stage of deployment.

DETAILED DESCRIPTION OF PREFERRED EMBODIMENTS OF THE INVENTION

Figure 1:
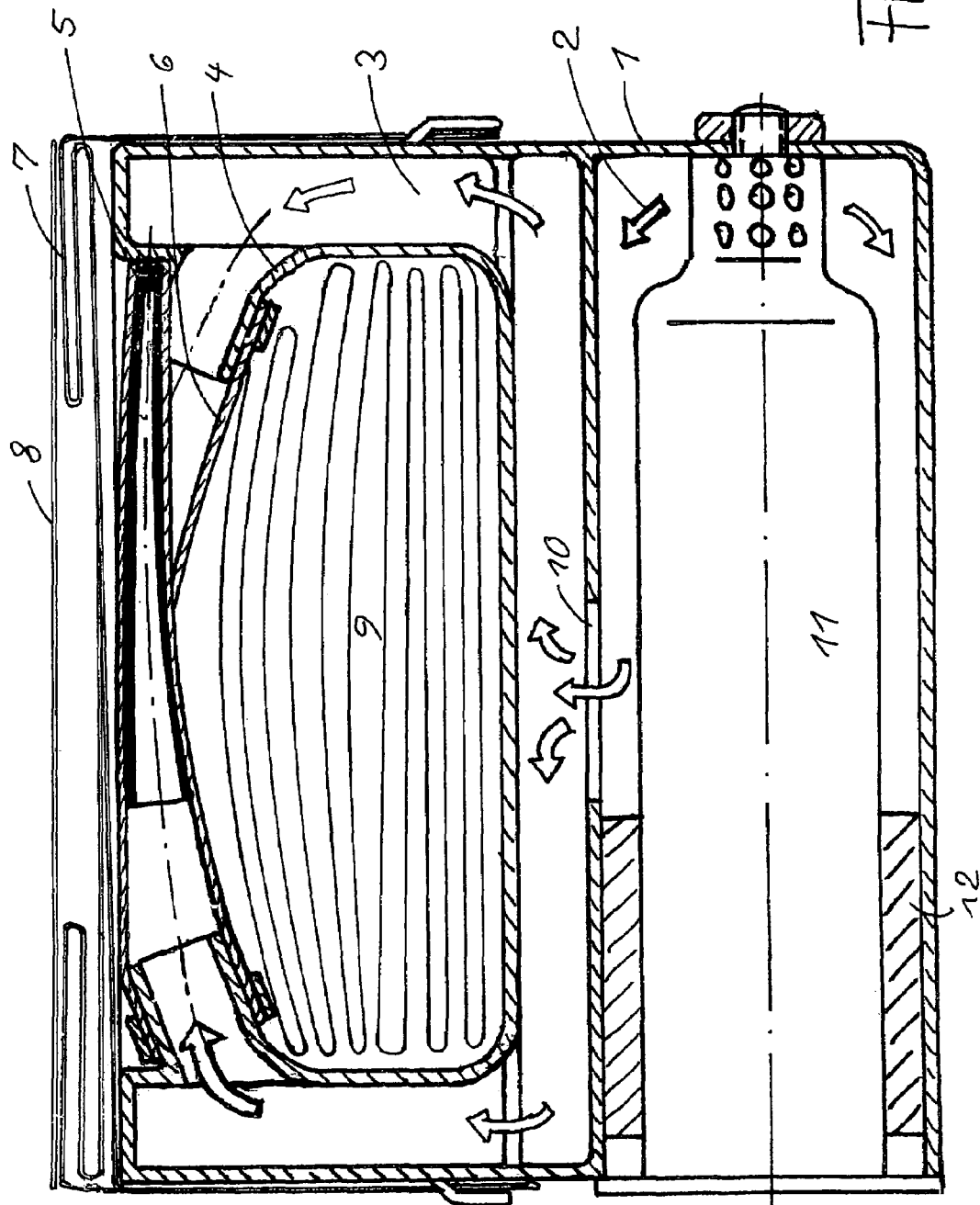
FIG. 1 shows an embodiment of an example with guide bag hoses before the crash in a section drawing as a section.

Following the embodiments of the inventions are described in the examples shown in the drawing. Various additional embodiments are possible as long as they are based on the key invention: Active defolding.

Same numbers of details in the drawings and sketches show same or similar parts respective parts in similar function. Based on the drawing more details are shown which not all are explained with numbers and descriptions. The same holds for descriptions relevant for the expert which are not shown in the drawings. Specific details which are presented in connection with concrete examples described or shown in drawings are not linked to these examples only or the combination of these details is not limited to these examples. All further technical combinations and all variants there from could be used even they are not described or shown.

The invented defolding system takes care of a pre-defolding of the bag by the pressure of the gas based on the physical law pressure times area is power, before the final protection bag defolds by the gas itself.

This pre-defolding usually is directed in an angle to the occupant to decrease aggressiveness by speeding the bag to a larger base to start with and to let the bag defolds in a usually sideways direction, where it again is less aggressive.

The examples shown in the drawings and described below show several embodiments. Experts are able to combine or create many more specifically tailored embodiments for their needs.

FIG. 1, as a first embodiment of passenger bag module shows a passenger bag module with a module housing 1 which houses a cartridge 11. In this embodiment the generator is surrounded by a piston for the "Active door" 12 (see earlier inventions shown in the introduction). Other alternatives are included. The gas does not move directly into the airbag 9 as usual. The gas flows through a gas travel 10 into gas channels 3, through connection flanges 4 into two to four hoses 6.

The specific item of this embodiment is that hose corks 5 are located inside the hoses 6.

Before the crash according to FIG. 1 the hoses 6 are folded into the textile of the final airbag 9 with a specific relatively loose folding 7 around the ends of the hoses 6. The assembly layout is so that a cover 8 holds the final specific loose folding 7 in the middle in place. On the side of the module housing 1 the folding is relatively loose/slack in a manner that the textile can defold easily to the side. The main portion of the airbag 9 is located parallel to the hoses 6 (not shown).

Figure 2:
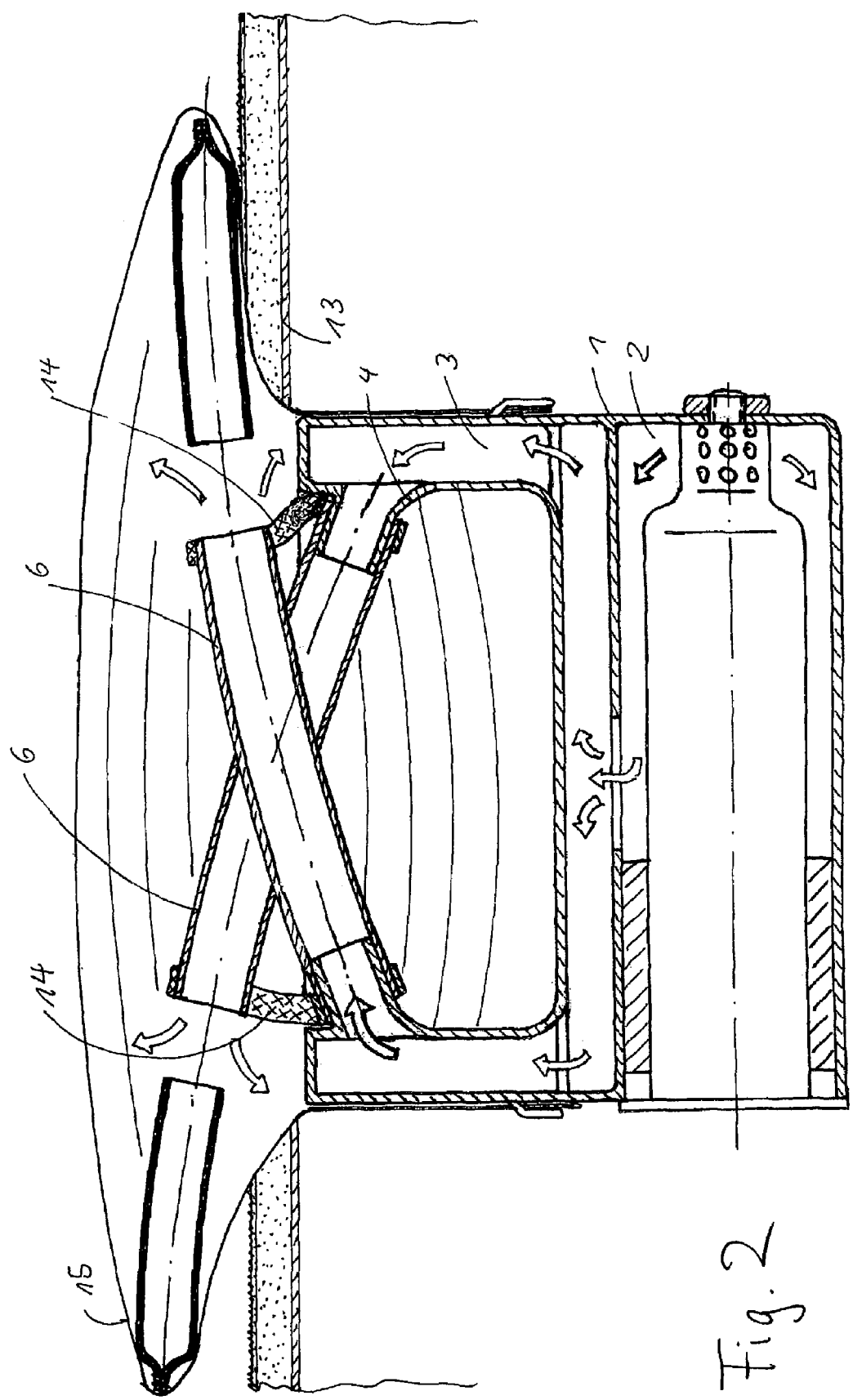
FIG. 2 shows the same as FIG. 1 during deployment of the final airbag as a section.

FIG. 2 shows the situation of the first embodiment (FIG. 1) during defolding and blowing up. The gas pressure in the tubes 6 will "lift" them straight up. The layout is tuned, that the pressurized hoses 6 will direct their ends above the corner of the opening in the instrument panel 13. The loose airbag textile 15 will move with the hoses 6. To limit the hoses 6 in their travel to a predetermined "en"-location the hoses 6 will be connected with ribbons 14 accordingly. Also these ribbons 14 are necessary that the hoses 6 are not able to move back when the gas flows through. The corks 5 are tailored that they exit at a predetermined gas pressure like a bullet or like a champagne cork. The corks 5 move the airbag textile 15 horizontally perpendicular to the OOP-occupant parallel to the surface of the instrument panel 13 (OOP=out of position) an occupant which is too close to the airbag opening by a severe accident or not buckling). On these locations the following gas flow will defold the airbag, non aggressive on the side of the OOP occupant.

Said corks 5 might be hoses which are closed i.e. sewn on their ends. Also they could be pieces made of thermoplastics or the like. The cork hoses also could be outside of the hoses 6 like a cuff (not shown). Stiff hoses, like fire hoses, which are stiff enough not to need ribbons (not shown), could also be used.

Figure 3:
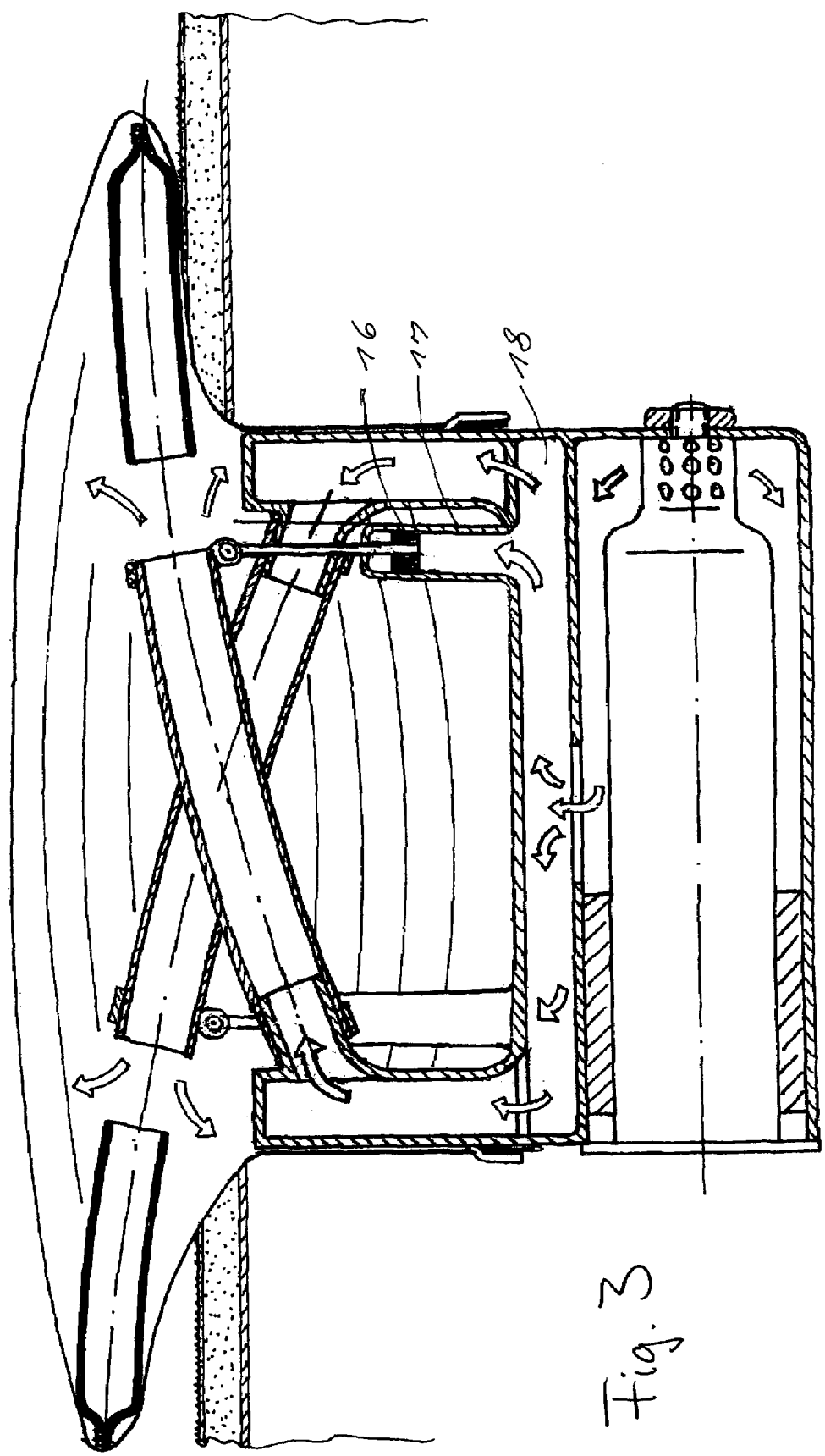
FIG. 3 shows a second embodiment during deployment of the airbag as a section.

FIG. 3 shows a second embodiment. Here the hoses 6 are moved by pistons 16 in cylinders 17 which are moved by the gas pressure as shown. The assembly is part of the gas pressure chamber 18. The advantage is an exactly directed shooting direction of the hoses 6. Alternatively the hoses 6 can be tubes which can be bent into the tailored direction (not shown). Alternatively the hoses 6/tubes can be connected to "one" chimney 30 in the middle of the module housing 1. To obtain a flat "shooting" angle, the chimney 30 might be a telescope gas guide tube 27.

Figure 4:
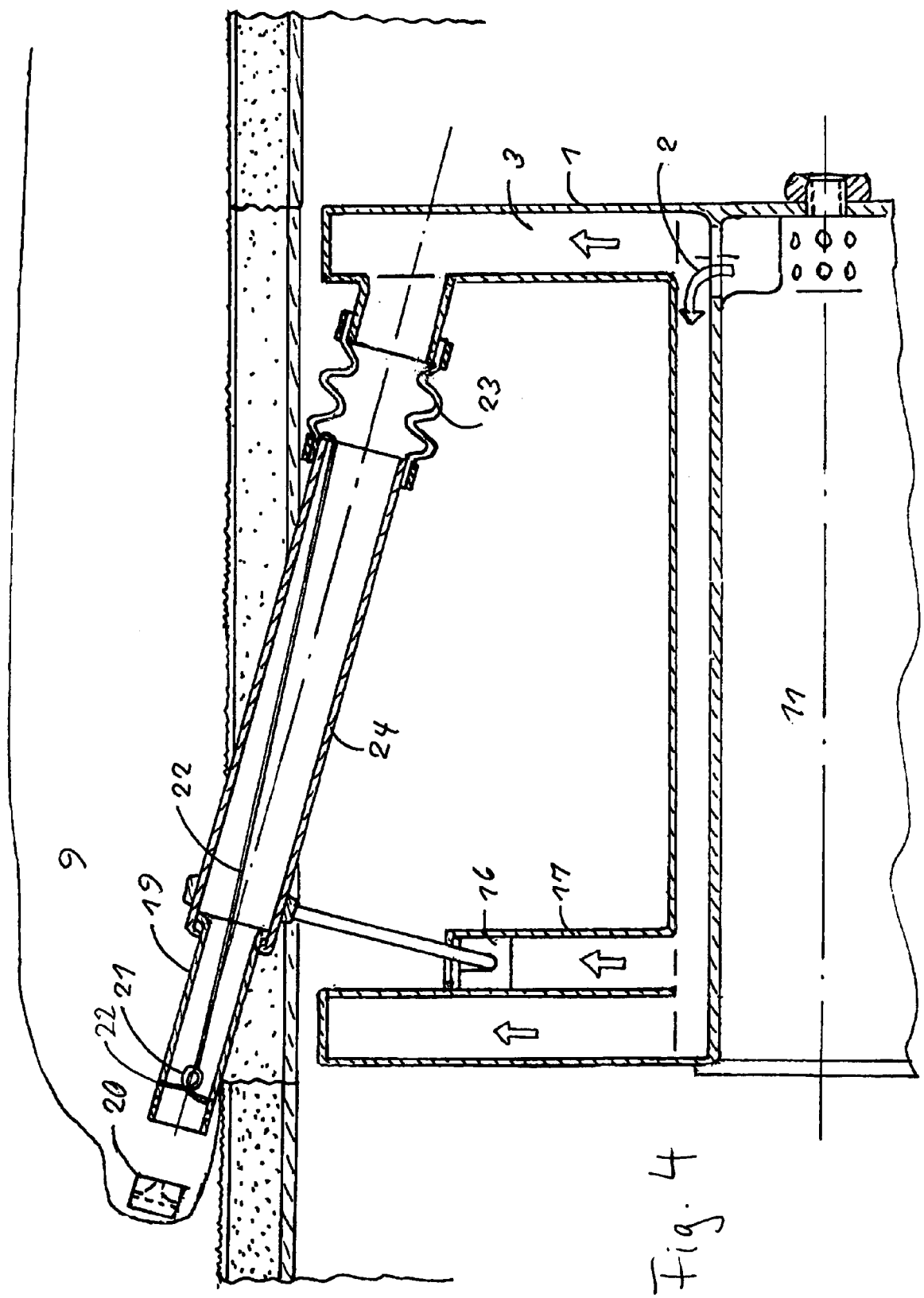
FIG. 4 shows a third example during deployment of an airbag as a section.

A further embodiment is shown in FIG. 4. The gas flow 2 is achieved by a gas exit tube 24 which is connected to the gas channel 3 by a flex joint 23. During the beginning of a crash the gas exit tube 24 is tilted up by a piston 16 in a cylinder 17 that the exit of the tube lines up above the corner of the opening of the instrument panel 13. A telescopic extension tube 19 is moved by the gas pressure and moves itself the "soft" folded textile of the airbag to the outer surface of the instrument panel 13. During this the telescope tube extension 19 is closed by a cork 20. As an alternative the cork is fixed by a split pin 25 or the else. Only when the telescope extension tube is close to its final location an unlock robe 22 will take the split pin 25 out and the textile of the airbag 9 will be moved to some extend by the cork 2 and the textile bubbles (not shown), then will be filled with gas. The advantage of this embodiment is that the telescope extension tube 19 will help to push the textile perpendicular to its normal travel out of the opening.

Figure 5:
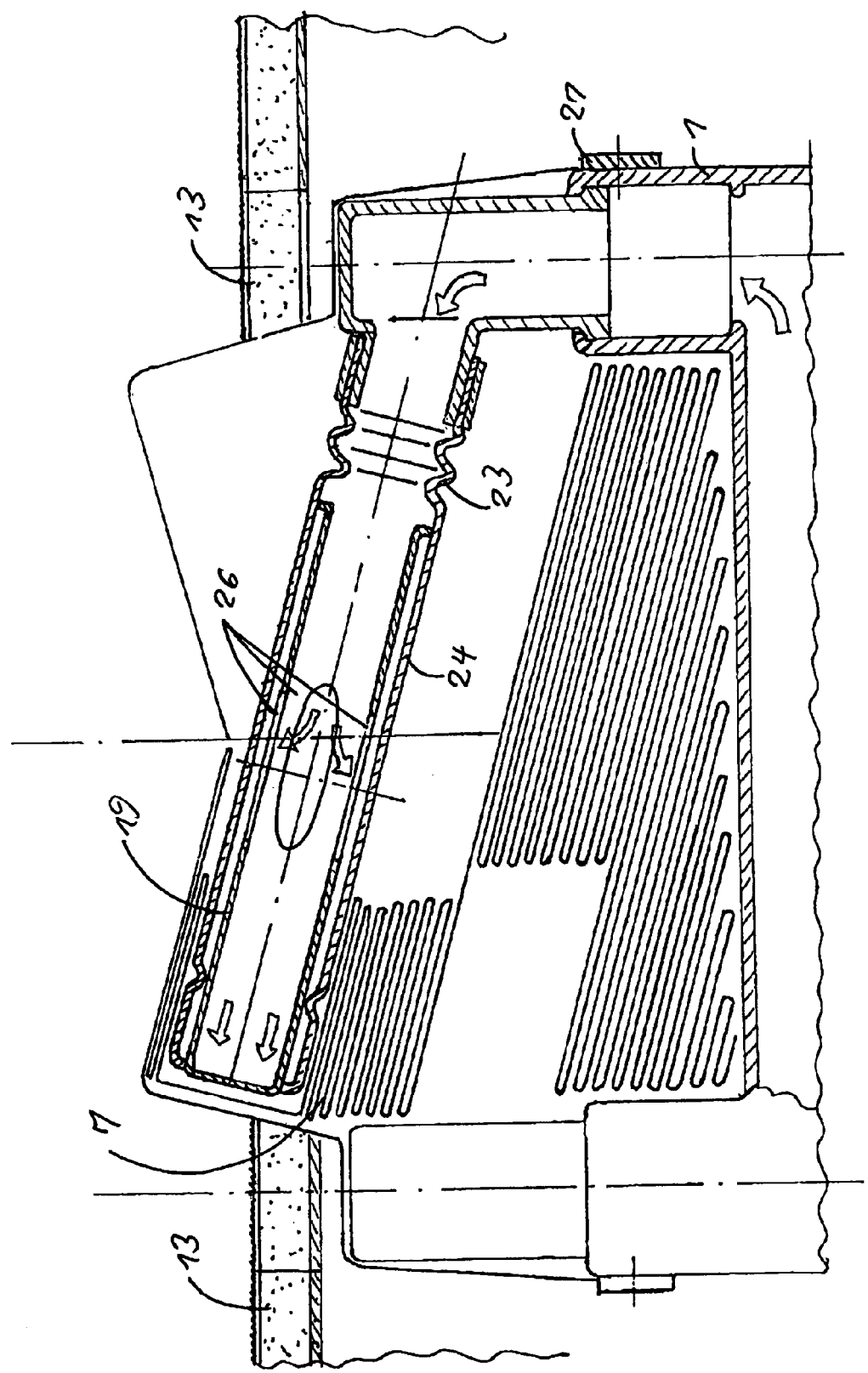
FIG. 5 shows a forth example during start of deployment of an airbag as a section.

FIG. 5 shows a further embodiment of the "active defolding". The gas flow 2 moves into telescope gas guide tubes 27 which move upwards by the gas pressure. Further the gas pressure moves the telescope extension tube 19 into the airbag folding with its specific folding 7 around the tube. The telescope tube extension 19 has gas exit openings 26 which are only open when the telescope tube extension 19 has moved. The gas can exit through these openings 26 directly into the textile bubbles (not shown). The layout of the flex joint 23 covers possible head impacts to the gas exit tube 24. Advantage is the simple layout.

Figure 6:
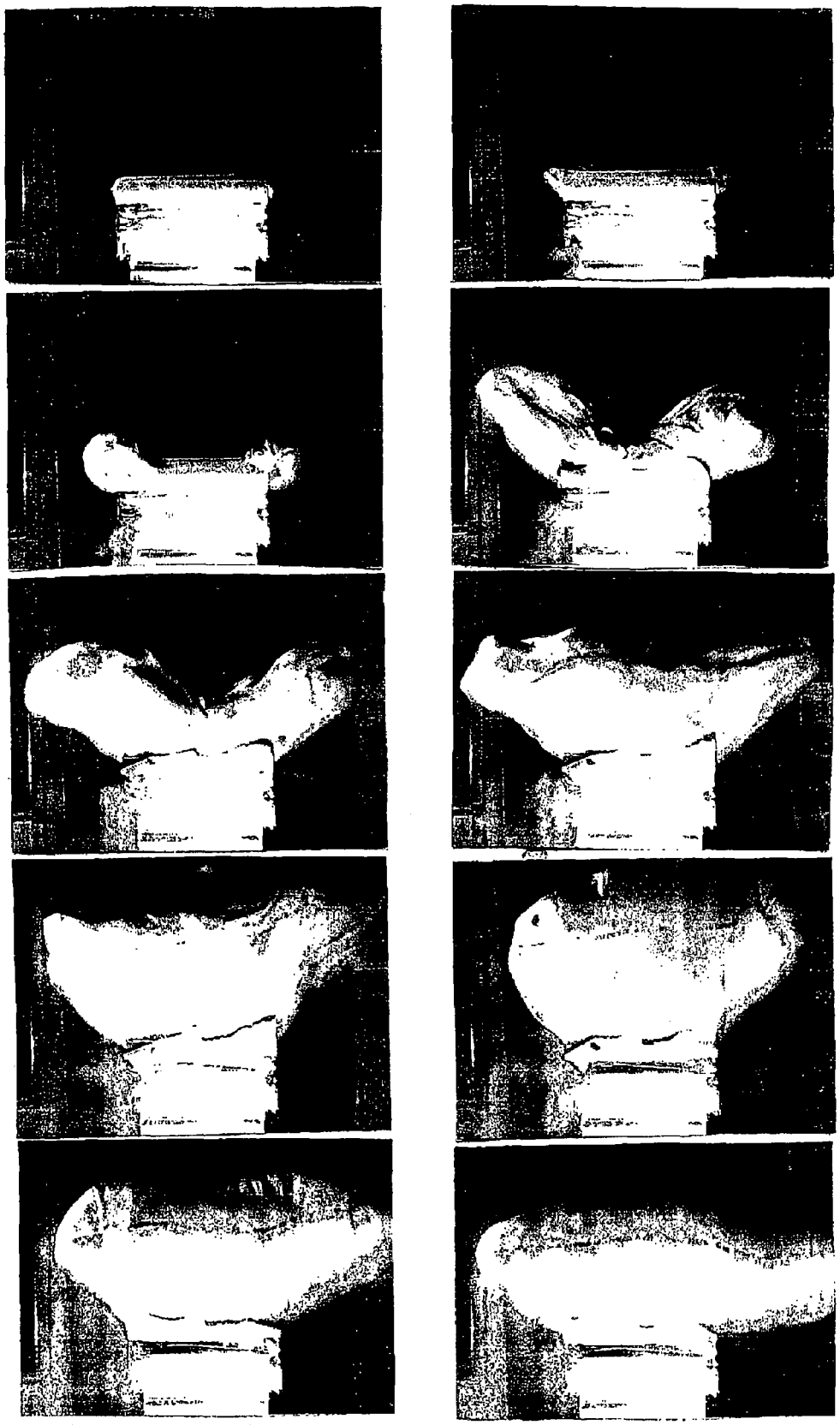
FIG. 6 shows the high speed pictures as a result of the invention.

FIG. 6 shows as sections from a real crash test video better than any wording the deployment of an airbag with "active defolding". The airbag starts to deploy perpendicular versus the common deployment on both sides of the OOP occupant. The airbag 9 by passes the occupant.

Figure 7:
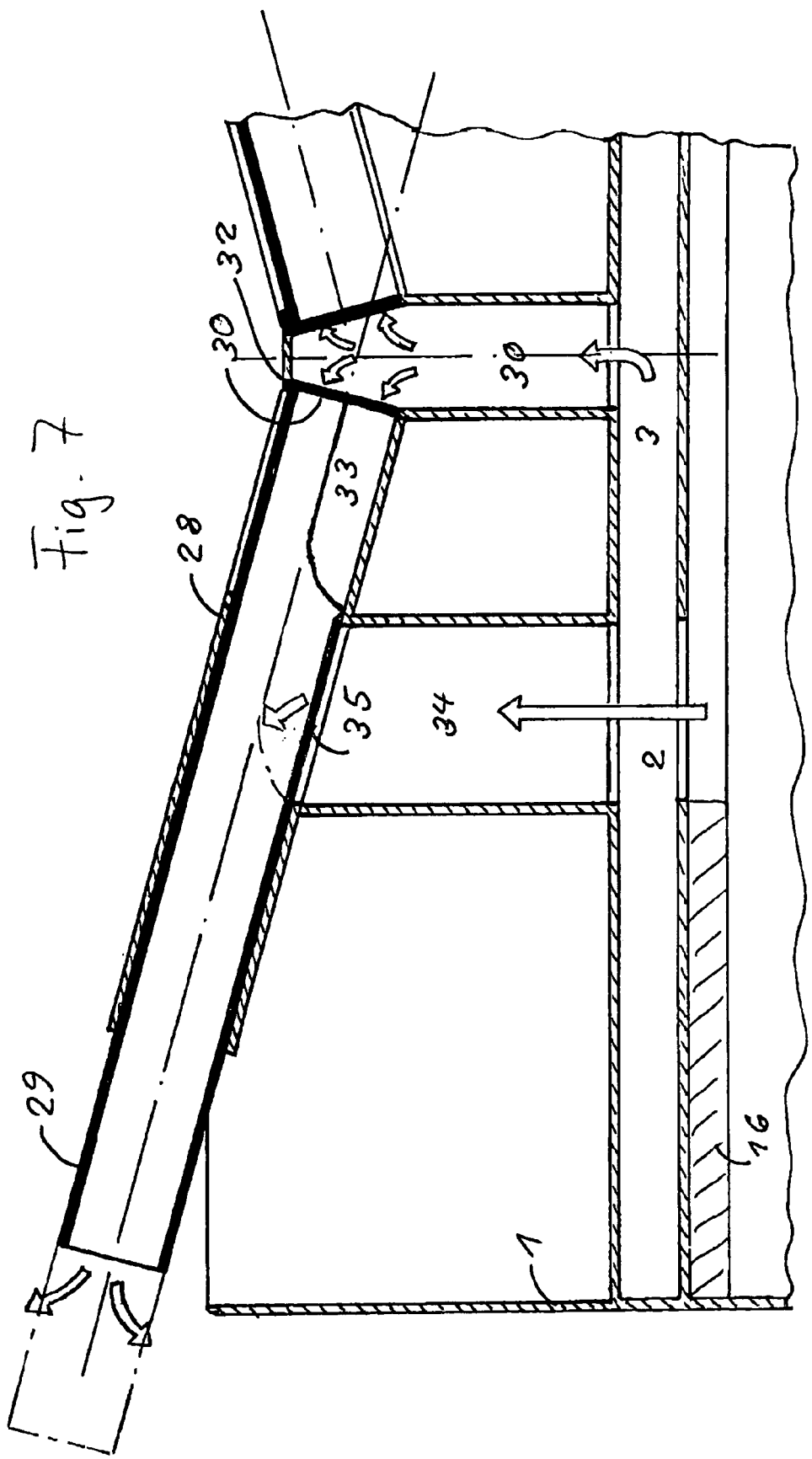
FIG. 7 shows a fifth example during the start of the airbag as a section.

FIG. 7 shows a fifth embodiment of the "active defolding". A telescope tube 29 is located in a guide tube 28. The telescope tube 29 is closed with a cover 30 where the pressure is applied. This layout moves the telescope tube forward to push the airbag folding along the surface of the instrument panel 13. Then the gas will move through a "chimney" 30. When the telescope tube 29 has moved until it is stopped by its travel limiter 32 the telescope tube 29 will have an opening 33 which fits to the through pass of the second chimney 34. The gas for the airbag deployment will pass through this opening (Physical system of the gas guide of a two stroke engine).

Figure 8:
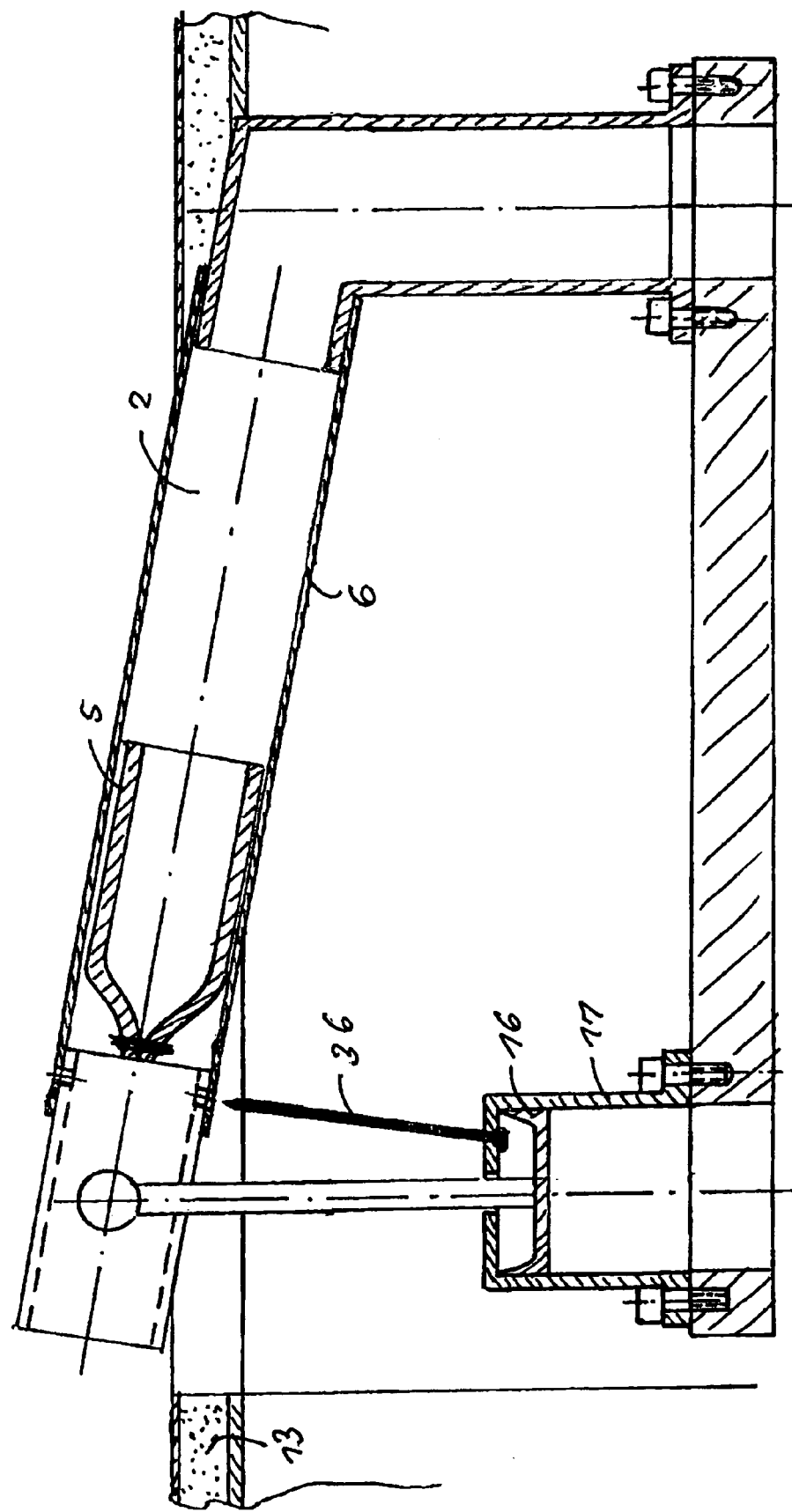
FIG. 8 shows a sixth example during the start of the airbag deployment with a blow out position, as a section.

FIG. 8 shows a 6th embodiment of an "active defolding". Here a "blocking" pin 36 stops the travel of the cork 20 or 5 until the piston 16 inside the cylinder 17 has moved up the gas exit tube 24 of the hose 6 into the predetermined direction above the surface of the instrument panel 13. Advantage is the control of all movements.

Figure 9:
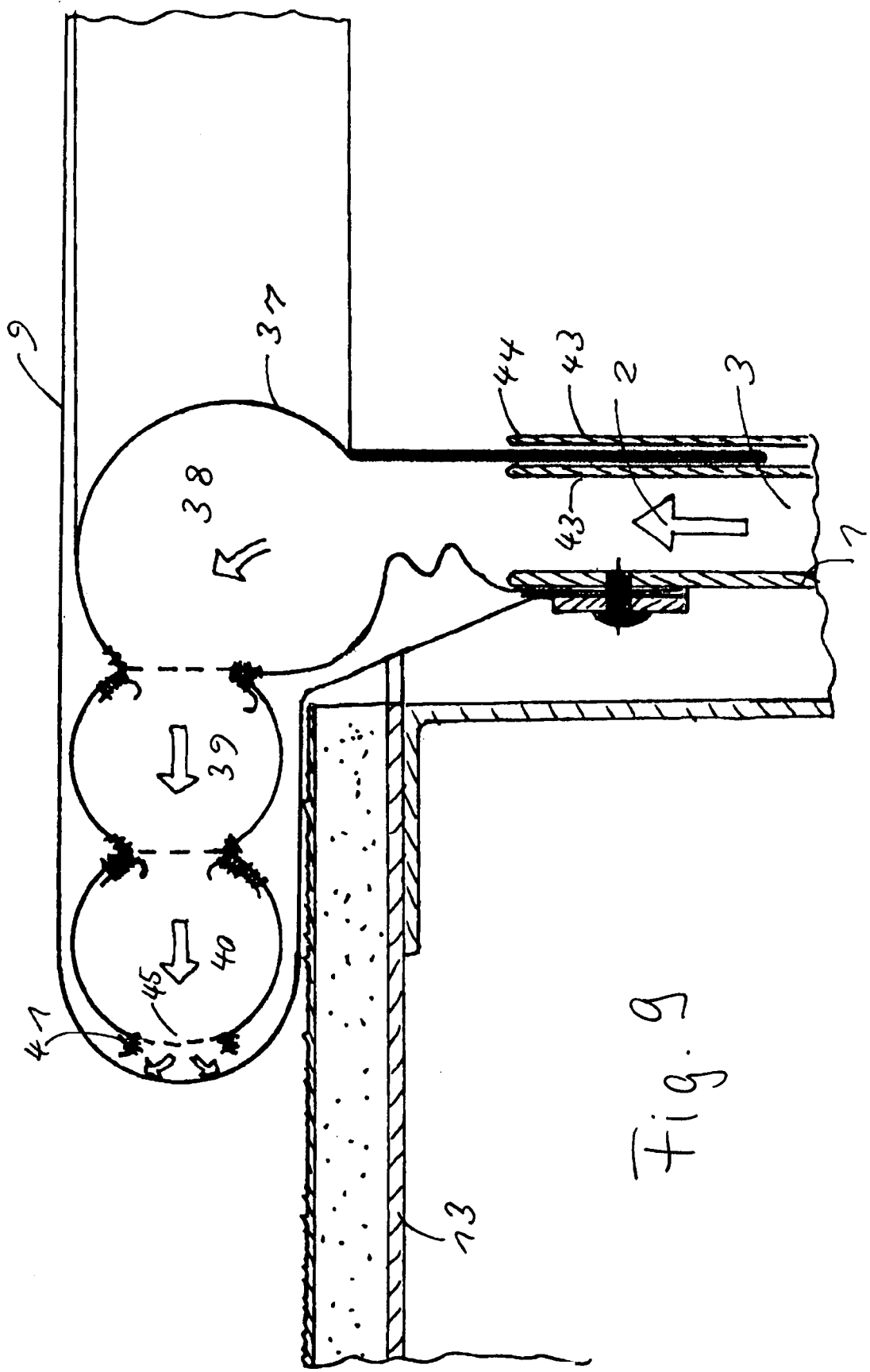
FIG. 9 shows a seventh example during the start of the deployment of an airbag as a section.

FIG. 9 shows a 7th embodiment of the "active defolding" by a gas distribution mattress 37. The mattress 37 is folded inside the soft airbag folding on its side. The mattress 37 is fixed mounted to the end of the appropriate gas channel 3. That the mattress 37 will move perpendicular to its fastening it is necessary that the lower layer of the mattress fabric is "shorter". Its shape has to be sewn around a corner. Next prerequisite is supporting wall parallel to the inner side of the gas channel 3. Alternatively it might be solid mounted or might be slid out of a guide 44. During crash the first gas chamber 38 will be filled with pressure and will become rigid, then a closed hole 45 by sewing will crack the gas will flow into the next gas chamber 39 then in 40 and so forth. This mattress 37 out of rigid gas chambers 38, 39, 40 will move the final airbag to the side.

After the foremost gas chambers are filled, holes 45 will open by cracking the sewing. The gas will flow into the mattress "bubbles". Bubble by bubble, the final airbag 9 will be spread to the side perpendicular to its normal deployment direction. After the last sewing hole 45 has opened the airbag 9 will be filled with gas on a large hose sideways to the OOP-occupant. We call this pull of the airbag 3 in this embodiment with a mattress 37 "active defolding".

Figure 10:
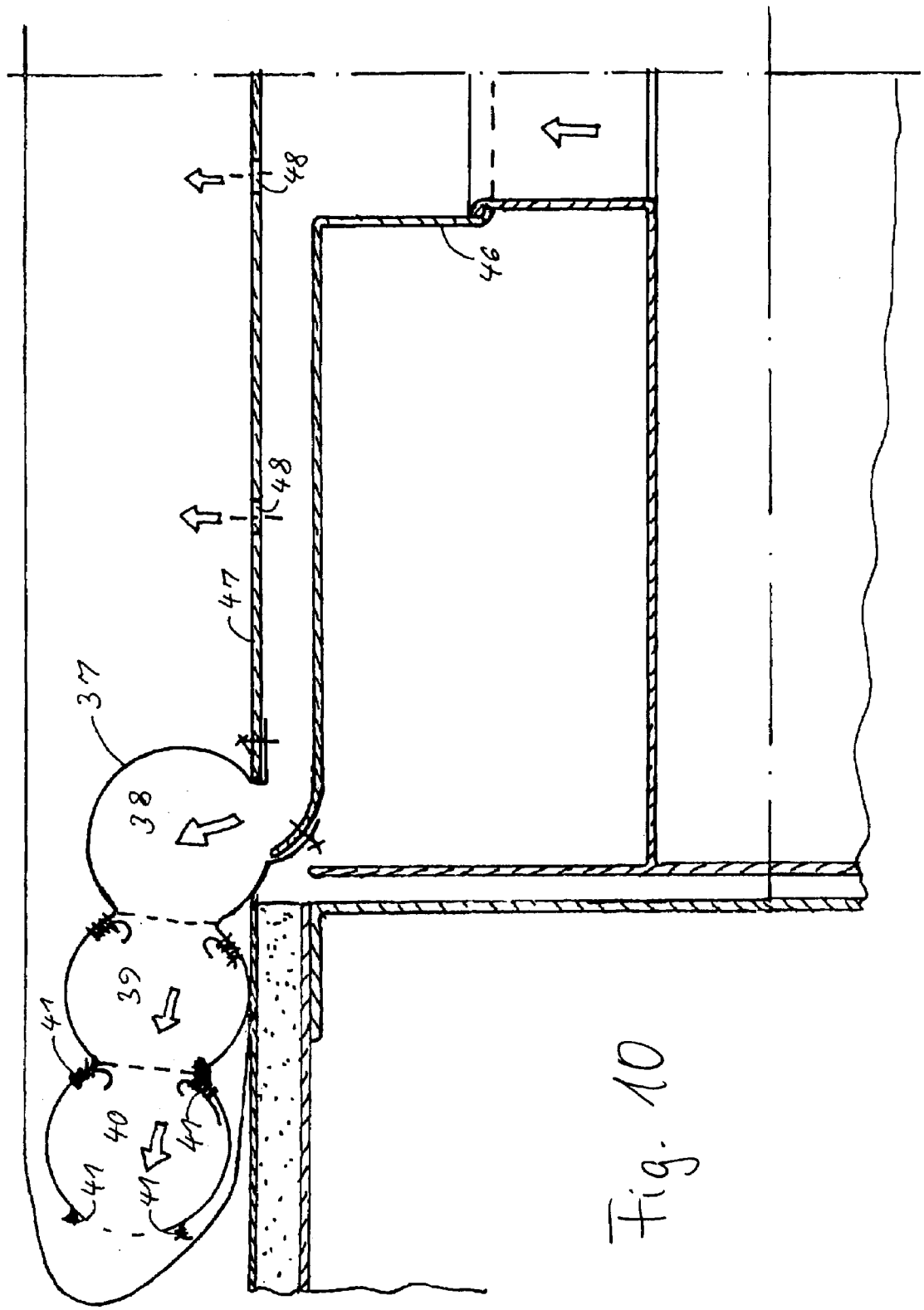
FIG. 10 shows the seventh example milliseconds later as a section.

FIG. 10 is quite similar to the embodiment shown in FIG. 9. Here the gas distribution mattress 37 is mounted to the middle of the module housing 1 to a telescopic chimney 46. This telescopic chimney 46 distributes all around into a gas distribution mattress 37. The cover 47 houses predetermined gas through passing holes 48 to fill the airbag 9 from the middle parallel to the filling all around on the outer surface of the gas distribution mattress 37. The exact layout is tailored to a balance between protection and peak aggressiveness of the airbag 9. For an exact predetermined opening of the sewn holes 45 the sewing 41 alternatively might be opened with a cutting tether (not shown). This cutting tether has a tailored length and is connected of the segments of the mattress 37. Every time the mattress 37 elongates, the cutting tethers will cut a "run" into the sewing 41. Details are patented in U.S. Pat. No. 6,299,197 B1, Oct. 9, 2001.

In summary the 7 embodiments, shown up to now, have the following function and advantage:

This kind of deployment technique mostly used for the most dangerous airbag, the passenger bag moves the aggressiveness of today's airbags in the "dangerous" beginning below the level of fatal injuries or death. Therefore the gas pressure in appropriate hoses tubes, mattress and the else unfold or shoot "corks" to the side, perpendicular to the today's normal airbag deployment. This enlargement of the airbag hose let the airbag always move around respective pass by the OOP-occupant. The OOP-occupant will be hit by a section of the airbag only. He never is able to "stop" the bag and make it aggressive by this. This technique is the "active door", patented by the present inventor in several patents and patent applications.

The examples show the use in passenger bag applications but are to be used with any other airbag applications also.

In the following further embodiments of "Active deployment" airbags for example are mounted in the air duct below the defroster air distribution.

FIG. 11 shows an 8th embodiment where an airbag module 11 is located below an air distribution guide 103 of a windshield defogging. The generator 101 is located in an airbag housing 109 which, as well, is the duct for the air of the windshield defogging. A further particularity is the layout of the housing of the generator 101 and its gas outlet 104 with a gas distributor 105 ending in two hoses 106. Inside these hoses a bullet 107 is located. Most embodiments of these bullets will be sewn hoses 106 or similar. FIG. 11 shows a hose 106 and a bullet 107 folded together and located on an angular surface 111 pointing to the surface of the instrument panel 108. This is the layout before crash.

FIG. 12 shows the 8th embodiment (FIG. 11), the defolded hose 106 and the defolded bullet 107 in function during the beginning of the crash. The defolded hose 106 slides on the angular surface 111 to the level of the instrument panel surface 108. It moves the airbag 9 to the side to a larger width. The defolded hoses 106 blow the gas out of the airbag module 110 on top of the instrument panel surface 108.

Figure 13:
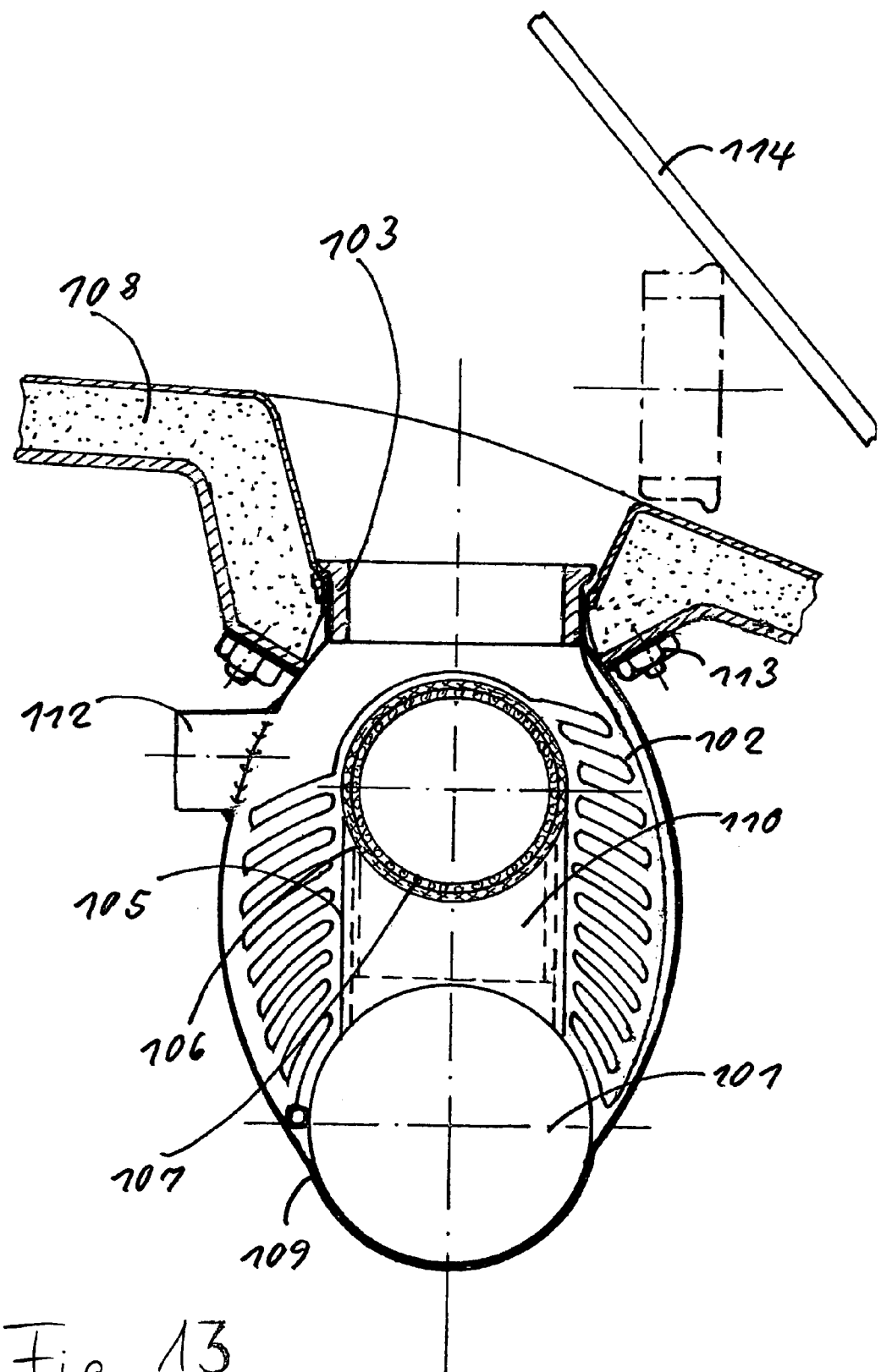
FIG. 13 shows a 90° section of the 8th embodiment of FIGS. 11 and 12.

FIG. 13 shows a perpendicular section of embodiment 8 of FIG. 11. The combination of the airbag/housing 109 and air duct with the air connection 112 is connected to the instrument panel 108 below the windshield 114.

Figure 14:
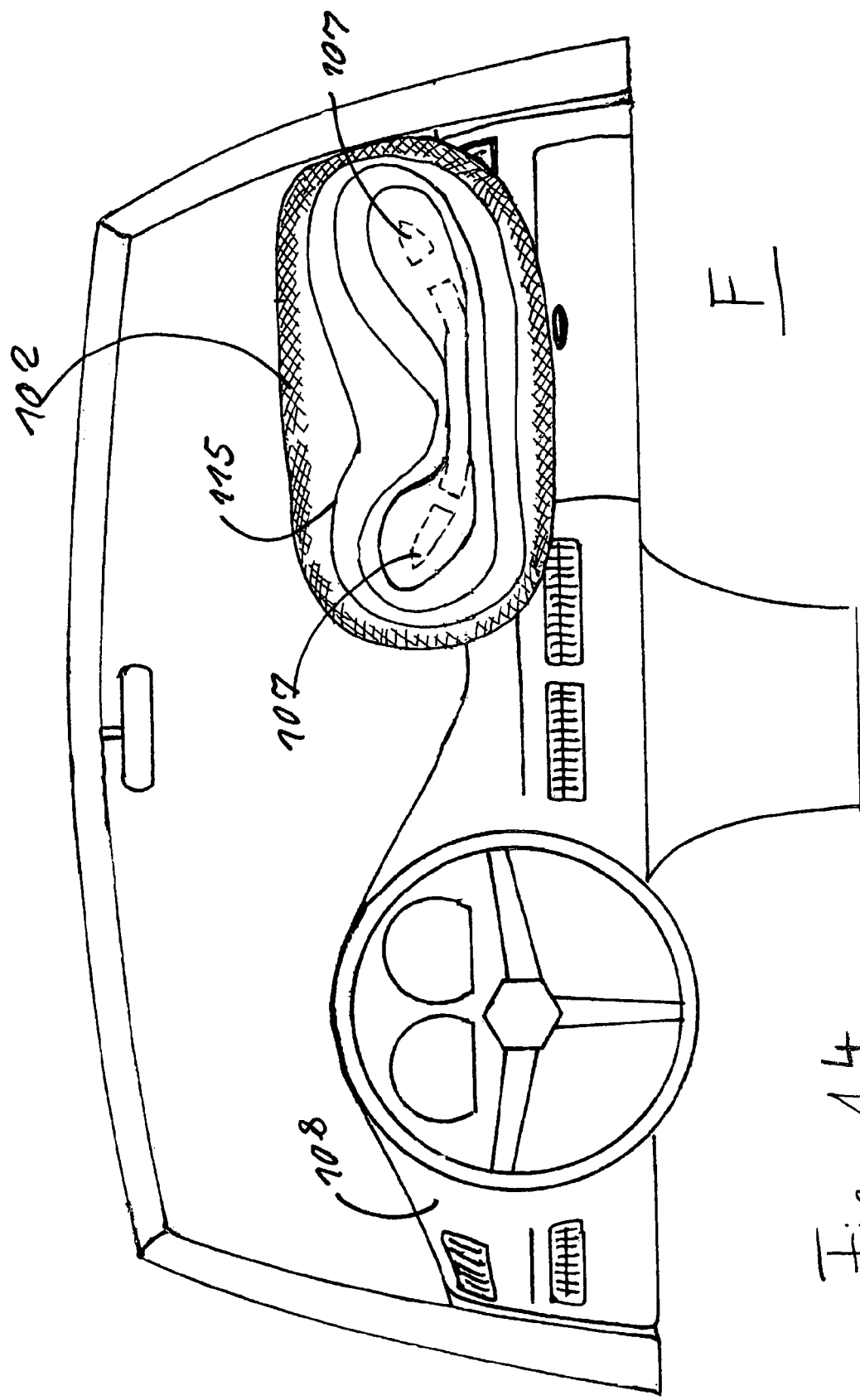
FIG. 14 shows a schematic view of the embodiment of FIGS. 11 to 13.

FIG. 14 shows embodiment 8 of FIGS. 11-13 installed in the instrument panel 108. The shown lines 115 show the steps of deployment of the airbag 9. After the crash the airbag module 110 can be exchanged without any destroyed surrounding.

Figure 15:
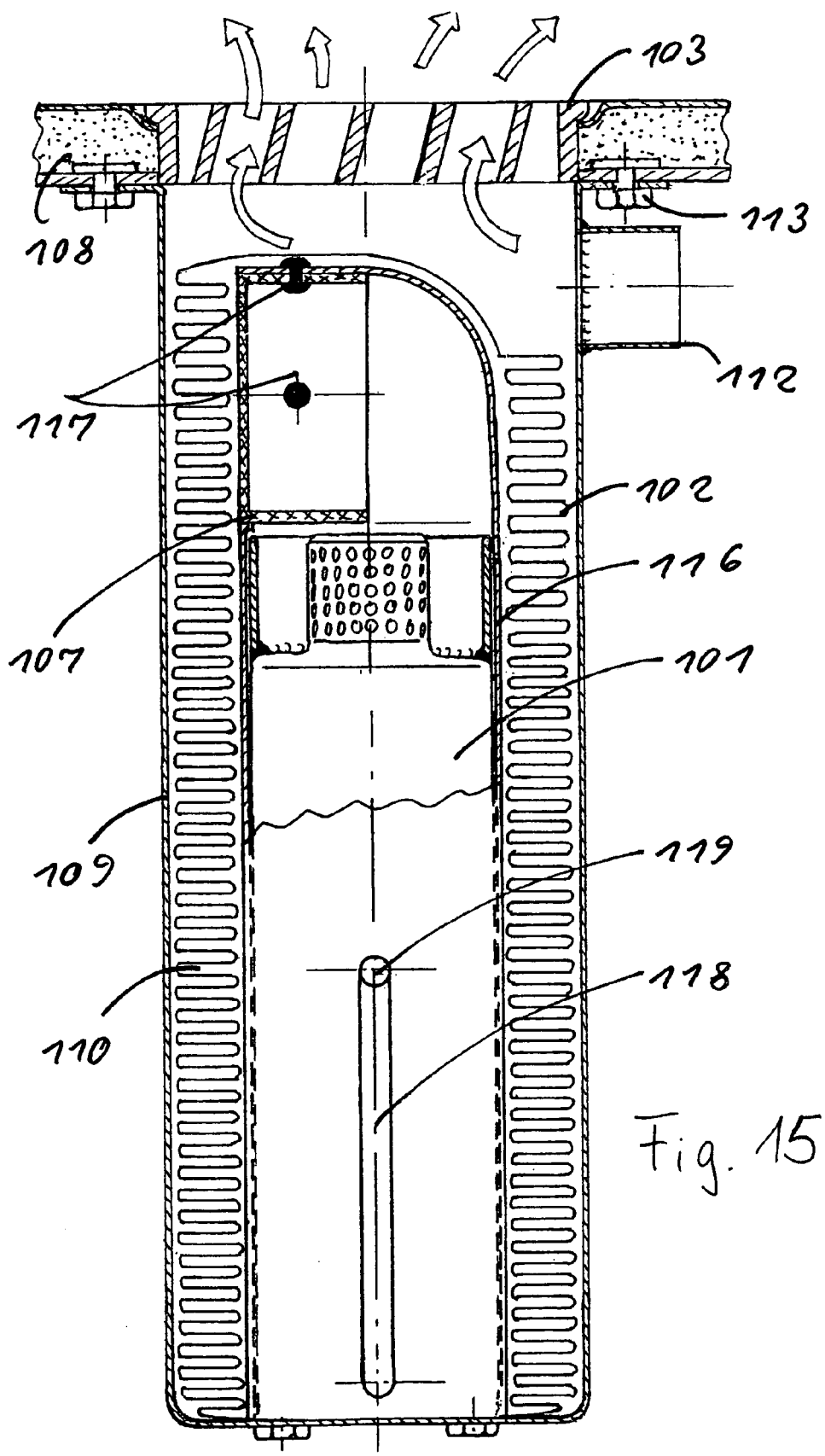
FIG. 15 shows a 9th embodiment of the invented airbag triggering system before the airbag deploys.

FIG. 15 shows embodiment 9 of a passenger bag, mounted vertical below an air distribution grid 103. The airbag housing 109 and the air duct with the air connection 112 one piece are the same as in embodiment 8. The airbag grid 103 is as well the airbag module cover. Around the generator 101 is the blow out housing 116 which will be moved upwards by the gas pressure. The movement of the blow out housing 116 is predetermined by a slot 118 and a travel limiter 119. In the "head" of the blow out housing 119 a "bullet" 107 is located. To make sure that the head of the blow out housing 116 is moved up first before the bullet 107 escapes, the bullet 107 is fixed with for example cut rivets 117 which are cut by gas pressure times area at a tailored pressure later than the blow out head has moved up.

Figure 16:
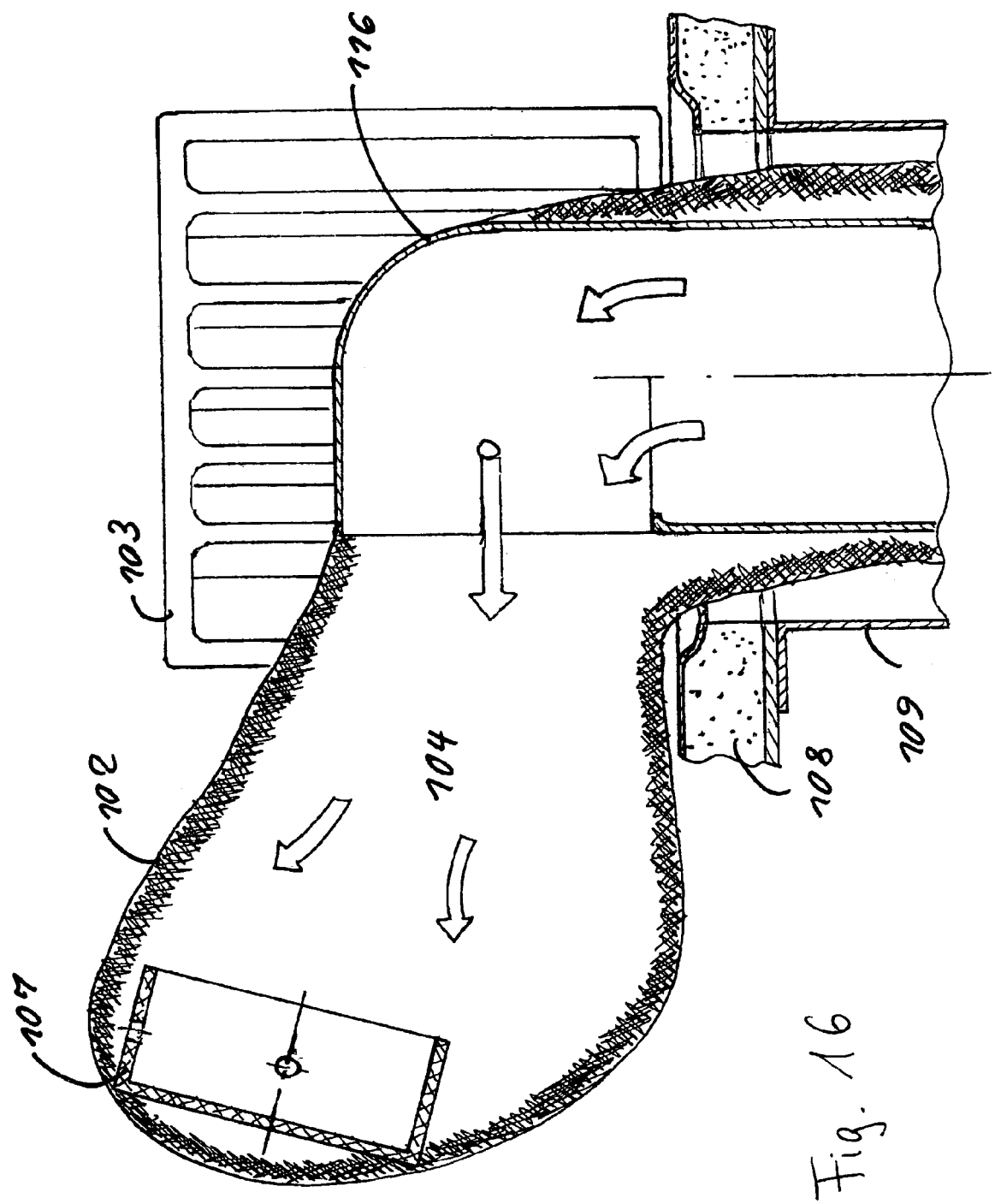
FIG. 16 shows a schematic section of the embodiment in FIG. 15 after the ignition and during the start of the defolding.

FIG. 16 shows the embodiment 9 of FIG. 15 during crash when the head of the blow out housing 116 has moved upwards and the air distribution grid 103 is tilted. The gas power has cut the rivets 117 and the bullet pulls the airbag 102 out of its housing 109 parallel to the surface of the instrument panel 108 to achieve a large deployment base of the airbag 102.

Figure 17:
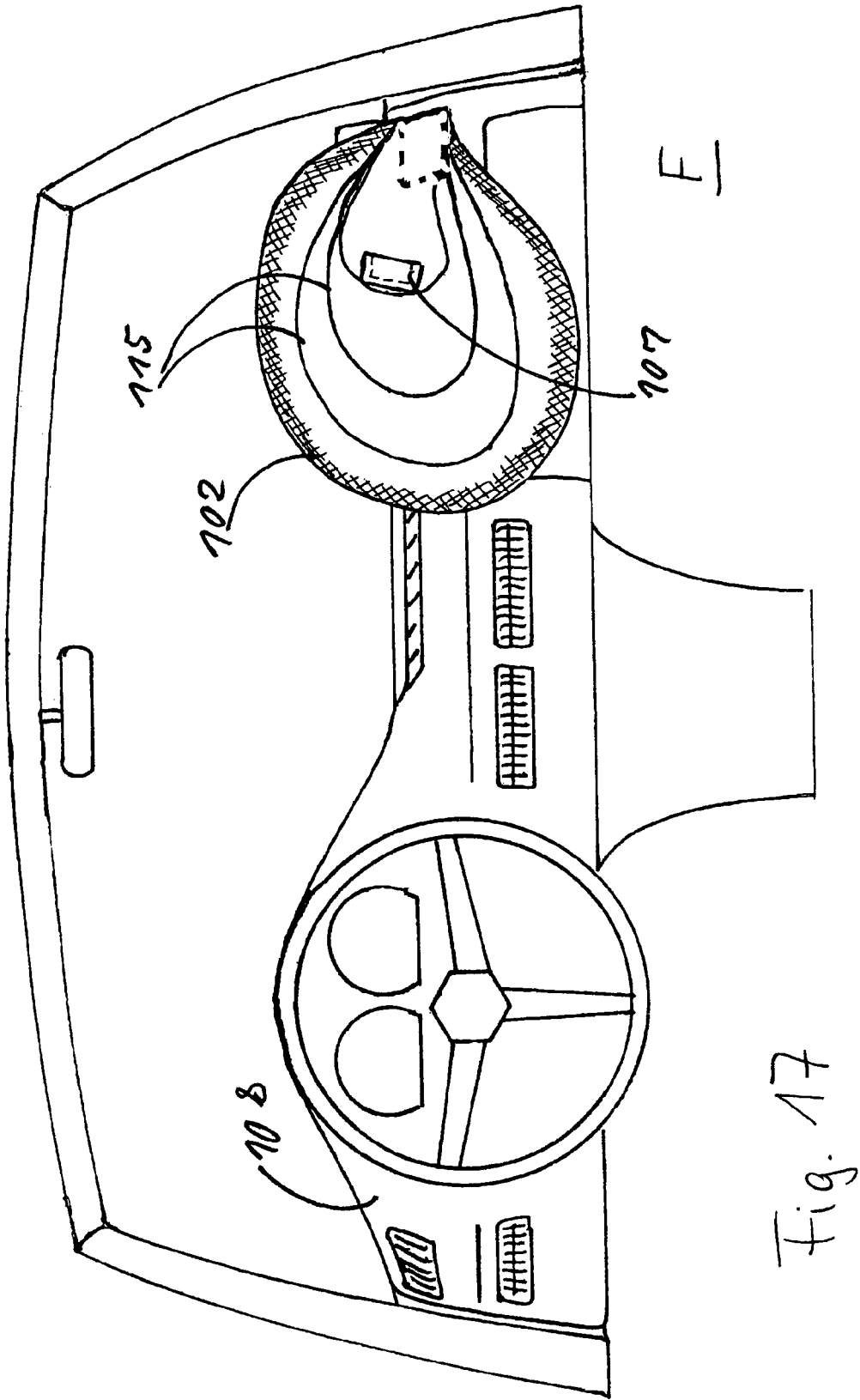
FIG. 17 shows the schematic view of the embodiment of FIGS. 15 and 16 in a car.

FIG. 17 shows embodiment 9 of FIGS. 10 and 11 and its location in the instrument panel 108. The lines 115 show the deployment movement of the airbag 102. Like the movement along the windshield the movement along the side window may be tailored as well. The airbag outlet must be out of range of the OOP-occupant because the direct outlet of the airbag 102 is too aggressive. Many VANs have instrument panels 108 where the side window defogging grid 103 is far enough away from the OOP-occupant.

At an alternative location of the airbag module 110 in the middle of the instrument panel 108 the deployment of the airbag 102 could be moved to both respective 3 sides. The blow out housing 116 must be adapted accordingly. Here, as well, the airbag module can be replaced after the crash easily without any further damage.

Figure 18:
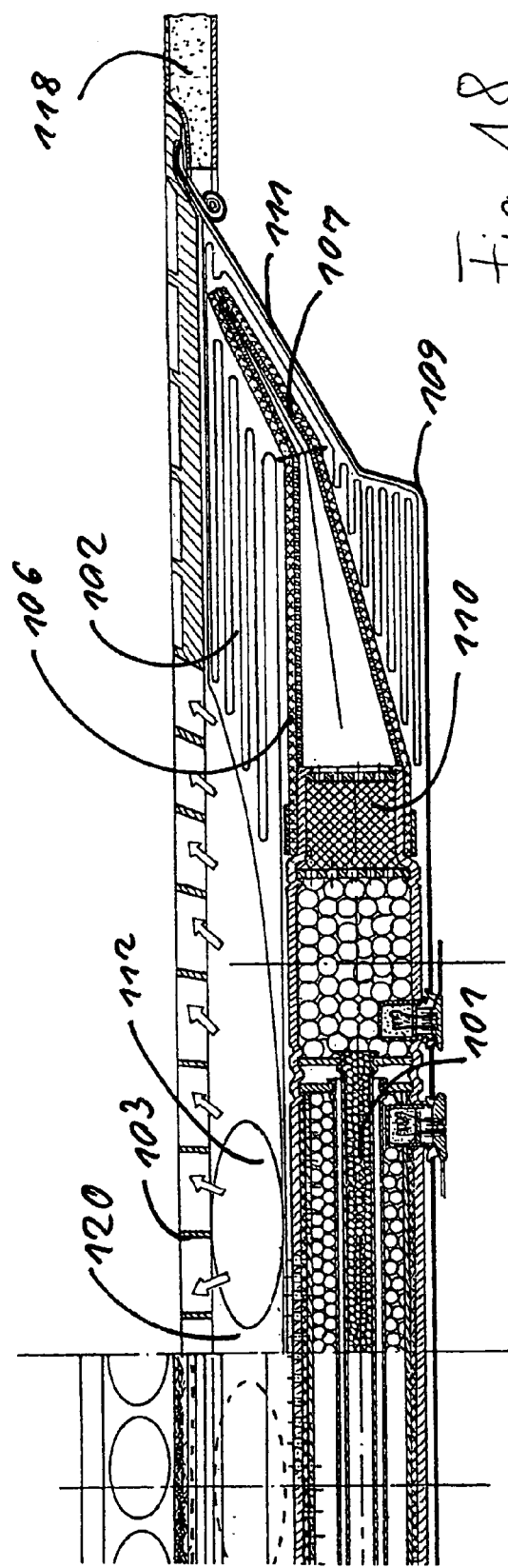
FIG. 18 shows a schematic section of a 10th embodiment of the invented airbag unit before crash.

FIG. 18 shows a 10th embodiment for an airbag 102 which will cover driver- and passenger demands simultaneously. This airbag 102 is located in the air duct 120 below the windshield 114 under the air distribution grid 103. The airbag housing 109 and the air channel 120 are one assembly. FIG. 18 shows the folded airbag 102, hose 106 and bullet 107 folded before crash. The hose 106 is surrounded with the folding of the airbag 102 for a quick and low resistance airbag deployment. Off course, airbag module 110 and air duct 120 must fit together straight or curved.

Figure 19:
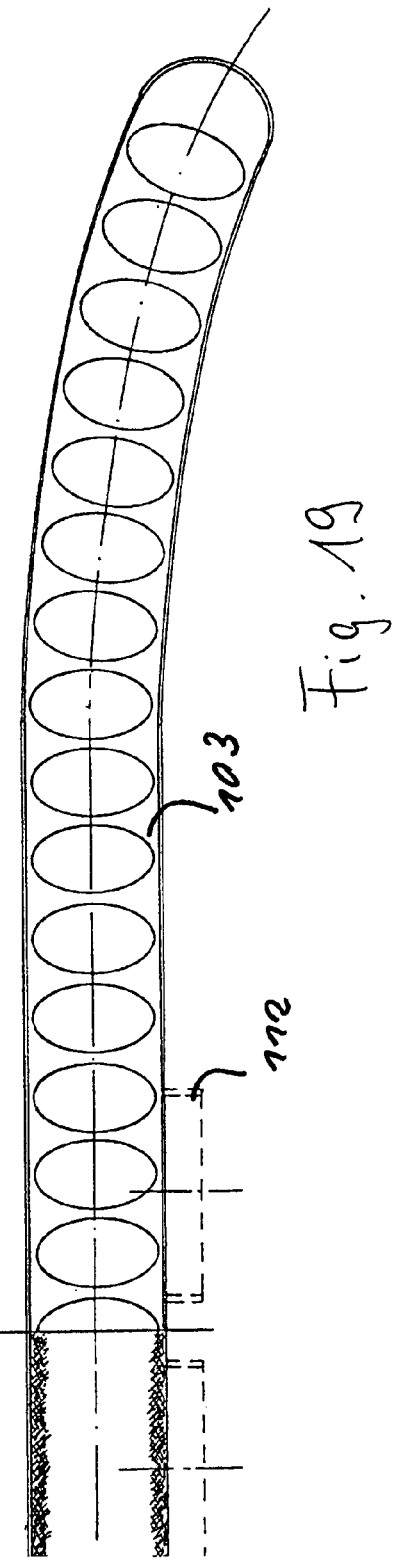
FIG. 19 shows a schematic "Bird's view" of the invented airbag unit according to FIG. 18 before the ignition.

FIG. 19 shows the bird's view of the 10th embodiment of FIG. 18.

FIG. 20 shows the embodiment of FIG. 18 during a crash. The bullet 107 moves the airbag 102 towards the direction of the A-pillows.

FIG. 21 shows the bird's view of the embodiment 10 in FIG. 20 during the crash with tilted respective open air distribution grid 103.

FIG. 22 is the perpendicular section of the embodiment 10 of FIG. 18. If the airbag module 110 can be mounted from the outside into the air duct 120 it is very advantageous and saves money for the full insurance. The air duct 120 has to be reinforced accordingly.

FIG. 23 shows a similar perpendicular section of embodiment 10 of FIG. 18 with the air connection 112 and the tilted air distribution grid 103 which is held in place by cords or ribbons 123 or similar.

Figure 24:
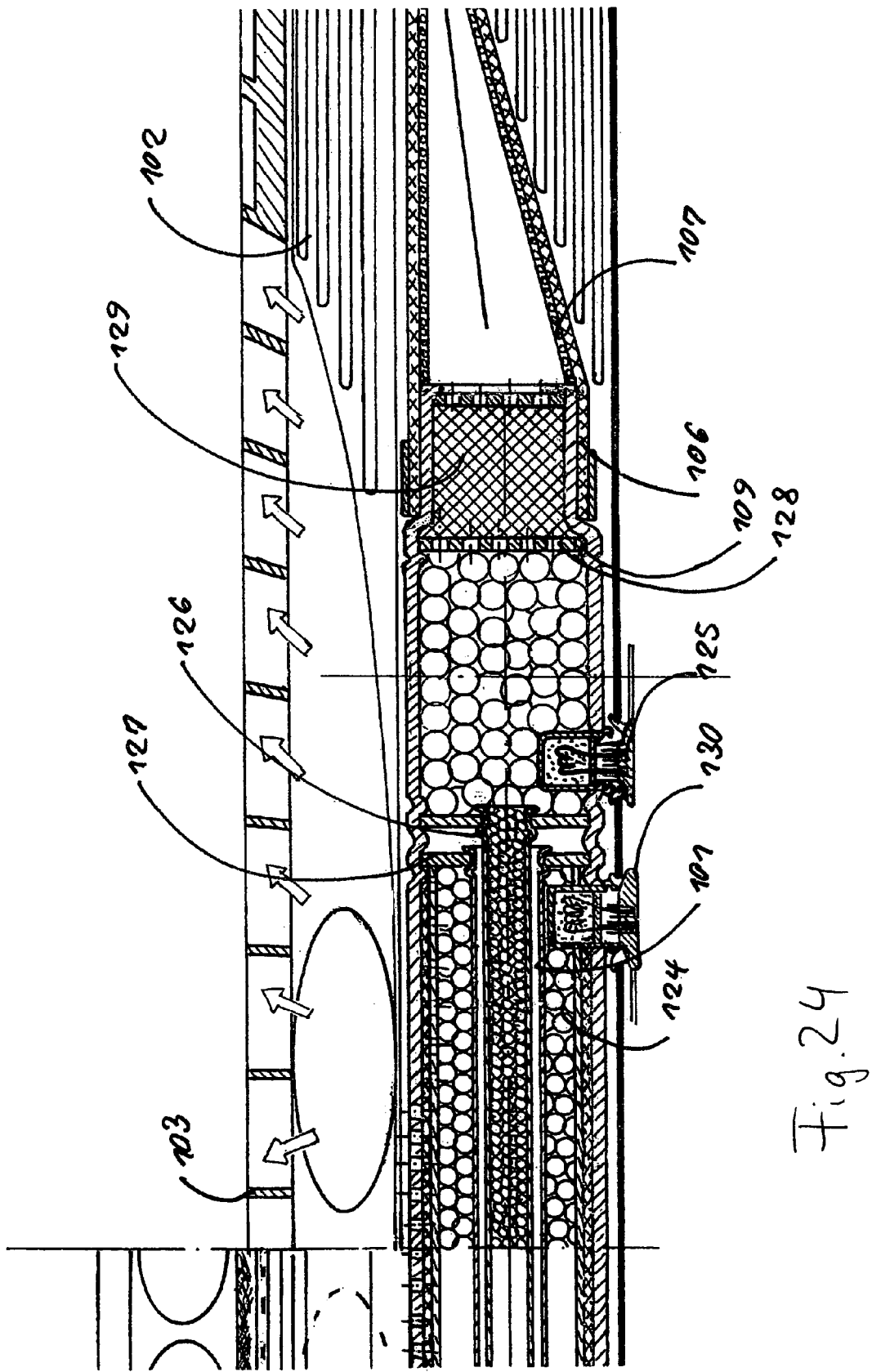
FIG. 24 shows a schematic section of the 10th embodiment of the invention before the ignition of the airbag analogously as it is shown in FIG. 18.

FIG. 24 shows in a detail in a section a generator as alternative embodiment for the layout of FIGS. 18-23. As an advantage, in a small generator in diameter with a second stage 124 which directs its gas directly into the airbag 102 whereas the first stages of the generator 125, sitting on both heads of the generator 101 direct its gas through the hoses 106 directly to the sides of the airbag 102. As an alternative through a connection tube, filled with pyrotechnical pellets, the other side could be ignited automatically retarded without an own ignition 130.

Figure 25:
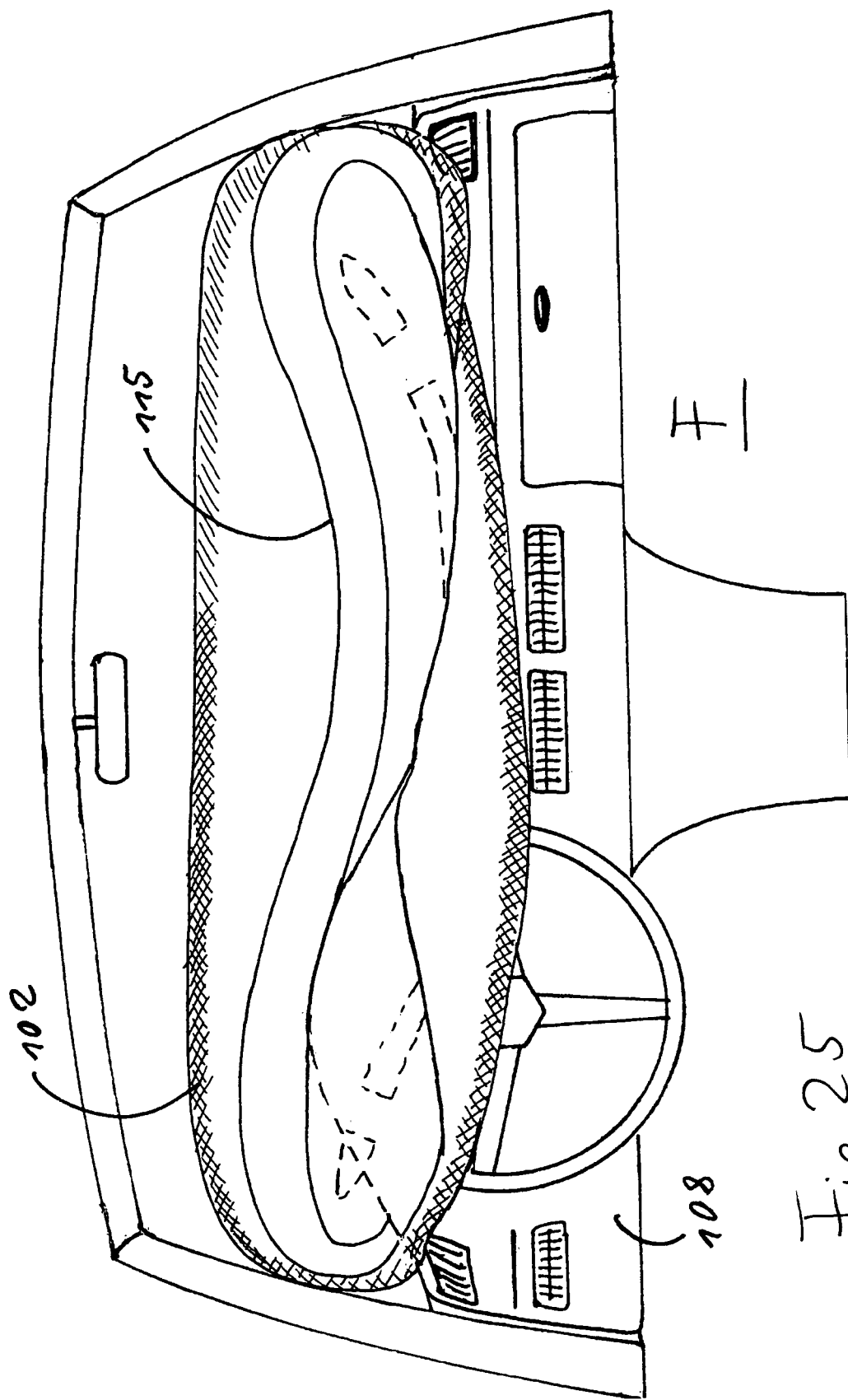
FIG. 25 shows the layout in a car according to FIGS. 18 to 24 during deployment.

FIG. 25 shows the layout of the embodiment 10 with a view to the entire instrument panel 108 and the steering wheel 131 in the beginning of the crash.

Figure 26:
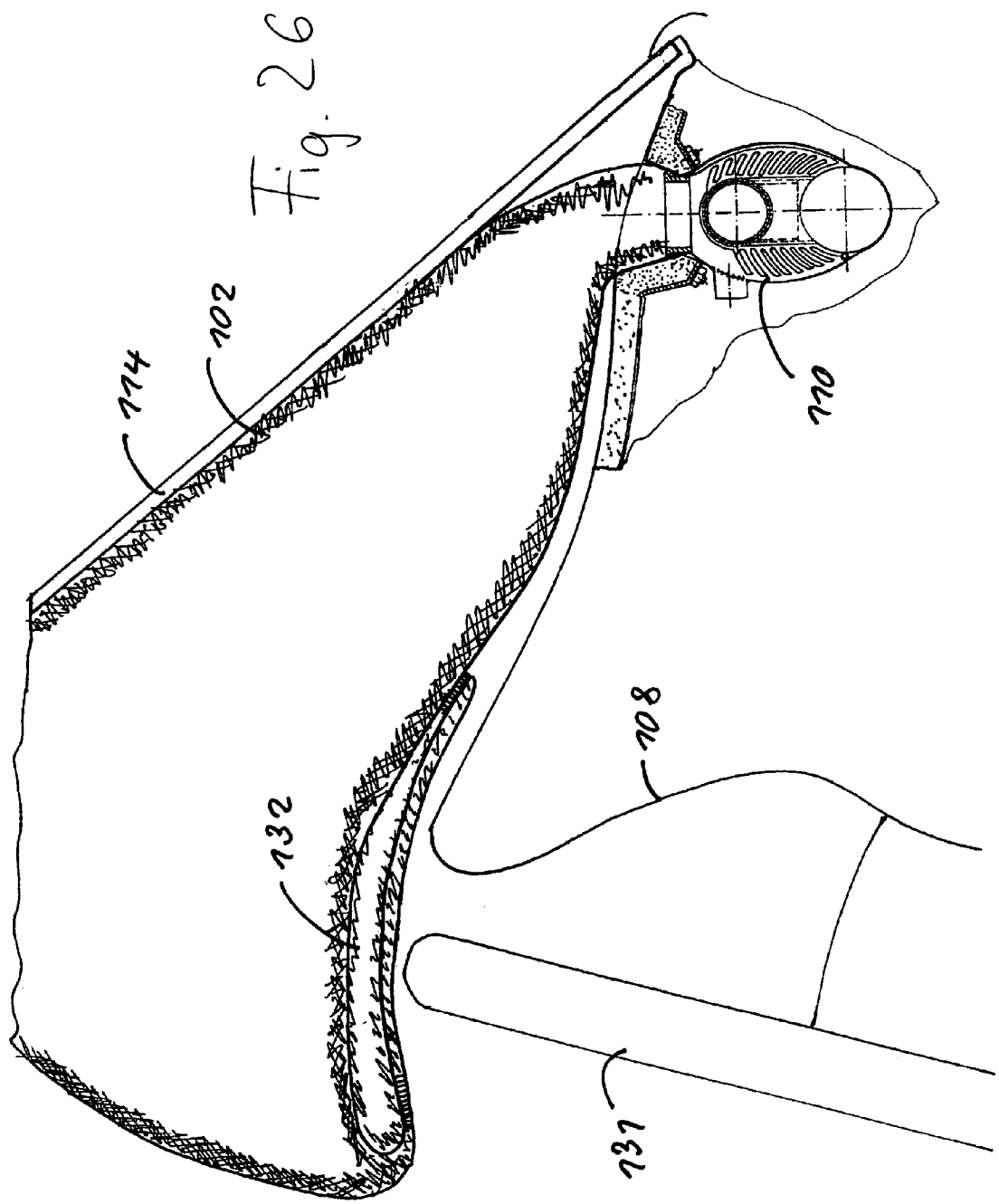
FIG. 26 shows a detail of the invented airbag system during the beginning of the deployment as section on the driver side.
Figure 27:
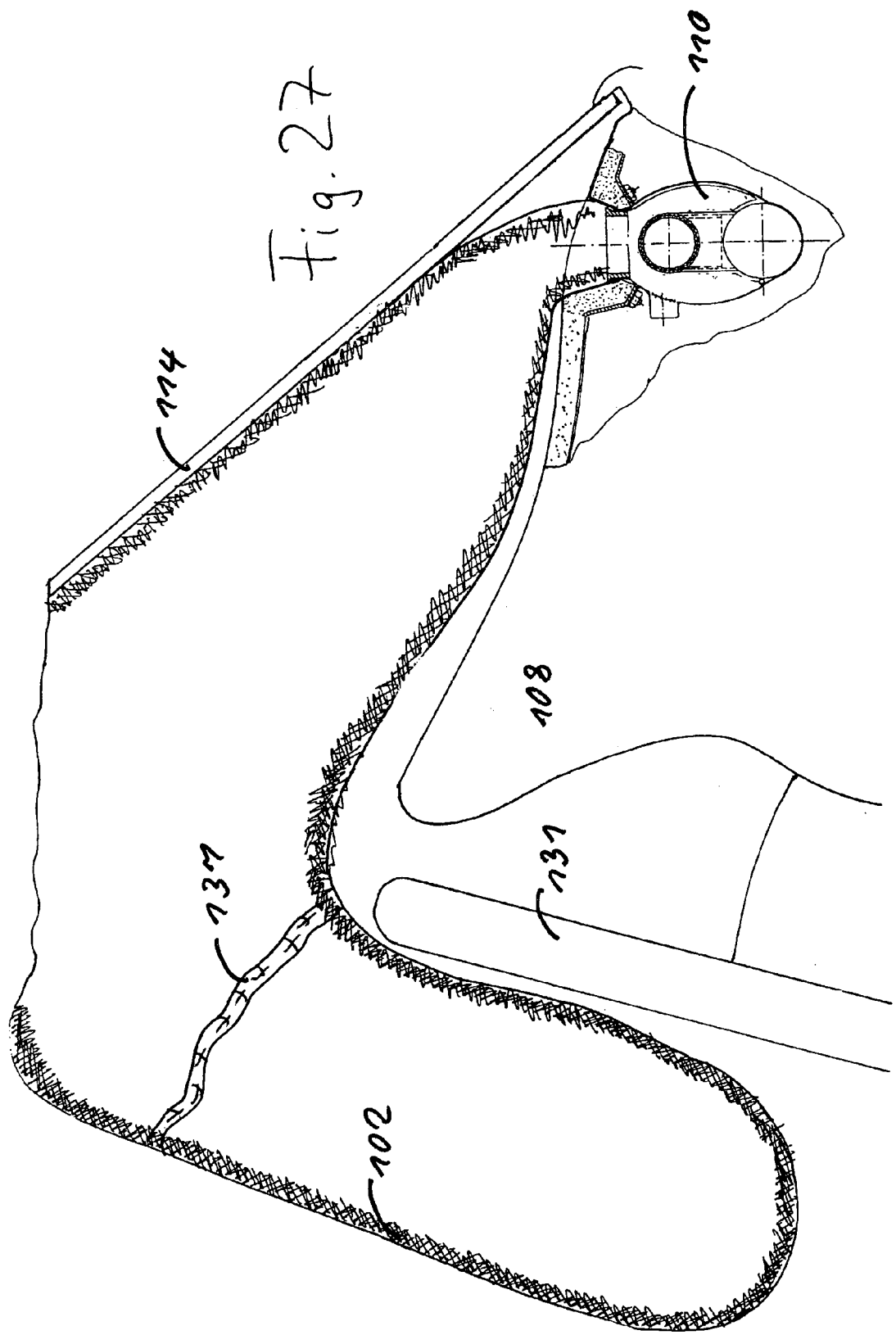
FIG. 27 shows as a detail the invention according to FIG. 18 at a later timing in the deployment than the detail shown in FIG. 26.

FIG. 26 shows as an aspect of embodiment 10 of FIGS. 18-25 to move the airbag down along the steering wheel 131 as soon as the airbag 102 has reached it. Sticking or sewn ribbons guide the airbag 102 as shown and tilt it down like shown in FIG. 27.

Figure 28:
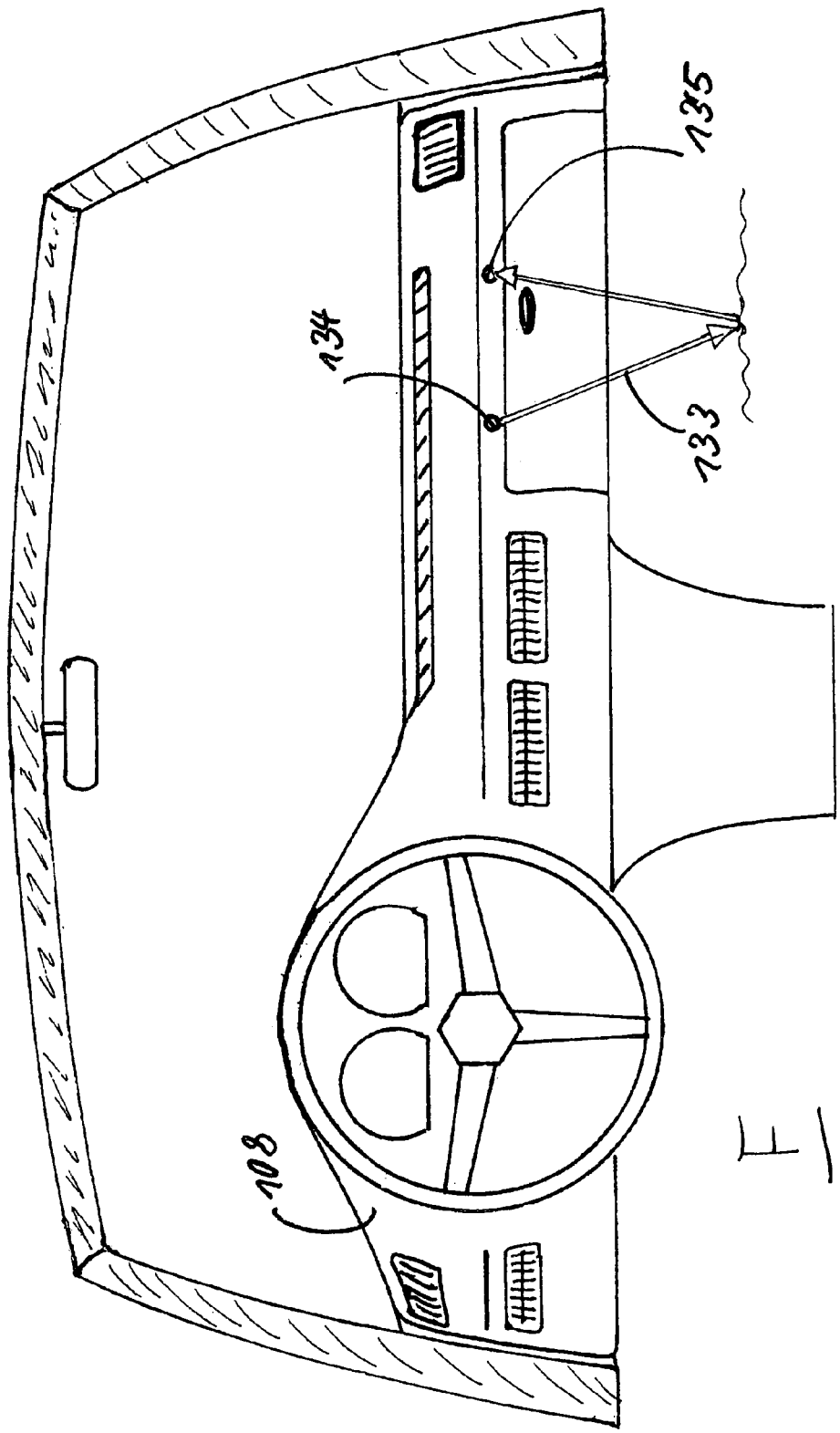
FIG. 28 shows a detail alternatively to be added to all inventions in non aggressive airbags.

FIG. 28 shows a further aspect of the invention. To fulfill the US-law FMVSS 208 the most critical possibility to be solved is a child seat located rearward against the instrument panel 108. Today a high sophisticated seat detection mat switches the airbag 102 off. The seat detection mat also detects heavy and light occupants and children and switches the airbag generator 101 off or ignites one or two stages. With the "active deployment" only a few cars, respective OOP-child seat mountings might need detection and a switch-off of the airbag. A laser infrared or ultra sonic beam 133 is sent between a source 134 and a detector 135. If an OOP-child seat is installed the beam 133 will not reach its detection 135 for a longer period of time. The airbag 102 will be switched off. The beam 133, as well, can be used to detect OOP-occupants. Other detection beams as magnetic fields and electronic capacity techniques are possible. The switch off is combined with a warning signal in the cockpit as usual today.

In the following further embodiments of the "Active Deployment" for passenger, driver and other airbags are presented and explained. The embodiments are not only related to these bags.

The basic background of the "Active defolding" is the use of about 50 bars of gas pressure which can be realized when the gas flow is stopped for one or two milliseconds. This is achieved by a closed tube or hose. Inside these tubes or hoses "corks" are placed. They also can be sewn pieces of hoses. These corks or bullets have enough kinetic energy to pull the bag perpendicular to the bag's usual deployment direction. The purpose is to distribute the deployment base of the bag to a large area and let the bag by pass the OOP occupant to avoid aggressiveness on the base of the bag deployment.

As an alternative to the corks or bullets the hoses can be folded inwards with sewing on the hoses outlet. During crash the hoses will defold to a 2 or 3 times longer length than folded. The sewing will stop the gas for a moment and this creates the force pressure time area. This will pull the airbag perpendicular to the side. After a predetermined pressure peak the sewing will crack and the gas will escape into the pulled "bubbles" of the bag.

For the driver airbag a similar airbag distribution technique is used to distribute the driver bag deployment hose to a non aggressive size.

Figure 29:
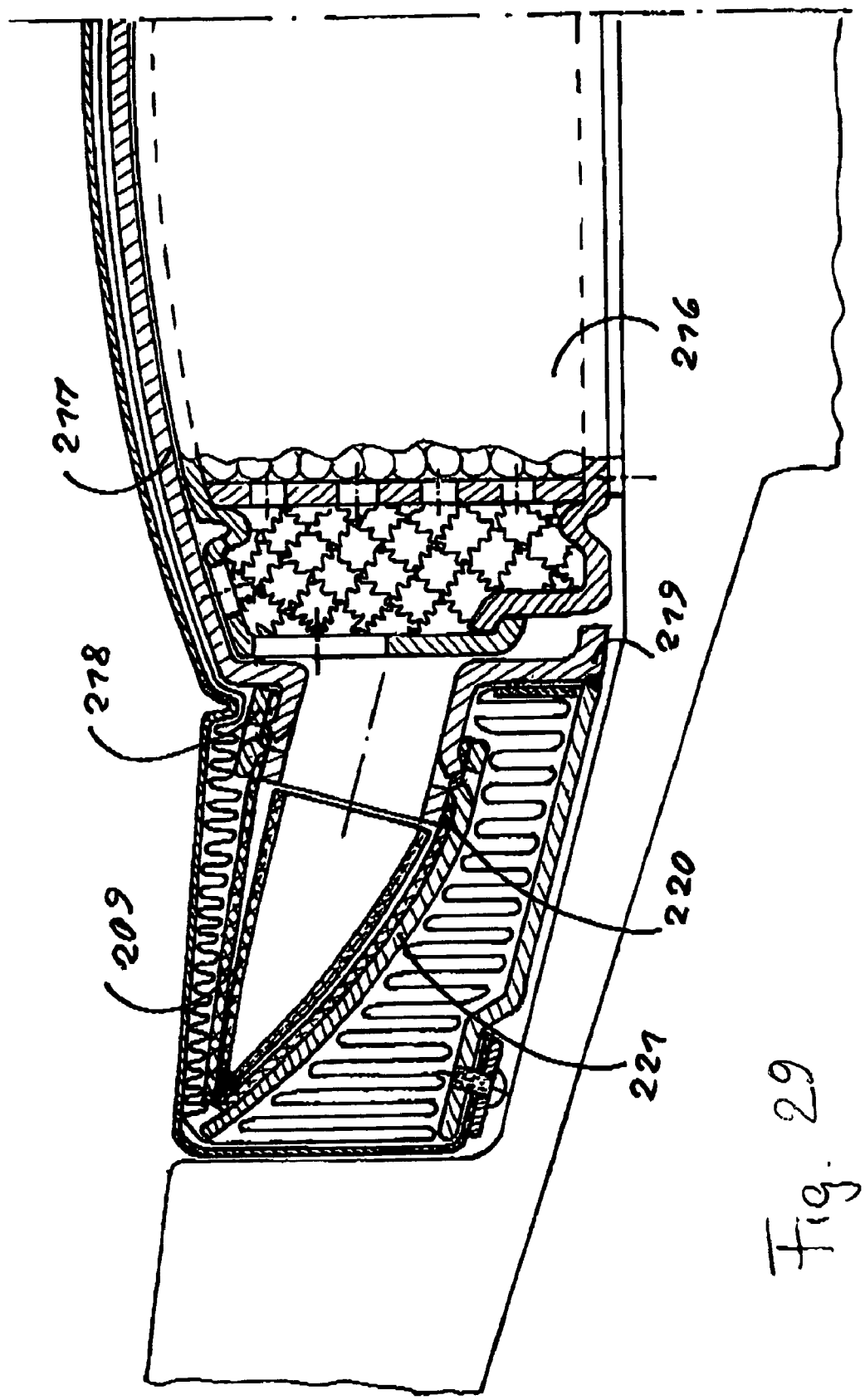
FIG. 29 shows a schematic section of an 11th embodiment of a driver bag before the bag defolds.

FIG. 29 shows a half section of embodiment 11 in a layout. The driver bag generator 212 includes hose connections 218 and hoses 220. This assembly is located in a kind of bowl 217 and, of course, fixed that it can not move. For example, 3 to 6 hoses 220 are fixed to the bowl 217. Inside the hoses are the blow out hoses 209 closed on their ends.

Figure 30:
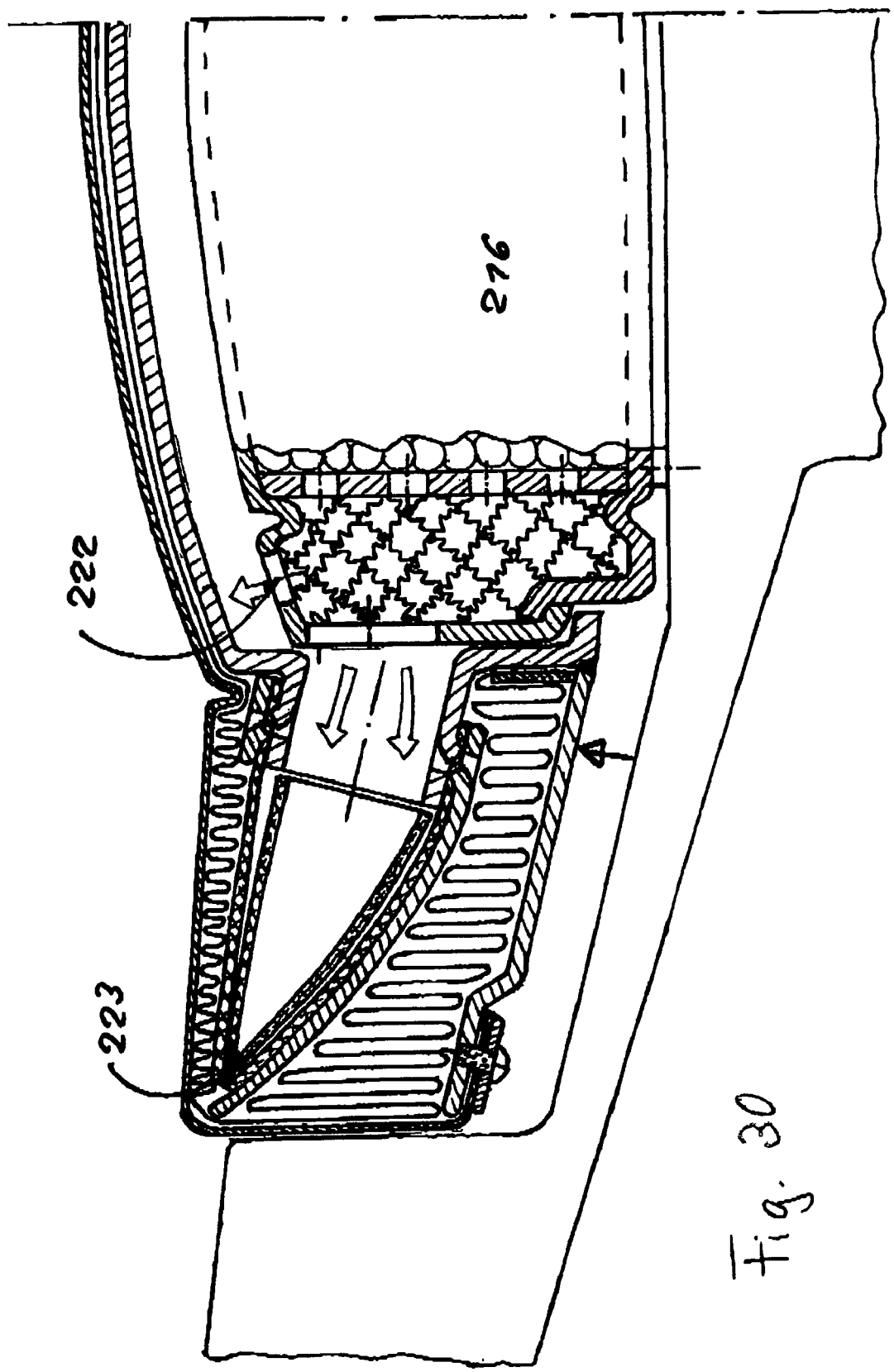
FIG. 30 shows a schematic section of the 11th embodiment after the gas is ignited.

FIG. 30 shows the start of the crash. The bowl 217 with the hoses 220 is lifted by the pressure from the generator 216.

Figure 31:
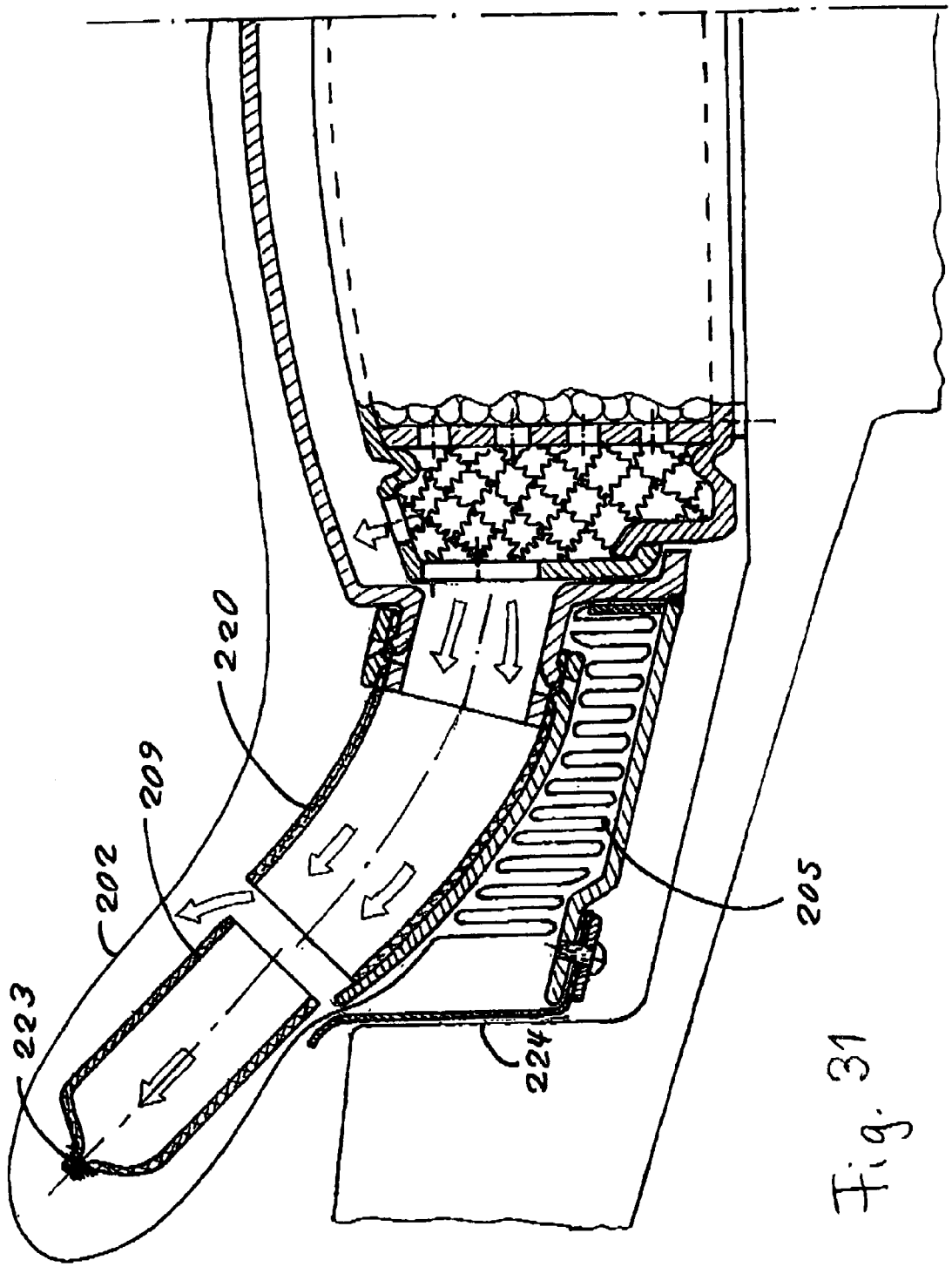
FIG. 31 shows a schematic section of the 11th embodiment at the beginning of the airbag deployment.

FIG. 31 shows the next step. The hoses 220 are blown up by the gas, cut the cover skin 224 and the blow out hoses 209, push the textile of the airbag 202 parallel to the surface of the steering wheel 223 to a larger diameter like a tissue out of its box. The cover skin 224 is perforated in line and perpendicular with the hoses. When they are blown up the cover skin 224 will break—one factor for low aggressiveness. The other factor is the large size of the beginning deployment.

Figure 32:
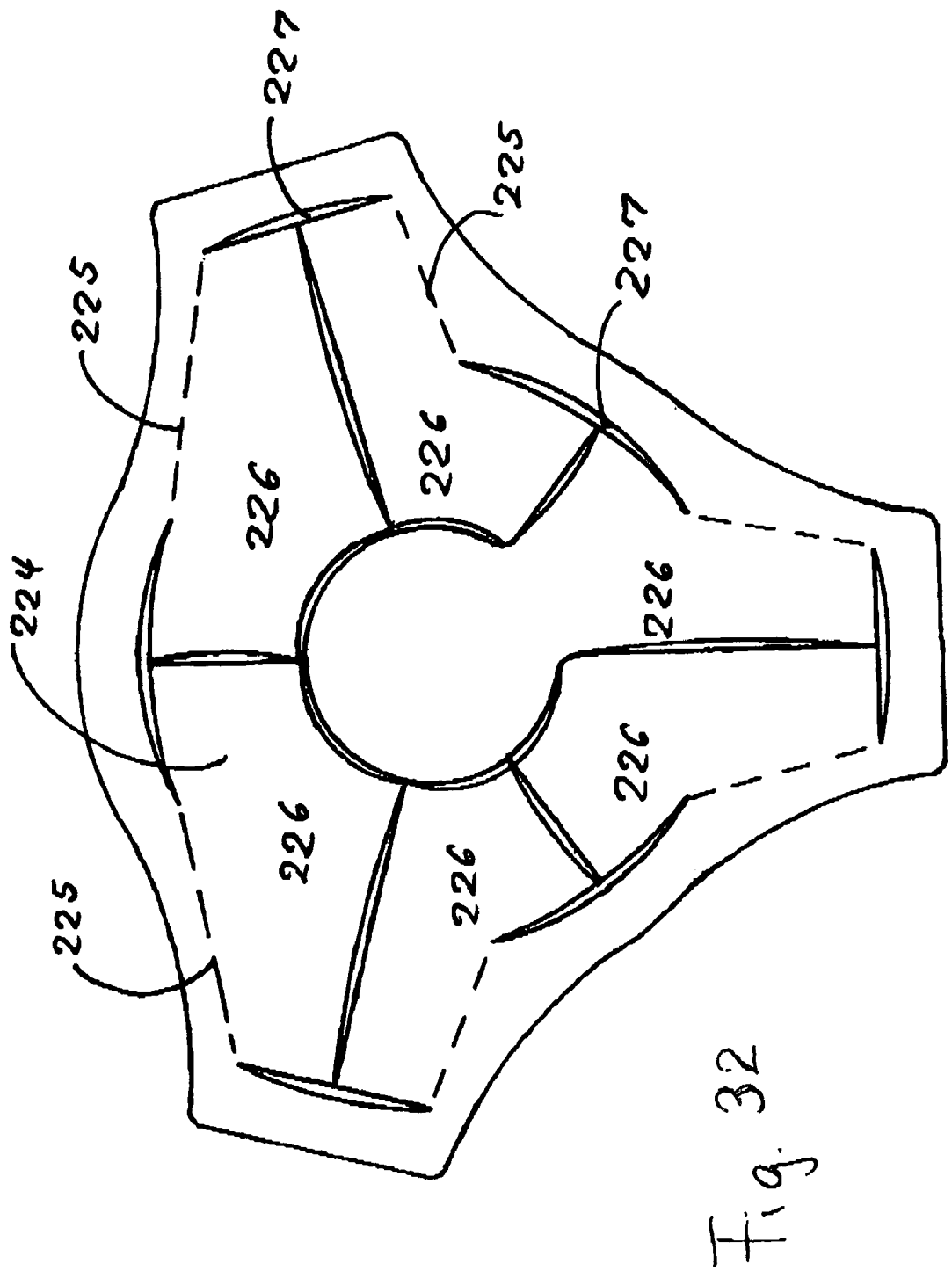
FIG. 32 shows the deployment of all driver bag active deployments (embodiments 11, 12 and 13) to "pre open" the airbag cover.

FIG. 32 shows for embodiments 11, 12 and 13 for a steering wheel 223 with 3 spokes with 6 gas distribution hoses 220. The just cracked cover skin 224 shows the segments 226. The dotted lines are the joint lines around which the segments 226 will tilt.

Figure 33:
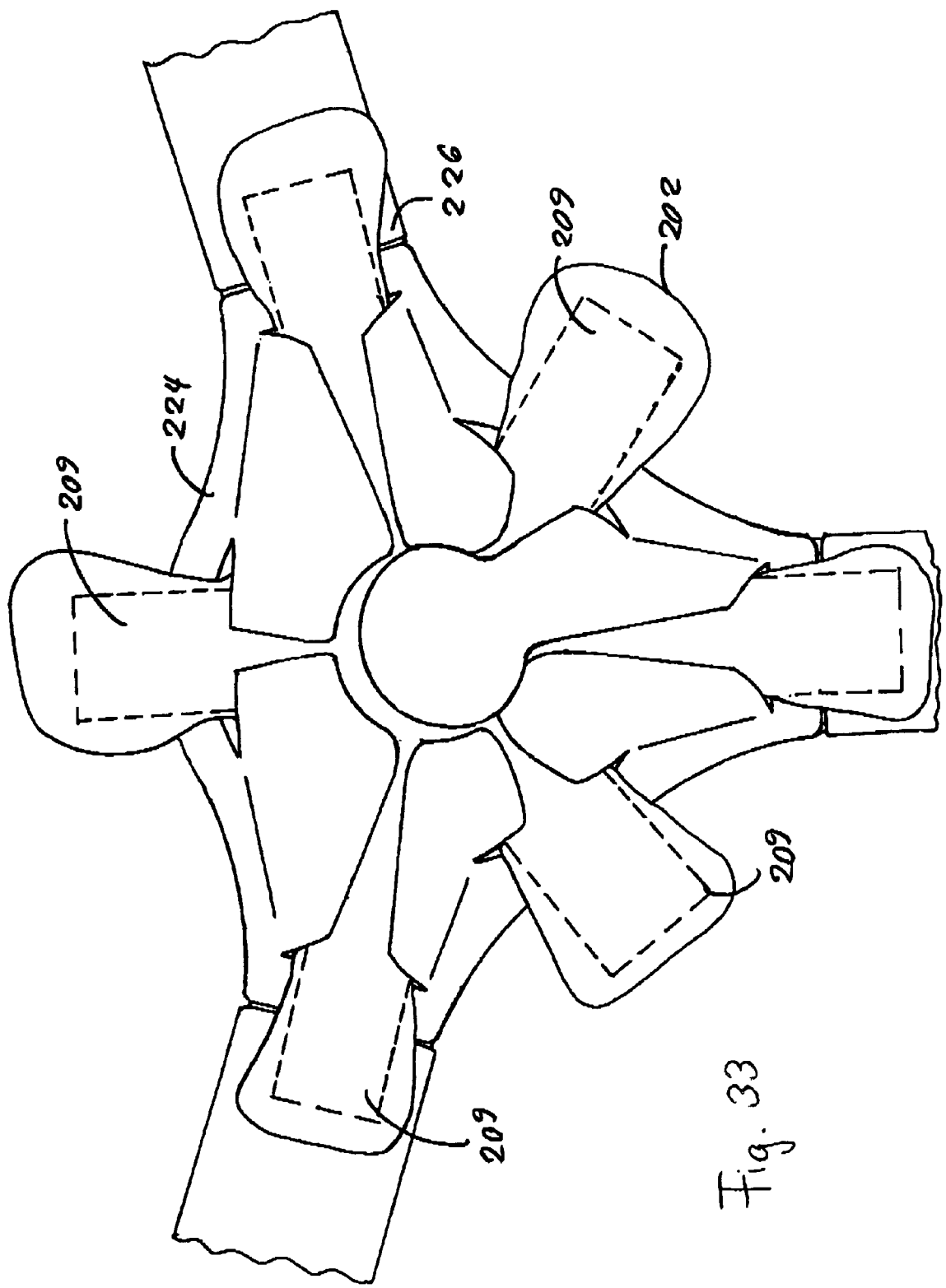
FIG. 33 shows the deployment of all driver bag active deployments (embodiments 11, 12 and 13) at a later state as early state of final airbag deployment.

FIG. 33 shows the next step of the crash shown in FIG. 32. The cover skin 224 is open and the hoses 230 (FIGS. 34, 35) come through. They will move the textile of the airbag 202 to a larger diameter. The blow out hoses 209, FIGS. 30, 31 are another alternative.

FIG. 34 shows a 12th embodiment. A gas distributor 229 is mounted on top of a driver bag generator 216. Instead of blow out hoses 209 tilted in, hose ends 230 are closed by sewing on the ends. The gas pressure will shoot the tilted in hose ends 230 to the outside to crack the cover skin 224 and enlarge the diameter of the deployment base of the driver bag 228. FIG. 34 shows the assembly before the crash. FIG. 35 shows the driver bag ACTIVE DEFOLDING technique during crash. FIGS. 32, 33 show, as well, the bird's view.

Figure 36:
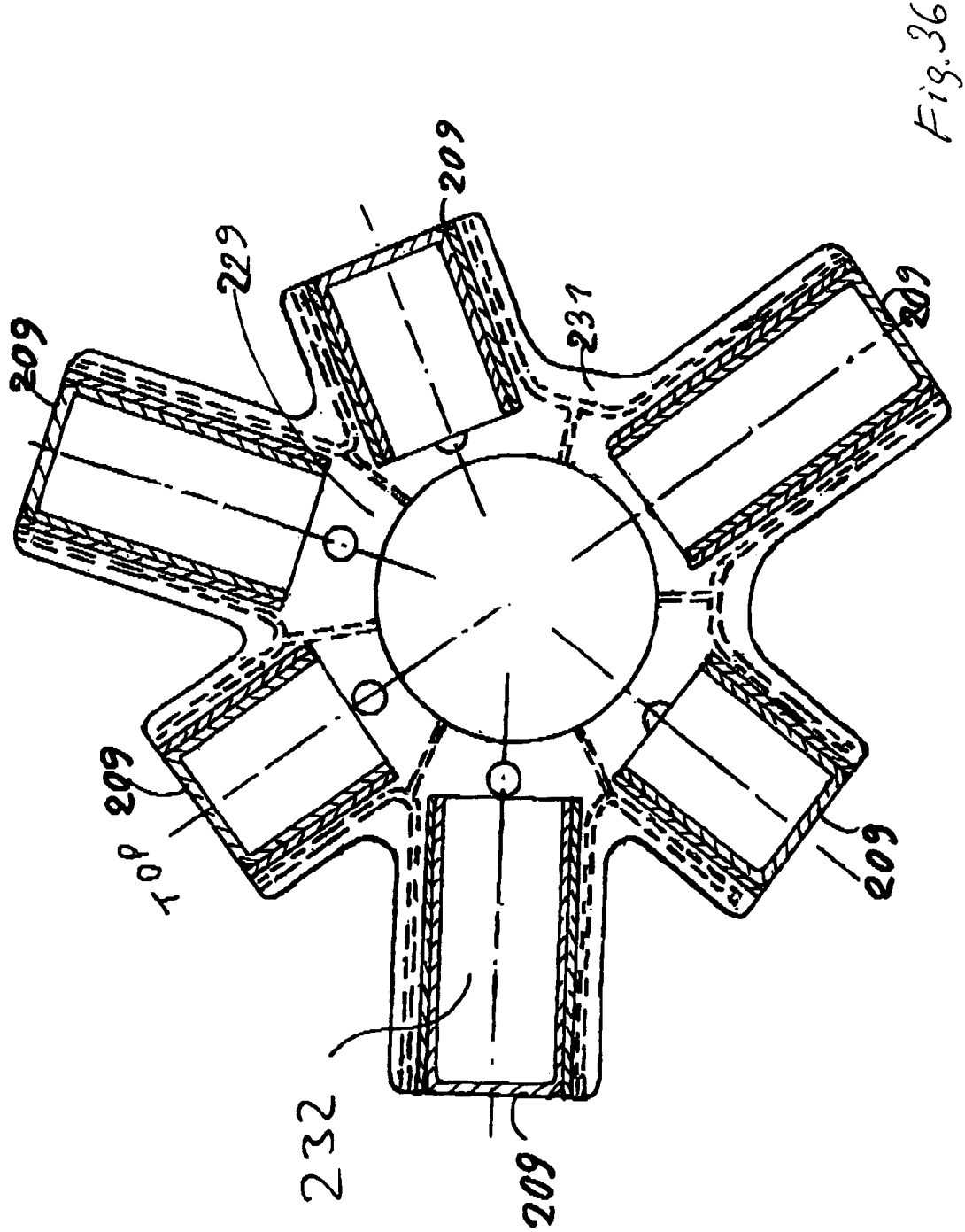
FIG. 36 shows a schematic of a 13th embodiment of the driver bag with "active defolding" before crash.

In FIG. 36 embodiment 13 is shown where the hoses 220 are replaced by to half of textile 231 which are sewn together. The blow out hoses 209 are located inside the gas distribution channels 232.

Figure 37:
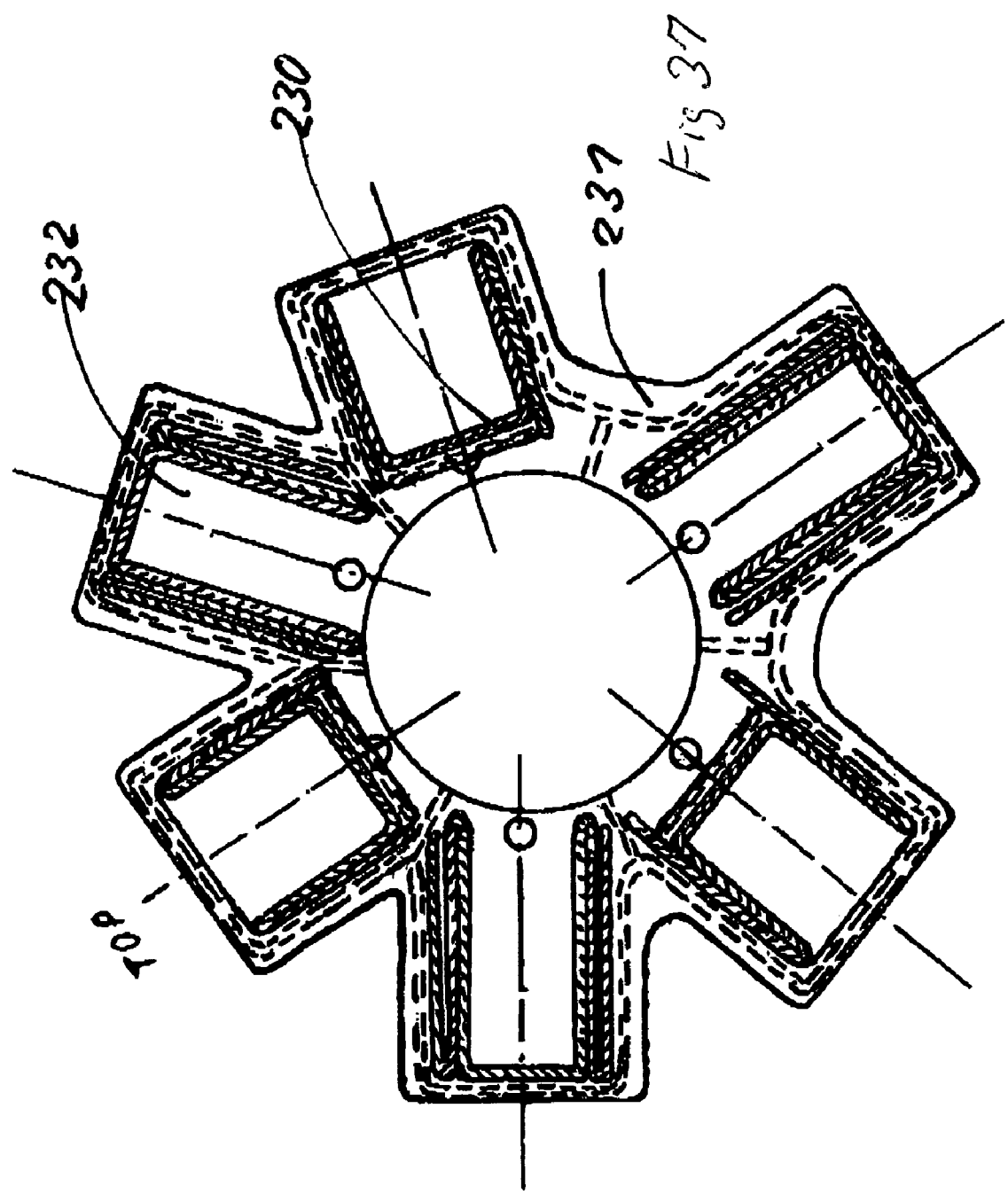
FIG. 37 shows a schematic section of a 14th embodiment of the driver bag with "active defolding".
Figure 38:
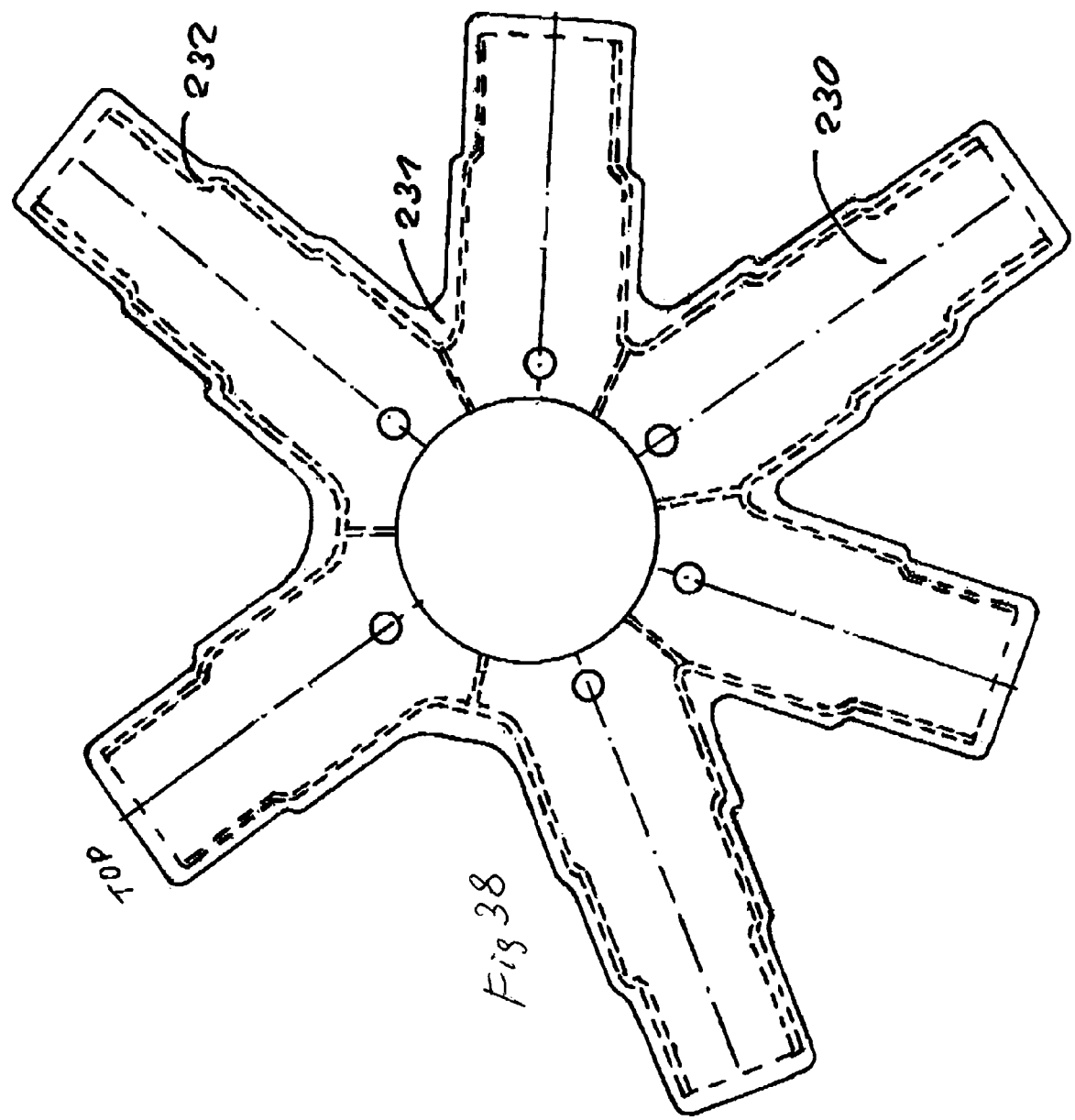
FIG. 38 shows a schematic section of the 14th embodiment (FIG. 37) as sewn piece.

FIG. 37 shows embodiment 14 where the gas distribution channels 232 are closed on their ends by sewing (FIG. 38) and the ends of the gas distribution channels are tilted in FIG. 37 and will be blown out during the beginning of the crash (FIGS. 32, 33).

Figures 39, 40:
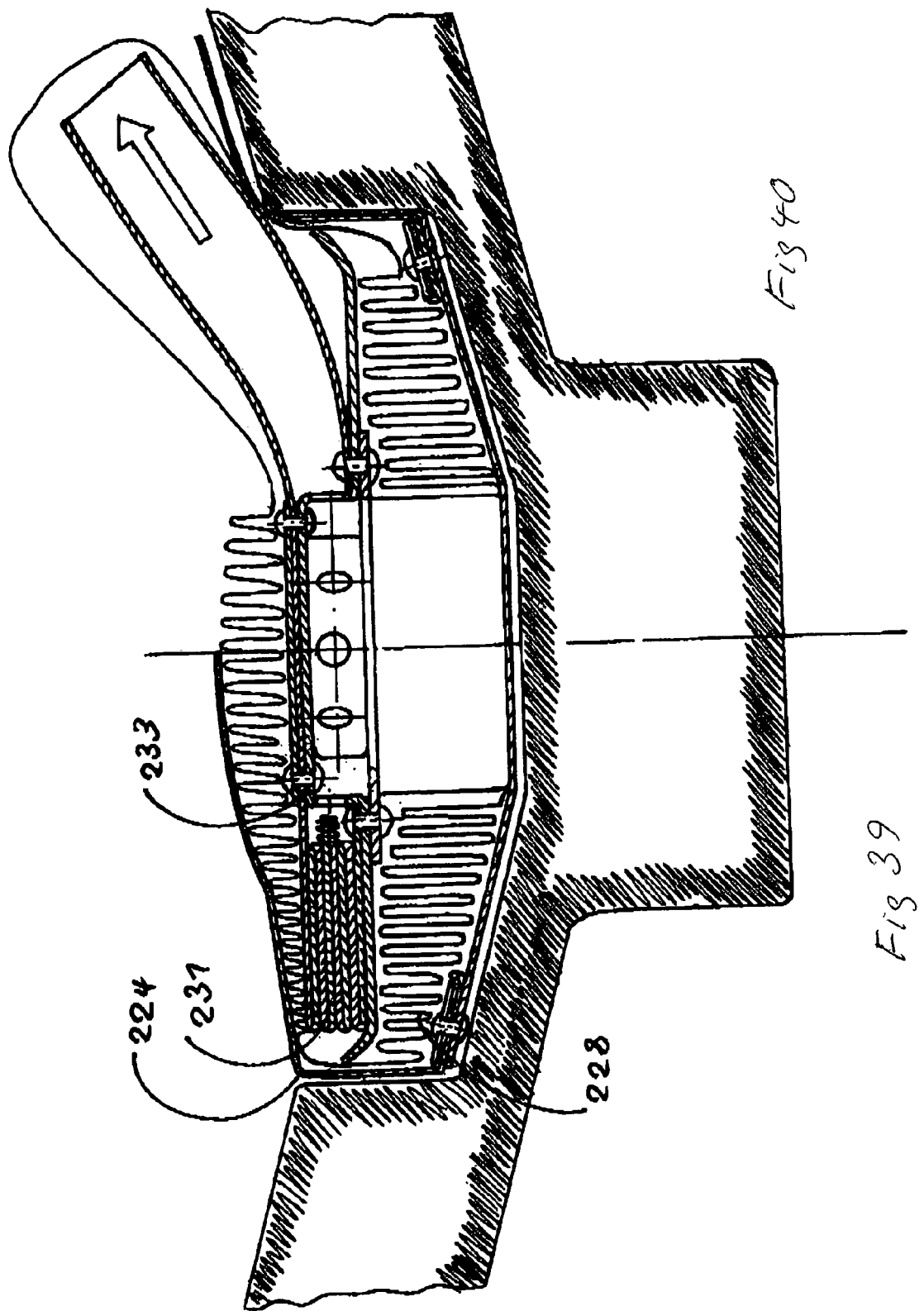
FIG. 39 shows a schematic section of the driver bag assembly as 14th embodiment (FIG. 37) before crash.
FIG. 40 shows a schematic section of the 14th embodiment after igniting the driver bag in the beginning of the defolding.

FIG. 39 shows a section through the assembly of the driver bag 228 from FIG. 37.

FIG. 40 shows the tilted out textile half moving the airbag to a larger diameter and cutting the cover skin 224.

Figure 41:
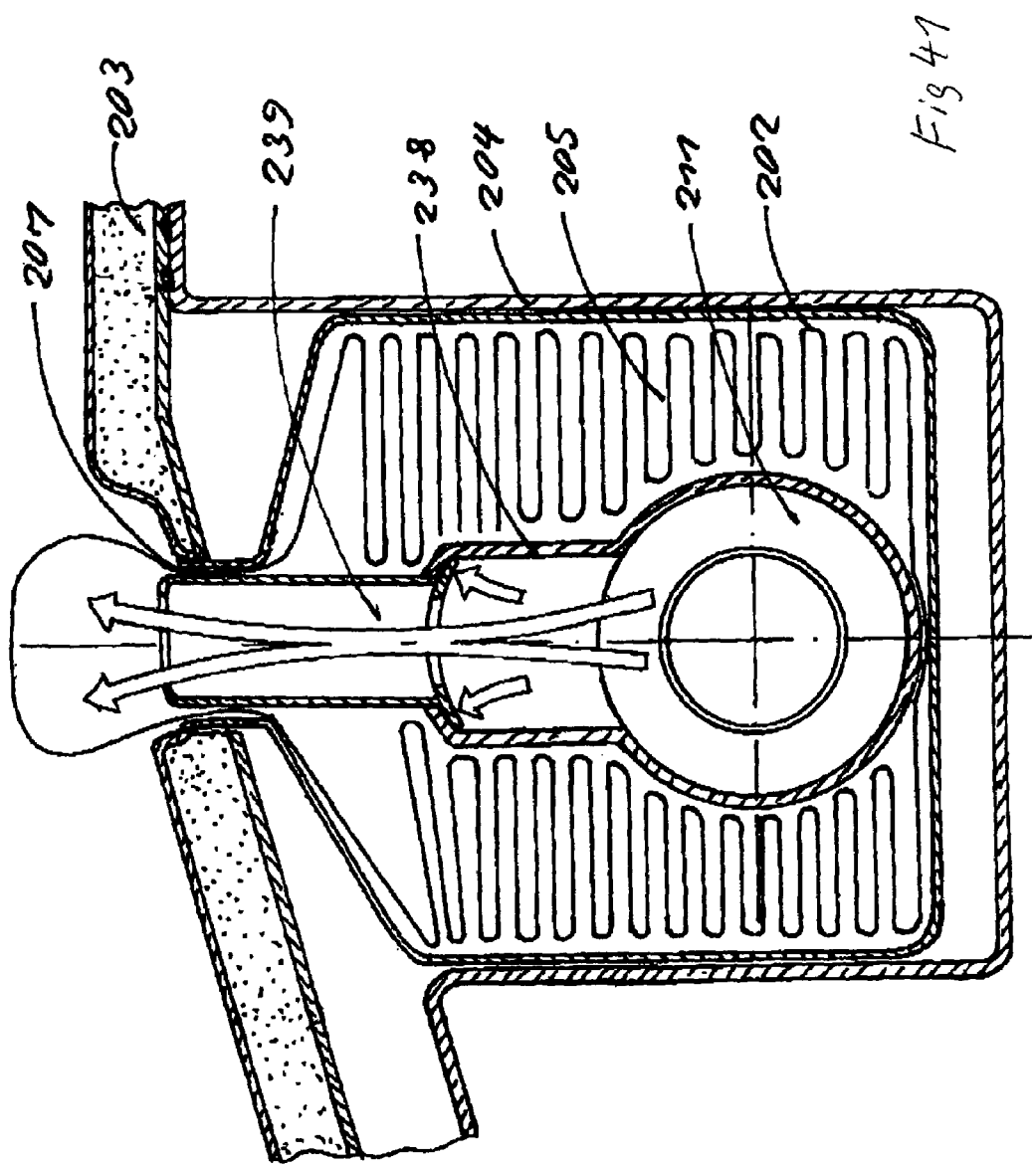
FIG. 41 shows a schematic section of a 15th embodiment during the early stage of defolding the airbag.

FIG. 41 shows a 15th embodiment of the passenger bag 202 in a channel 204 underneath a windshield defogging grid 206. The gas channel 239 is moved to the outer surface of the instrument panel 203 by telescope tubes and the airbag 202 is pulled out through a small defroster slot like a paper tissue out of its box. Based on this technique the instrument panel 203 will remain intact after the crash. This is positive for insurance class rating.

The invention creates an airbag module where the gas pressure is used to open lids or covers first. Next it moves the airbag to a large diameter, to achieve low aggressiveness. Therefore the gas has to be stopped for a moment to build up the necessary gas pressure. After these "stops" are taken away, the gas flow will be guided into the airbag on a large surface on the outer rim. Several embodiments for this "guide" are possible: tubes, hoses, channels, corks, bullets, sewn and tilted in textiles and so forth. The tubes, hoses etc. lift covers, grids etc. without destroying the instrument panel. Because all these elements pull the textile of the airbag and not push it—it will move through a small slot like a paper tissue out of a box.

The air duct and the airbag module can have one assembly in one package space for "double" use.

The layout depends mostly on the package requirements. The gas distribution hose might be an elongation of the airbag generator or it may be placed parallel to the generator. For driver gaps it might be placed around the generator or on top of it on a gas distributor.

The perpendicular textile distribution of the bag can be achieved with tilting out hoses closed by sewing on their ends or by corks or bullets (closed hose ends).

The distribution elements most times also cut the cover skin to lower the aggressiveness and have the base for the predetermined deployment of the guide bags (hoses, tubes etc.).

Just to save the instrument panel during a crash the minimum is a telescopic gas channel system, which moves the gas outside the instrument panel and pulls the airbag through the small defroster slot. This system is used when the airbag is located directly in front of the passenger bag.

If the airbag has to be moved sideways tilting out hoses, telescopic tubes or corks or bullets are needed to move the textile of the airbag.

Not all the gas must be used for the ACTIVE DEPLOYMENT. A part of it might move directly into the airbag to deploy it.

Looking to the driver bag it might have a gas distributor housing with tilt in hoses, hoses with corks or (not shown) with telescopic tubes with hoses on their ends.

Also the hoses might be located on a "bowl" to be lifted up into the proper shooting direction.

The most favorite solution is sewn or glued together textile like a sea star with "legs". The legs are tilted in and folded into the airbag. The ends are closed by sewing. After blowing up this "star"-guide bag will crack the cover skin, will move the airbag to a larger surface, the ends will open by cracking the sewing and the gas will escape on the outer diameter of the airbag base for a non aggressive deployment.

The results are up to factor 5 (!) taking the aggressiveness down. This technique needs no OOP electronics, no switch off airbag, no multi step gas generators, no weight detection and the else.

Figure 42:
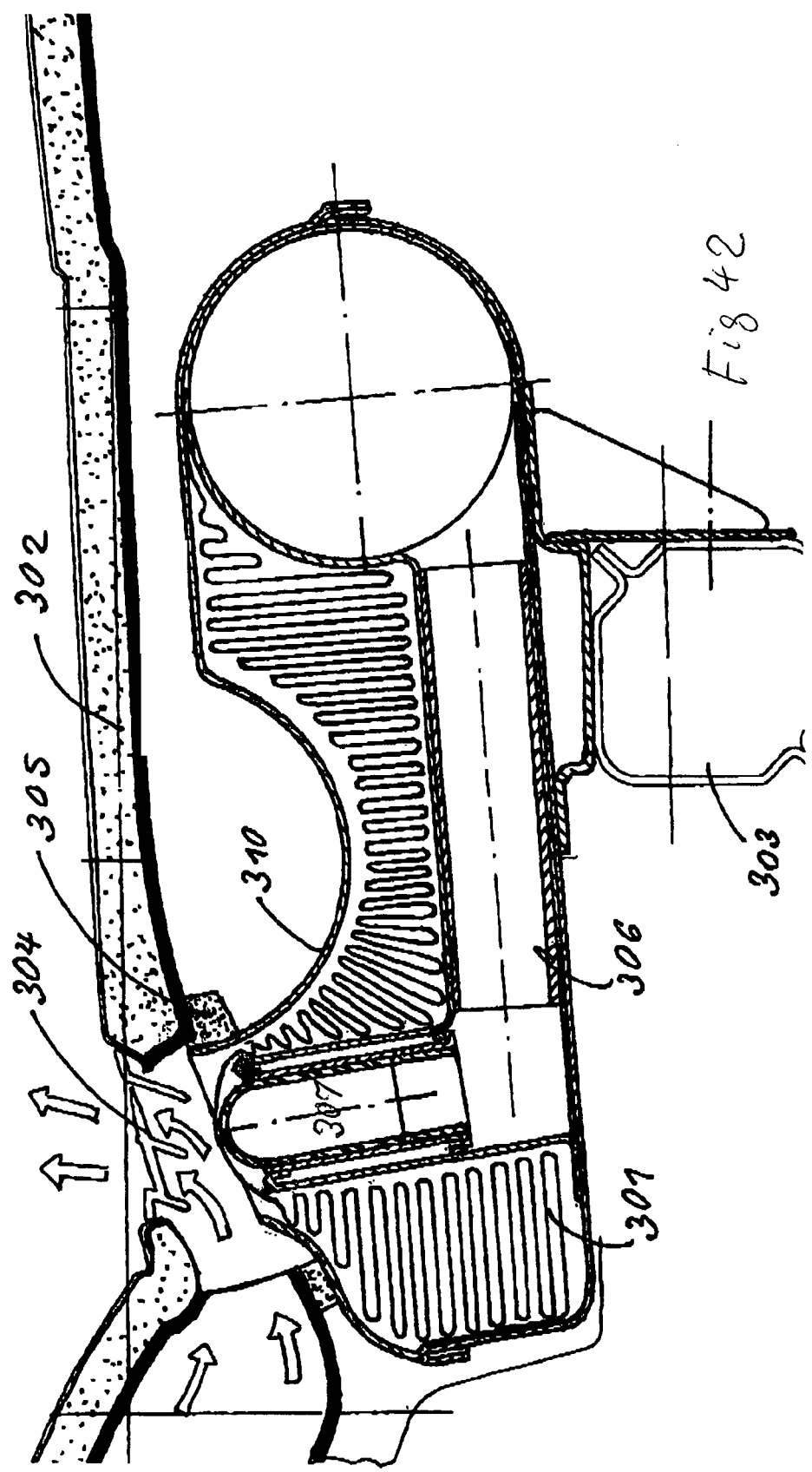
FIG. 42 shows a schematic section of a 16th embodiment before crash.

FIG. 42 shows a 16th embodiment of a passenger bag when the package requirements are very difficult. The module 301 is located between instrument panel shell 302 and instrument panel cross member 303. The module 301 is screwed on through the defroster channel 304 from the outside and sealed 305. The angular gas channel 306 eliminates pressure in the module 301 during crash. During crash the telescope tube will move the gas pressure up to the surface of the instrument panel. The airbag is moved around a circular guide sheet metal 310 to be pulled out quickly with low resistance.

Figure 43:
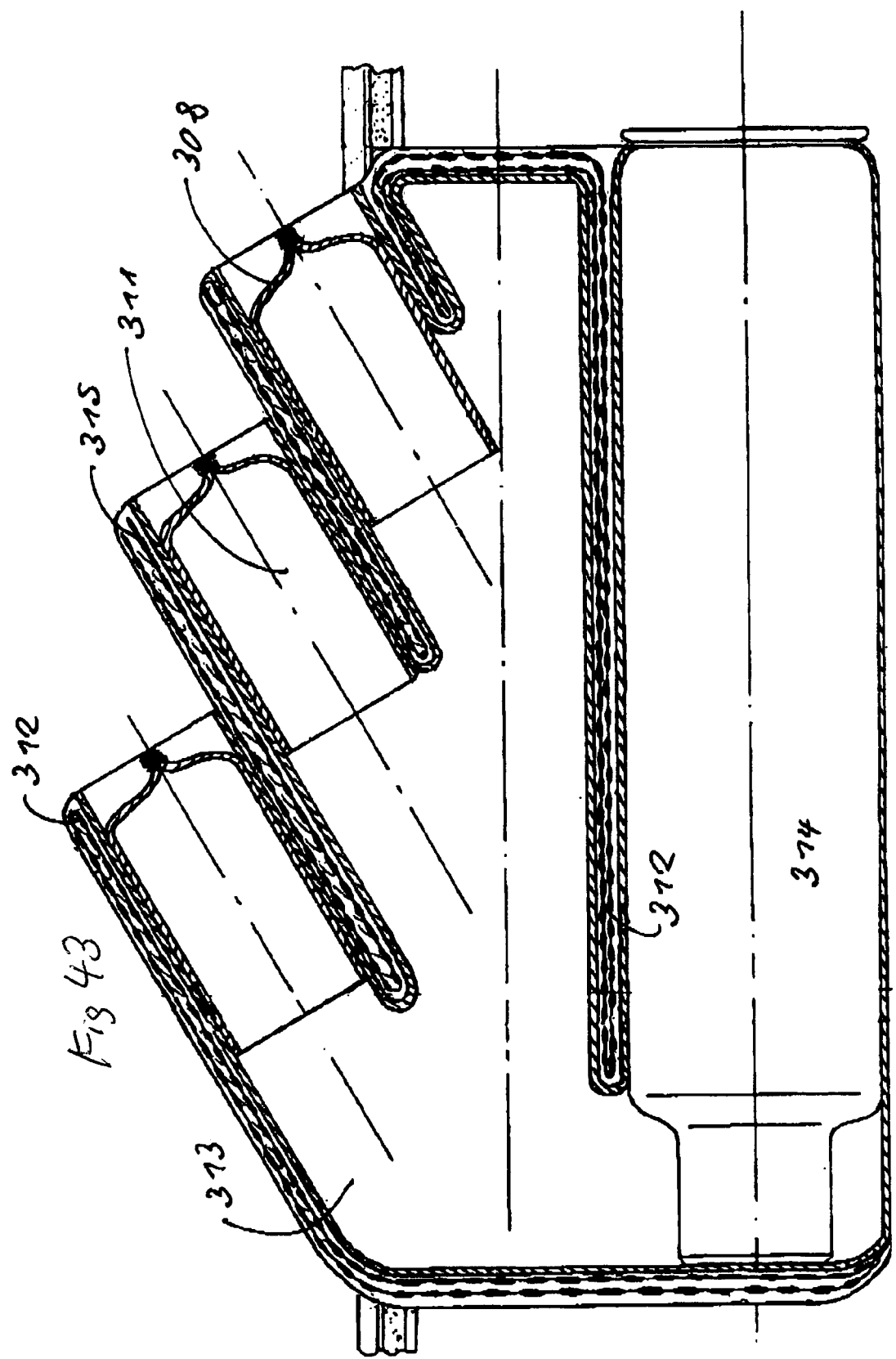
FIG. 43 shows a schematic section of a 17th embodiment of the invention "active defolding."

FIG. 43 shows a 17th embodiment. A further possibility to move the gas from module 301 outside the instrument panel 302 are hoses 311 which are manufactured sewing 312 which are part of the sewing around the generator 314 out of one textile sheet 313. The tubes 311 can house bullets 308 or tilted in hoses, both shown in former and future embodiments.

Before the crash the hoses are folded together underneath the defroster slot 207. During crash the pressure of the gas defolds the hoses and lifts them up. The textile needs reinforcements 315 between the hoses, otherwise the gas pressure would put the bag underneath the instrument panel.

Figure 44:
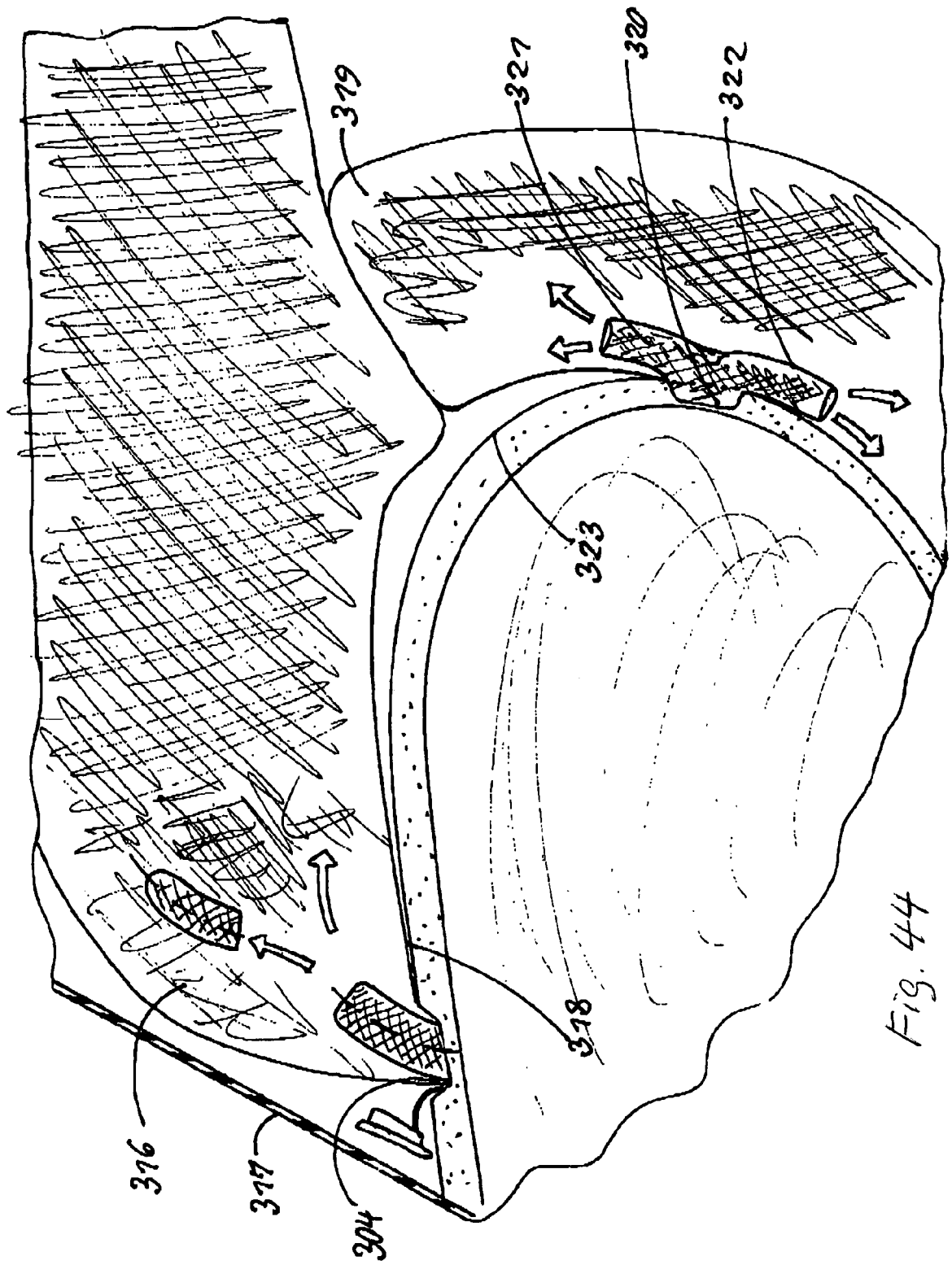
FIG. 44 shows a schematic section of an 18th embodiment of the invention.

FIG. 44 shows an 18th embodiment. Here the passenger bag consists out of an upper airbag 316 for example out of the defroster slot 304. The upper airbag 316 defolds between windshield 317 and instrument panel like a wall. It protects the upper area of the occupant. A second airbag, a lower airbag 319 deploys out of the opening behind a molding 320. The guide bag 321 is manufactured with its included sewn and tilted in hoses 322 for example in a manner that a small portion of the airbag will be pulled upwards, a larger section will be pulled downwards. The upper section will soften the upper cover of the instrument panel 323. The larger part of the lower airbag 319 will protect the knee area.

Figure 45:
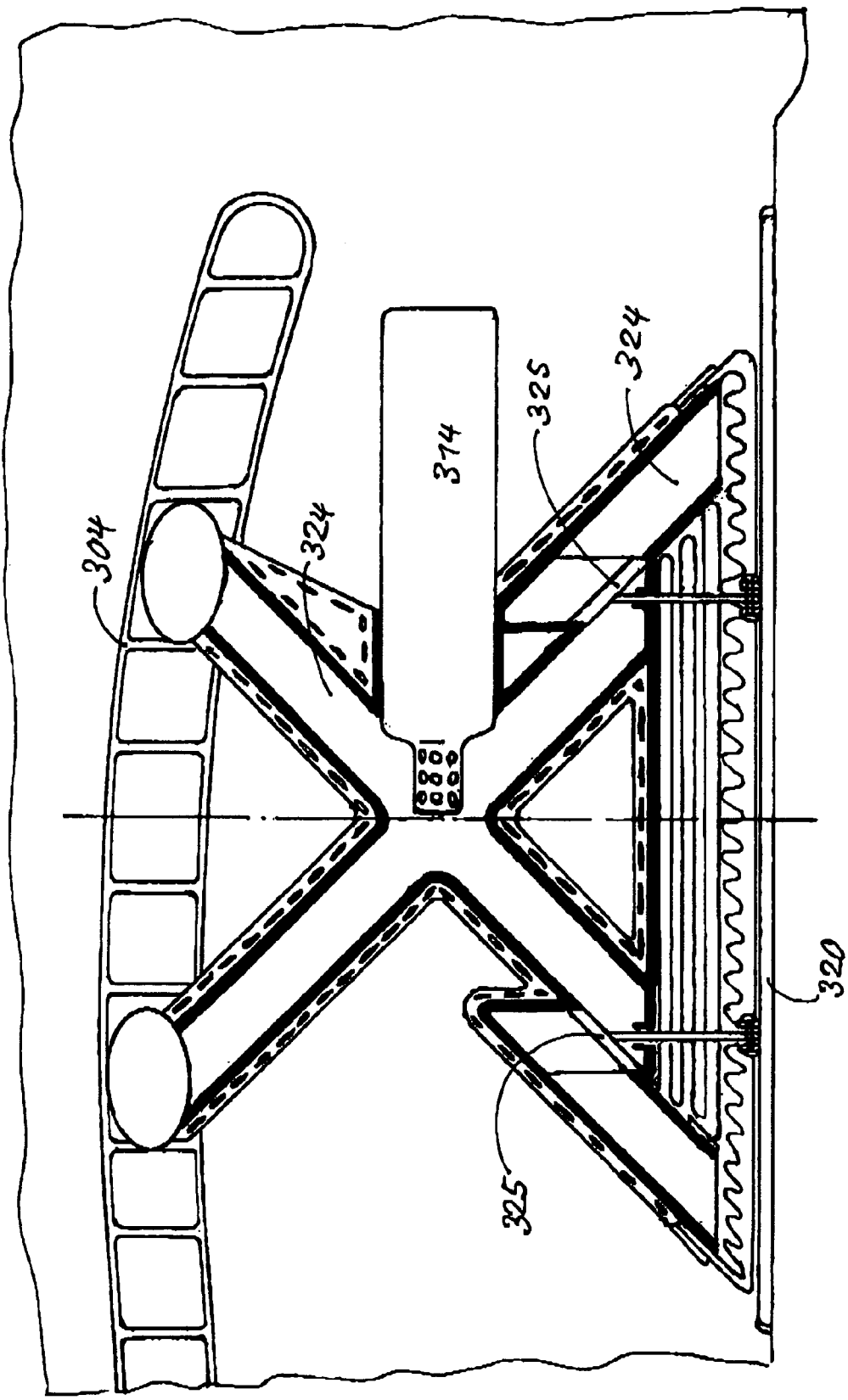
FIG. 45 shows a schematic layout of the 18th embodiment as a 19th embodiment.

FIG. 45 shows a schematic layout of the passenger bag system with the two airbags 316 and 319 and as a 19th embodiment to supply both airbags 316 and 319 with one generator 314 for cost reasons. The generator 314 is connected with channels 324 to the defroster channel 304 and the intake of the airbag 316. The channel 304 to the molding airbag 319 is closed by a piston valve 325. During opening by the gas pressure it will tilt the bag molding 320 as a so called ACTIVE DOOR and open the gas flow to the lower airbag 319 behind the molding.

Figure 46:
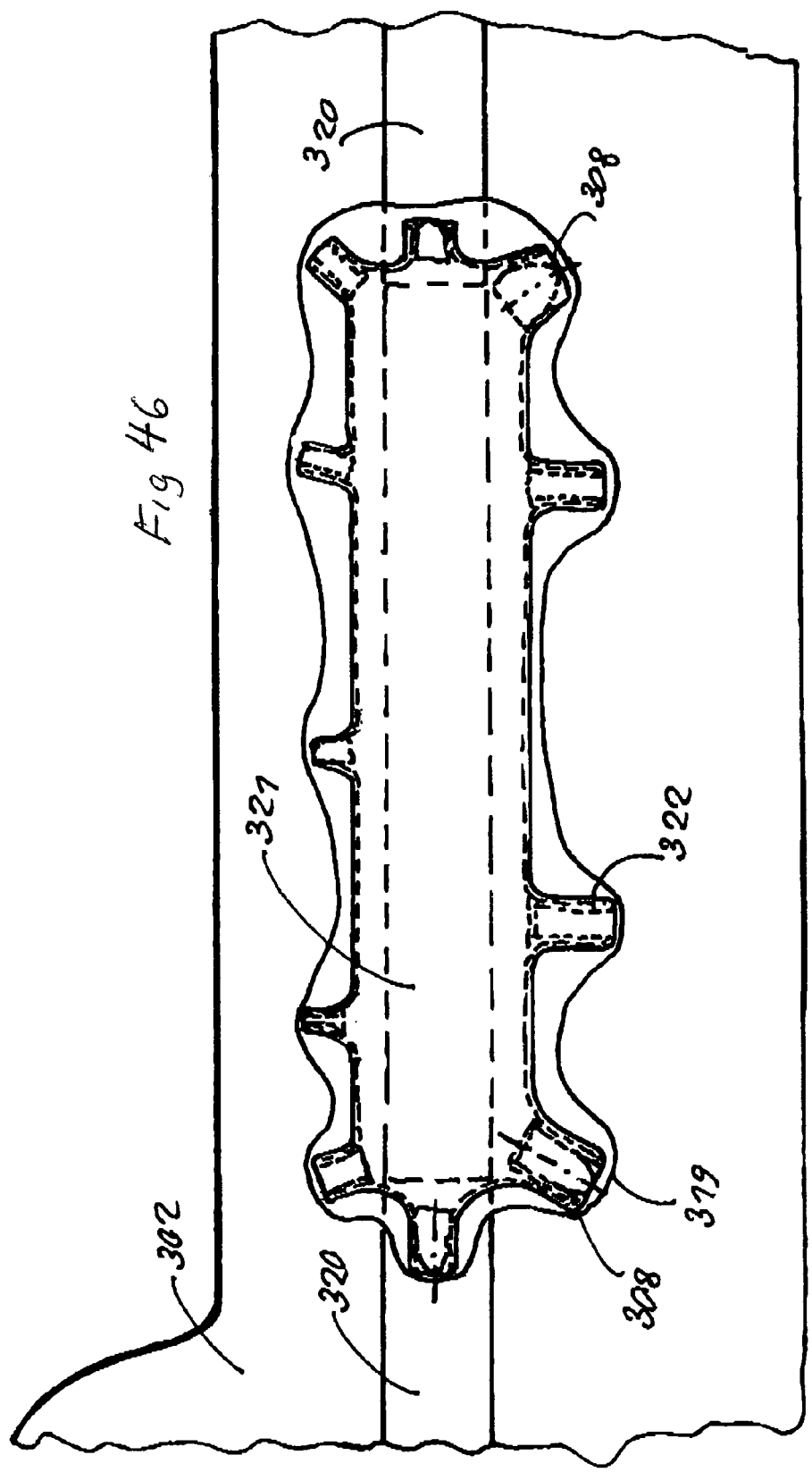
FIG. 46 shows a schematic "bird's view" of the lower bag of the 18th embodiment (FIG. 44) in the beginning of the crash period.

FIG. 46 shows as a frontal view the guide bag 321 with the sewn hoses tilted in or loaded with corks in the moment when the molding 320 has been pulled the bag and the guide bag 321 starts to exit.

Figure 47:
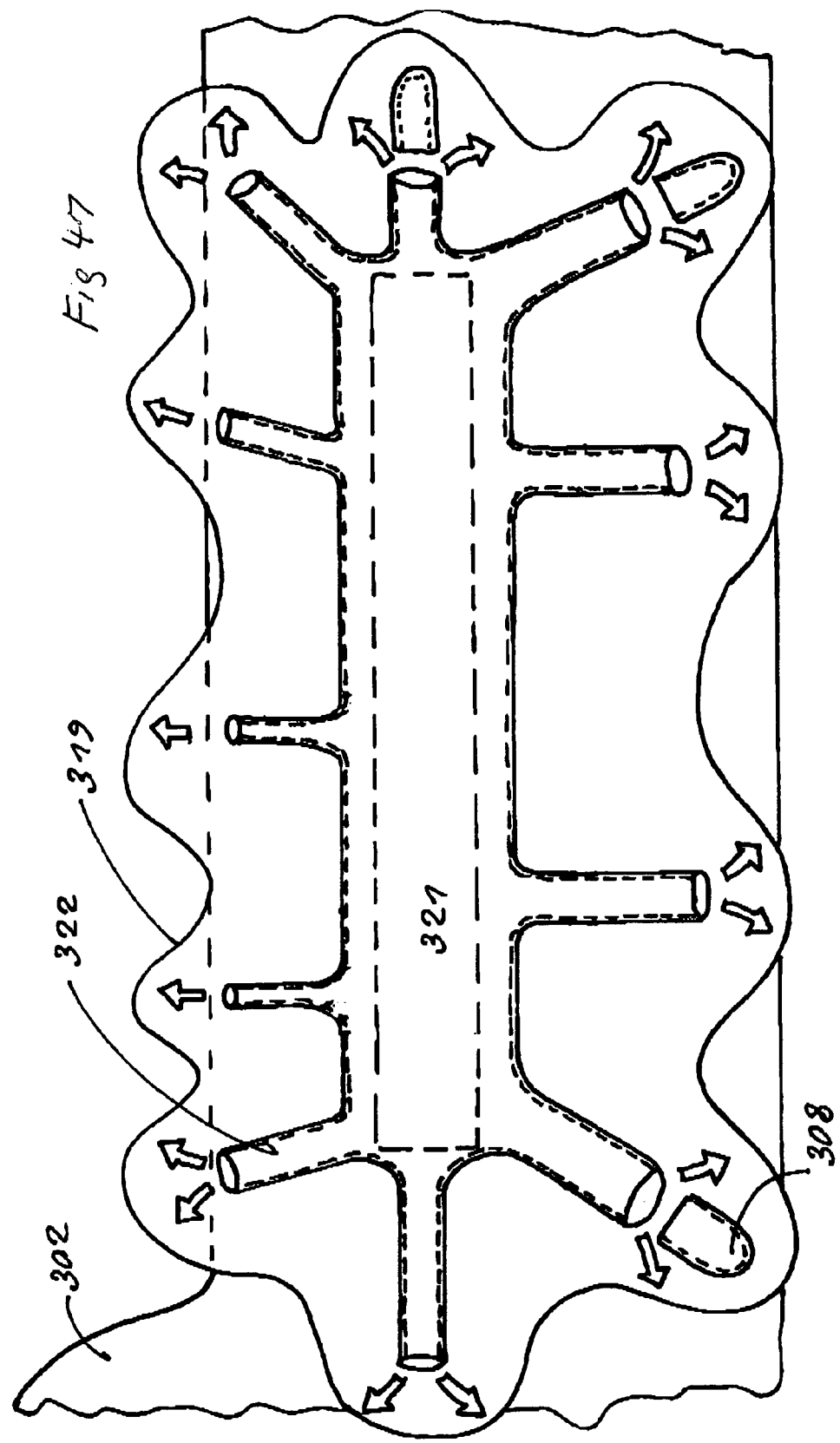
FIG. 47 shows a schematic "bird's view" of FIG. 46 of the lower bag at a later stage of deployment.

FIG. 47 shows further deployment of the guide bag 321 about half a millisecond later when the tilted in hoses 311 tilt out the hose sewing crack and the gas passes through. As an alternative or in some locations corks 308 are blown out as well. The lower bag 319 is now pulled to a large area and to the predetermined direction and now will be filled with gas in a not aggressive manner.

Figure 48:
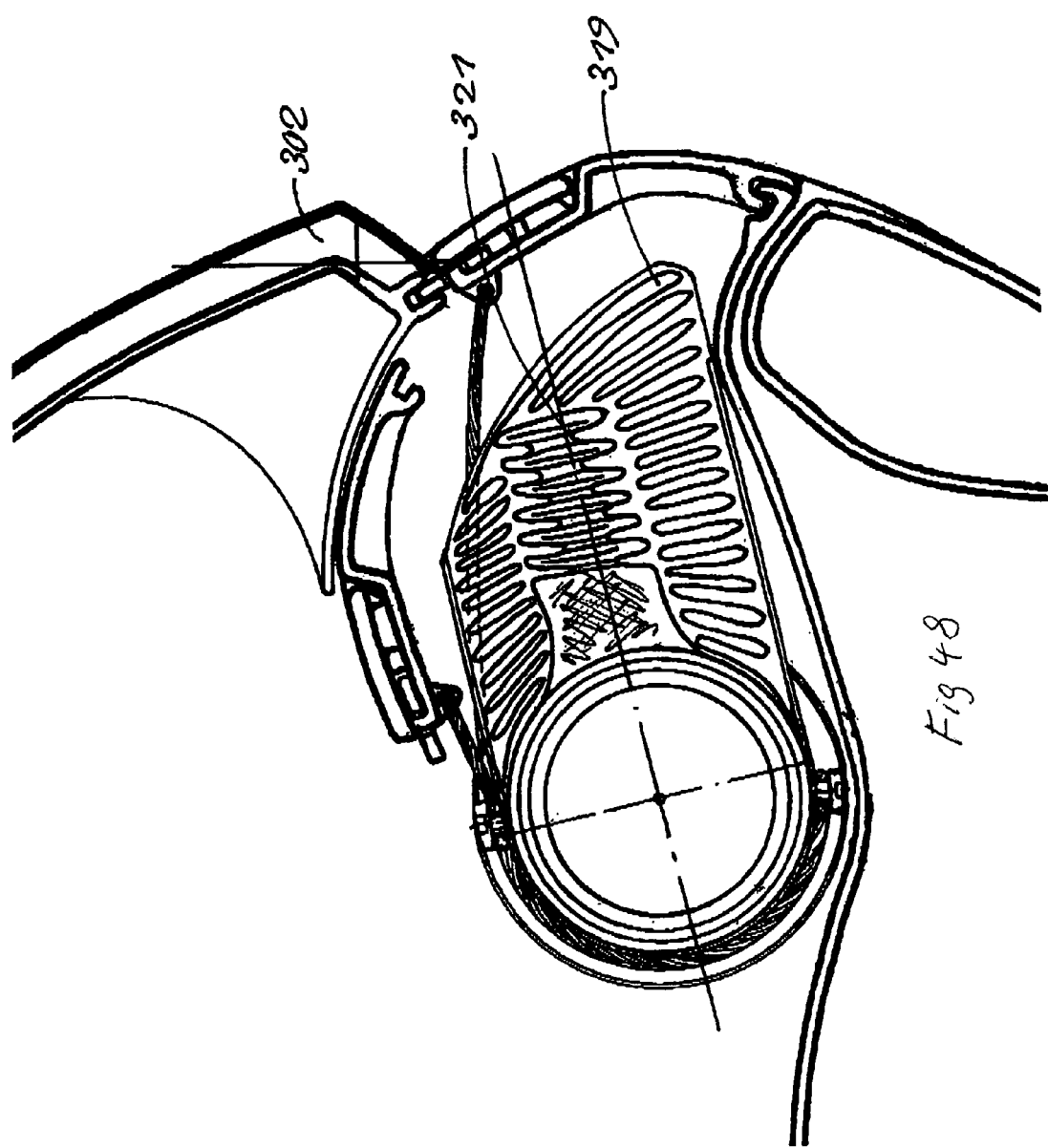
FIG. 48 shows the schematic section of a combination of the "active door" and the active defolding as a 20th embodiment before crash.

FIG. 48 shows a perpendicular section of a 20th embodiment: A lower airbag 319 is behind a molding 320. Here the molding 320 is pulled bag according the ACTIVE DOOR (same inventor and described in multiple patents). The sketch shows the lower airbag 319 with the folded guide bag 319.

Figure 49:
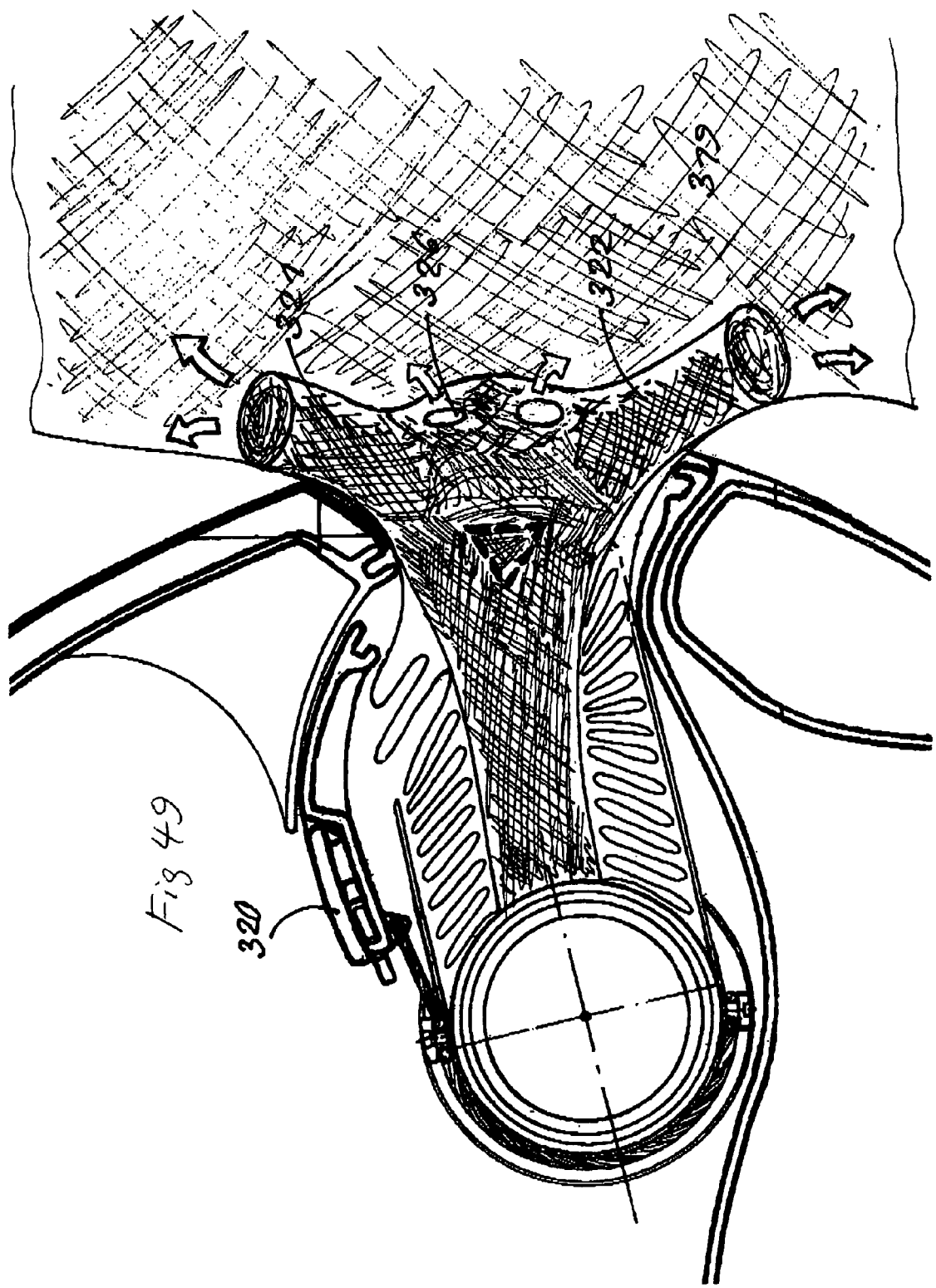
FIG. 49 shows FIG. 48 in an early crash stage.

FIG. 49 shows FIG. 48 in the crash situation. The guide bag 321 is deployed, the tilt in hoses 311 are tilted out. Additional holes 326 in the guide bag 321 let the gas distribute as wanted.

FIG. 50 and FIG. 51 show, as a 21st embodiment, how the gas pressure of a module 301 lifts a pressure plate 329. The folded in pressure tubes 330 elongate a blocking linkage 327 in guide slots 328 to let the linkage 327 move and block the upper location of the pressure plate 329. As an alternative a bulkhead (not shown) eliminates the gas flow into the guide bag before the pressure plate 329 is lifted up. The guide bag 321 is a mix between mattress and hoses 401 (FIG. 54).

FIGS. 52, 53 show a perpendicular section: FIG. 52 before crash and FIG. 53 during crash. The guide bag 321 deploys and opens the instrument panel shell 302. The hose sewing 322 tilt out, their sewing cracks and the gas flows into the final bag perpendicular to its normal move.

FIG. 55 shows a module 301 as a 22nd embodiment where ACTIVE DOOR and ACTIVE DEPLOYMENT are combined. The module 301 is fit together out of 2 aluminum extruded profiles 332. For the ACTIVE DEFOLDING a pressure chimney 333 with an added guide bag 321 is slid in. The pull out of the airbag 202 needs a small slot hole only. A "rolling" piston 334 moves the lid of the instrument panel into the module first. It is powered by the gas from the generator. In its final location it opens the through pass of the gas into the pressure chimney 333.

The following chapter deals with the ACTIVE DEPLOYMENT in roof airbags as a 23rd embodiment in accordance with FIGS. 56 to 62. Today's deployments show considerable difficulties. The airbags must push their trim covers away before they can escape. Thus the airbag achieves quicker in one corner than in the other. Where the easiest escape is, the bag will deploy to its full deployment and then move to the rest. It opens the roof trim like a zipper. Usually one bag moves from the front to the rear and vice versa. A predetermined opening at first where the head in a side crash is located, it seems to be not possible.

The ACTIVE DEFOLDING with a guide bag 401 (see following sketches in detail) solves this problem.

The folded in little guide bag deploys first during it pushes all roof trim away simultaneously, then the tilted in hoses and sewing will crack as predetermined and the final bag will deploy first where it is wanted in the area of the primary head impact. The guide bag moves the final protection bag to its deployment starting location.

Figure 56:
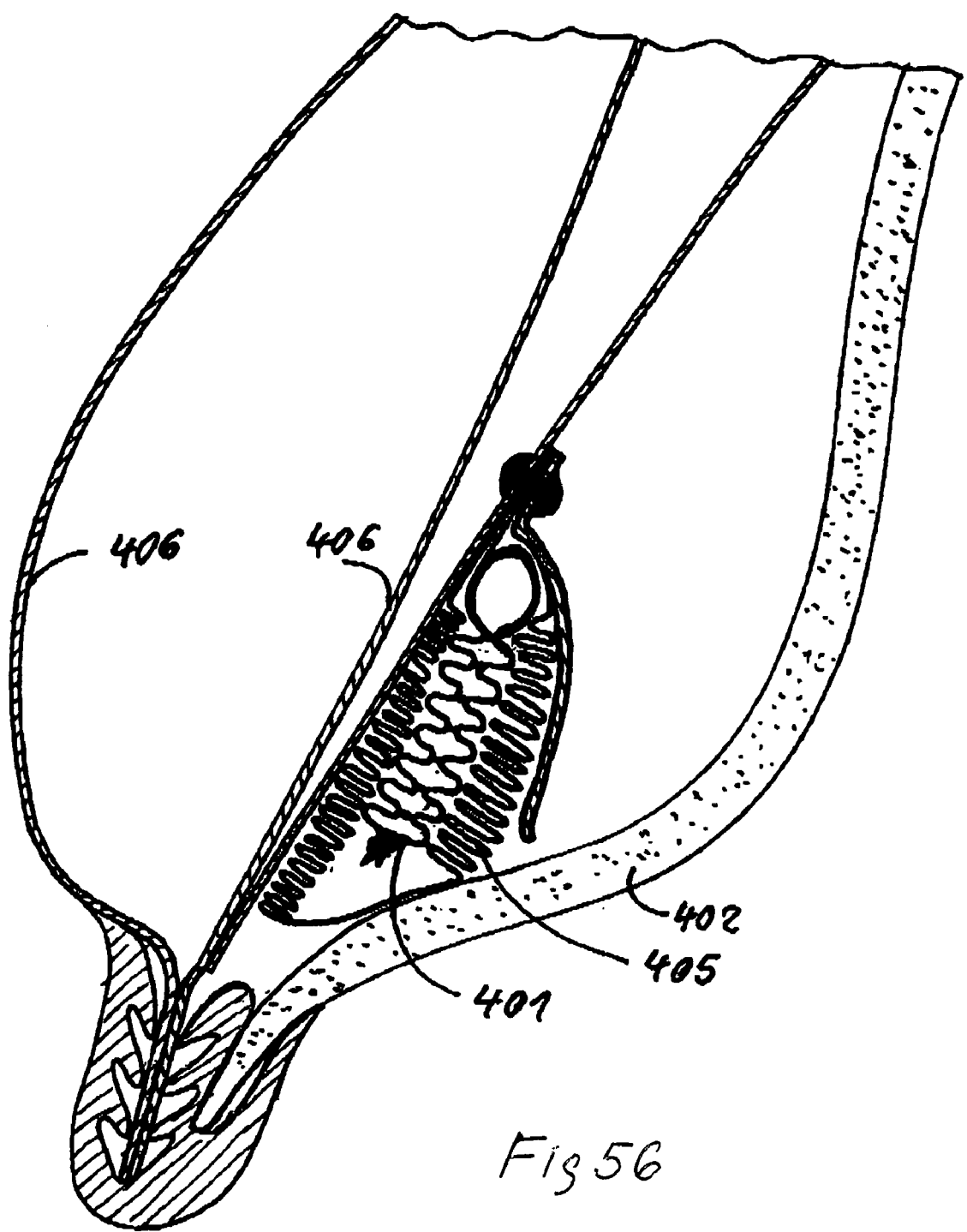
FIG. 56 shows a schematic section of a roof rail including an "active defolding" roof airbag before crash as a 23rd embodiment.

FIG. 56 shows as a section through the roof frame 406 and the mounting of the roof bag 405 with the included guide bag. It shows the situation before crash.

Figure 57:
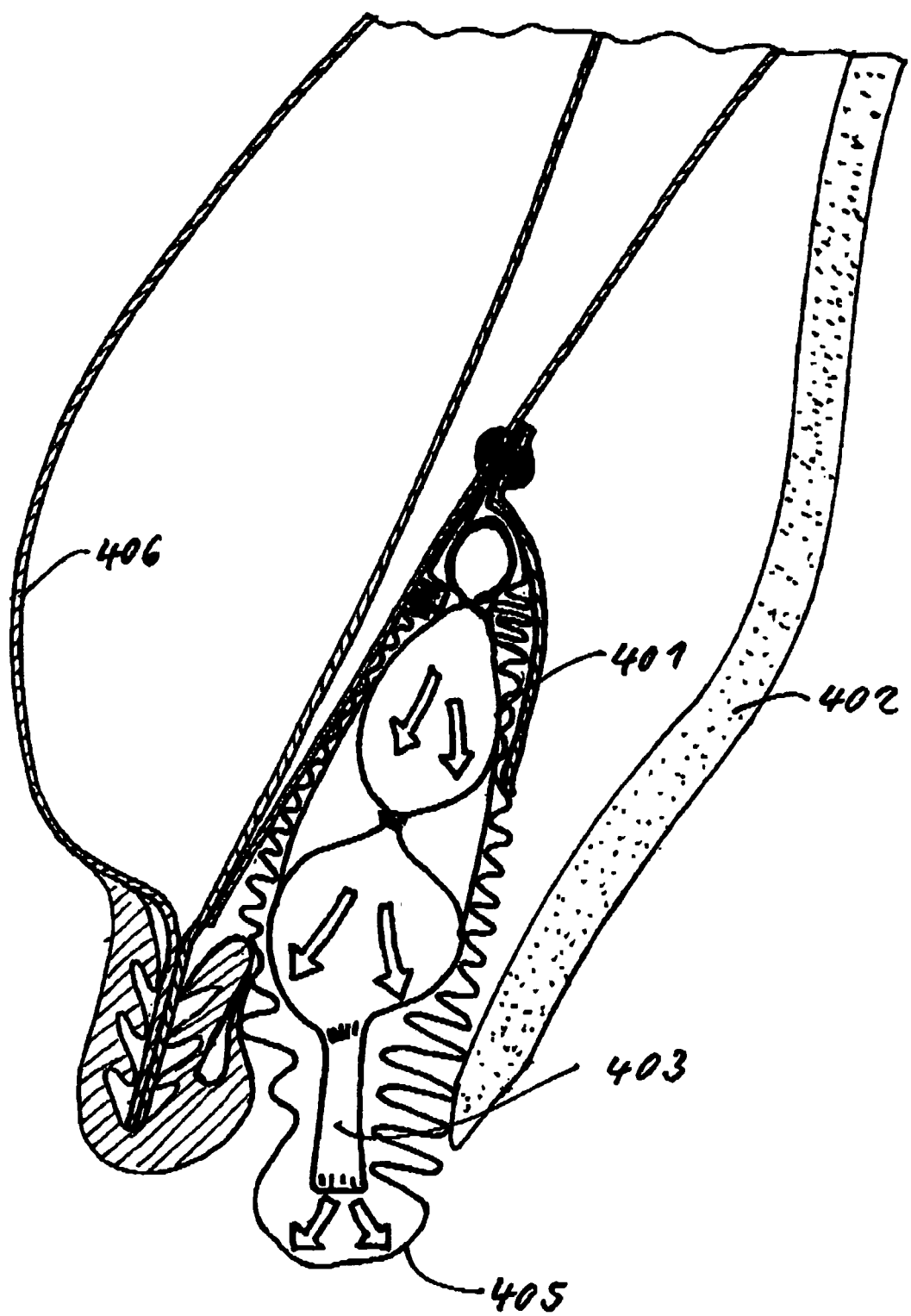
FIG. 57 shows an "active defolding" roof airbag of the 23rd embodiment (FIG. 56) in an early crash stage.

FIG. 57 shows the situation during the crash. The guide bag 401 which is built up between a mattress and a hose in its configuration blasts the formed headliner 408 or appropriate trim away. The tilting out of the hose segments 403 pushes the roof bag 405 into its starting location. The sewing of the hose segments 403 are tailored to break where the most critical head impact is inspected.

Figure 58:
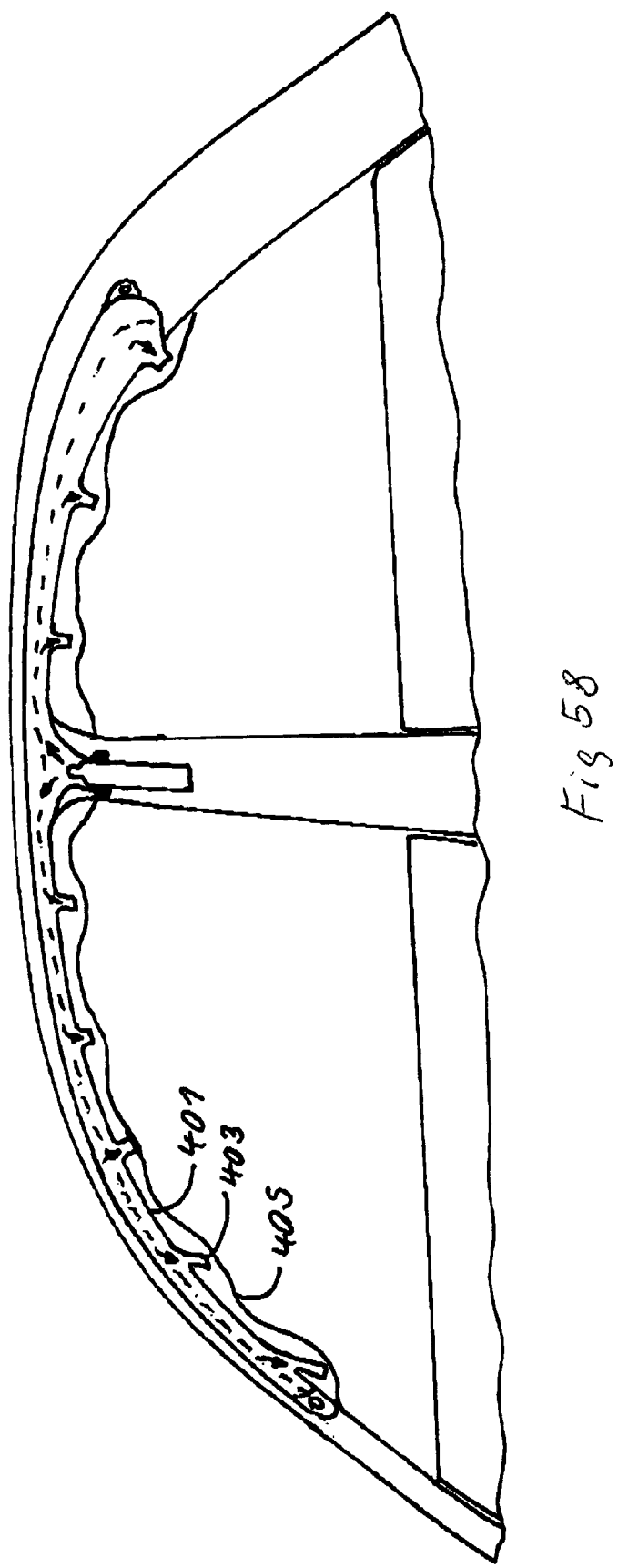
FIG. 58 shows the 23rd embodiment (FIGS. 56, 57) in a side view in a roof rail of a car in an early crash stage.

FIG. 58 shows the principal layout on the roof frame 406.

FIG. 59 shows the principal layout with an airbag between front and rear passengers. The airbag is mounted to the roof reinforcement. The guide bag 401 is very important to pre-open the pre-cut formed headliner 408 and tilt it out before the final roof bag 405 will deploy as predetermined.

FIG. 60 shows the storage of such a roof bag 405 underneath the formed headliner 408. The roof bag 405 is mounted to pre-tightened roof reinforcement 409. Latter could be a glued one piece with the formed headliner 408 and all items are to be pre-mounted including roof bag 405 as a module.

FIG. 61 shows the situation during crash. The guide bag 401 tilts the formed headliner 408 around to open the trim for the predetermined deployment of the transverse roof bag 405.

Figure 62:
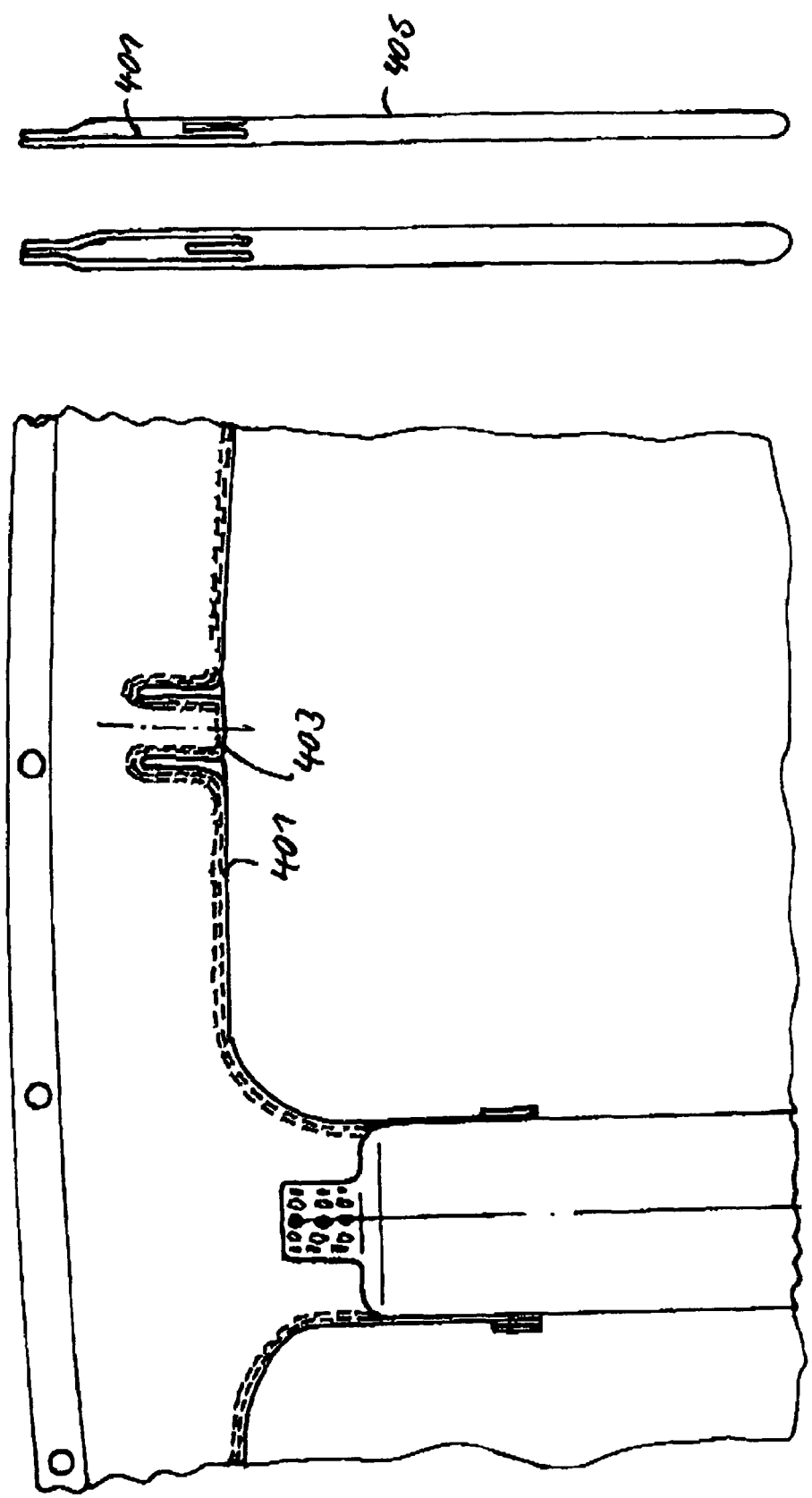
FIG. 62 shows as a detail the important section from FIG. 58.

FIG. 62 shows a section of the package of the side roof bag 405 with its included guide bag 401.

In relation with roof bags the following items are major important:

1. An included guide bag, folded inside the usual airbag.
2. A guide bag which is pressurized to open the formed headliner or the moldings or any other trim first.
3. A guide bag whose deployment or the deployment of its sewing, hoses, mattress sections etc. move the final roof bag into its starting location.
4. A guide bag tailored layout that the sewing crack at a predetermined pressure level at a predetermined location to protect on this place where it is important. As a result the gas escape is moved to the critical areas first.
5. Alternatively the gas opening can be located on the ends of the hose sewing.
6. These hose sewing can be tilted in normal use and tilted out at the beginning of the crash to move the roof bag by the power of its pressure.
7. Connections and seams and cracking areas are tailored, sewn, glued, welded or woven etc.
8. The guide bags may be on one or on two sides a part of the roof bag.
9. For the roof bag behind the formed headliner for a deployment between front and rear passengers it is necessary to pro-open the formed headliner with a guide bag. Otherwise the formed headliner could fall down completely during deployment.

One main advantage for roof bags it the predetermined opening of trim parts for an exact deployment start location.

Roof airbags are one example. All airbags which are somewhere underneath trim covers should use this technique for a qualified deployment in location deployment base (aggressiveness) and direction.

A further deployment: roof airbags out of a sunroof frame.

Today's sunroof frames usually are manufactured out of extruded aluminum profiles.

The invention modifies this aluminum extruded profiles 501/502 to include the roof bags 503/505 (see following sketches). Based an ACTIVE DEFOLDING experience it is necessary to pull the roof bag out of its housing (see following sketches) and remove the trim at first. This technique makes sure that the roof bags 503/505 are positioned first with a guide bag 506 (see following sketches) and by opening of their seam a predetermined gas intake on the location of most protection requirement.

Figure 63:
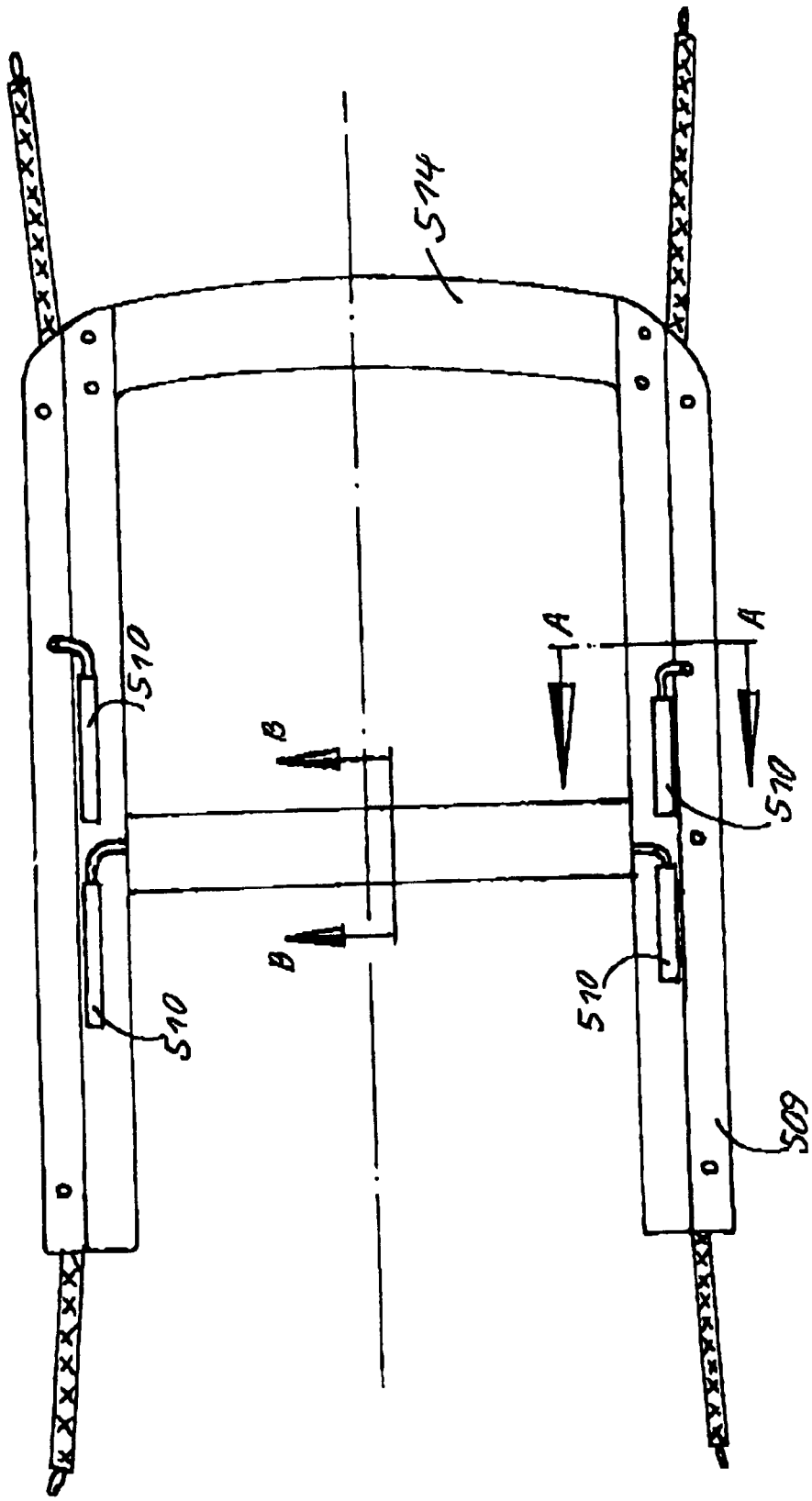
FIG. 63 shows a schematic section of a 24th embodiment of the "active defolding" roof bag housed in a sunroof frame.

FIG. 63 shows as a 24th embodiment such a sunroof frame 509. Gas generators 510 are pre-mounted and connected to gas channels 511.

Figure 64:
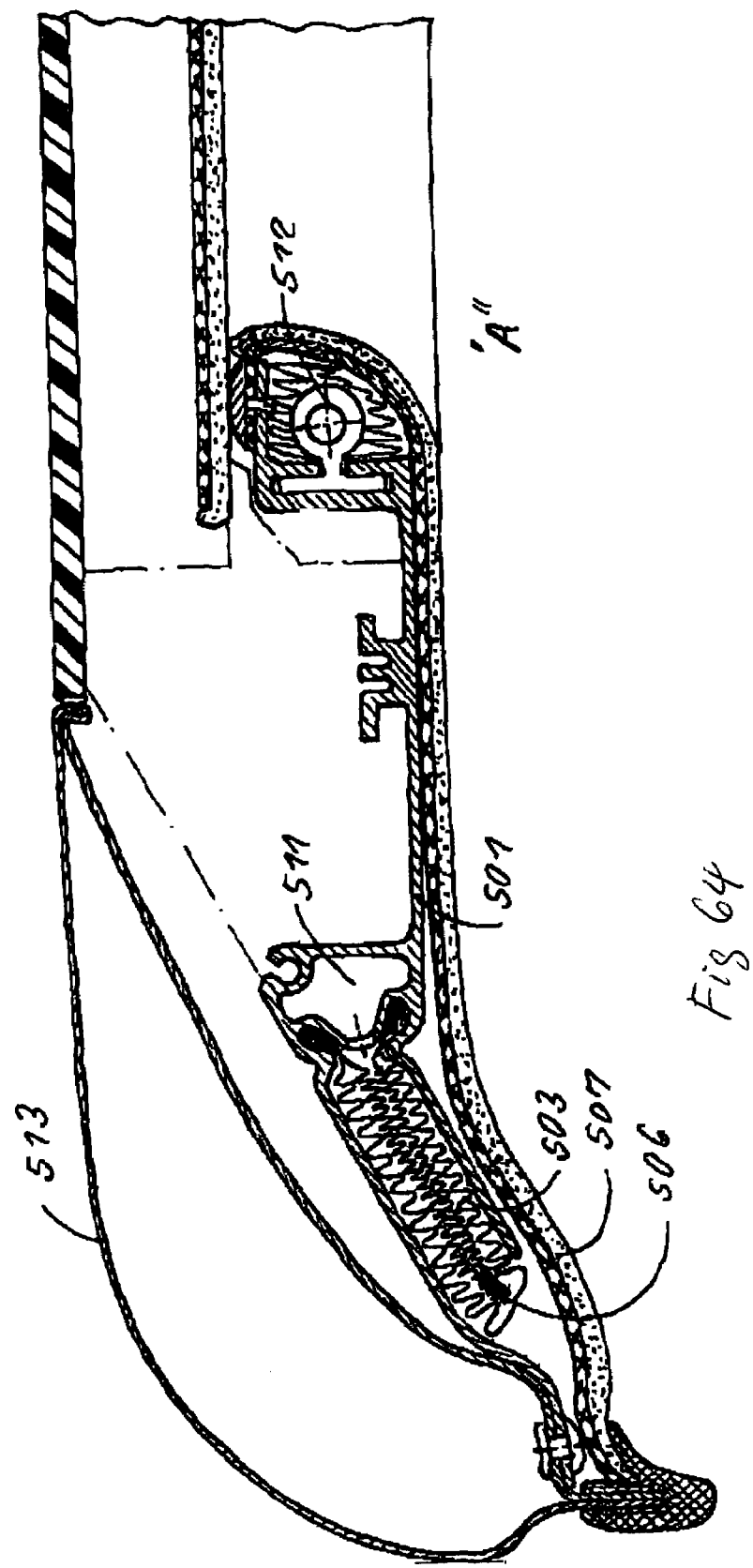
FIG. 64 shows a schematic section of the outer roof bags and the sunroof opening bag with active defolding before crash.

FIG. 64 shows the section "A" in FIG. 63 through the longitudinal aluminum extruded profile 501. The guide bag 506 and the roof bag on the roof frame 503 will mounted with their base into the appropriate openings of the aluminum profiles. Behind this are the gas channels 511 connected to the airbag by holes. The right side of the sketch shows the guide of the sunroof airbag which will close the sunroof opening in the event of a crash.

Figure 65:
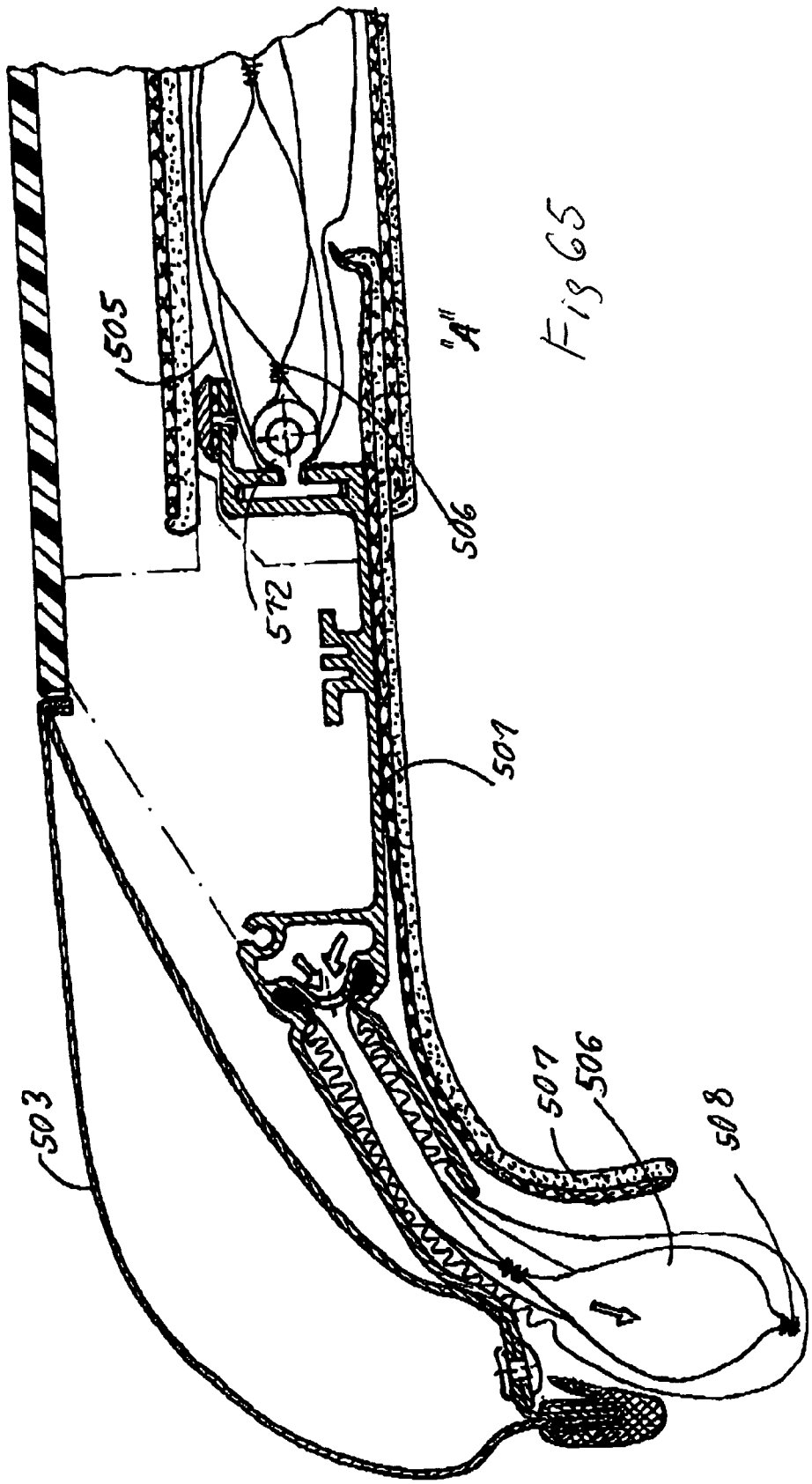
FIG. 65 shows a schematic section of the roof bags according to FIG. 64 during the early crash phase.

FIG. 65 shows the situation during crash. The guide bag 506 opens the trim 507, pulls the final roof airbag 503 out of the extruded profile 501, the sewing crack and the roof bag 503 is filled with gas on the most critical locations. Looking to the right side to the sunroof opening the trim is also tilted and the guide bag pulls the final bag. The guide bag pulls the sunroof bag in the guide 512 first before the final sunroof bag 505 deploys as protection. It is important to close the opening first by the guide bag. A deployed airbag will not move in guides.

FIG. 66 shows section "B" of the transversal aluminum extruded profile 502. As an alternative of housing the sunroof airbag inside the extruded profile front (not shown) the sunroof bag 505 is housed inside the transversal aluminum profile 502, FIG. 66). On the right side the roof bag between front and rear passengers 504 is located. In between are the gas channels 511 which are connected by holes or slots to the base opening of the airbags 502/504.

FIG. 67 shows the airbags 502/504 during the start of the crash situation (section "B"). As a favorite advantage of the last embodiment is the ideal use of the sunroof frame to house roof airbags. Also without the use of guide bags it should be an alternative to today's separate mounting.

The ACTIVE DEFOLDING is a quality improvement. It is a new technique for the more precise, directed, better distributed airbags. As a result, the airbags are much less aggressive.

As an alternative technique are shown to not destroy the instrument panel. This results in lower full insurance rates.

The embodiments are only examples for the shown technique. It is not possible to show all variants, modifications, substitutions and combinations.

The invention is based on a broad knowledge of airbag behavior and to many embodiments already tested positively.

Former patents from same inventor as they are roof airbags, airbags with active doors should be able to be combined for better safety with no OOP-risk.

SUMMARY

Non-aggressive and better protecting airbag system by:
pre-opening of the cover trim
perpendicular pre-deployment for a large deployment base advanced today's deployment
gas intake tailored to OOP and protection requirements
3 solution proposals for passenger bags
Don't destroy the instrument panel (better insurance rate)
solution for all around roof bags with and without sunroof detection measures
a considerable step to better protecting and less aggressive airbags.

LIST OF REFERENCE NUMERALS 1 module/housing
2 gas flow
3 gas channel
4 connection flange
5 hose cork
6 hose
7 specific folding
8 cover
9 airbag
10 gas travel
11 cartridge
12 piston for ACTIVE DOOR
13 instrument panel
14 ribbons
15 airbag textile
16 piston
17 cylinder
18 gas pressure chamber
19 telescope tube extension 20 cork
21 lock
22 unlock robe
23 flex joint
24 gas exit tube
25 split pin
26 gas exit opening
27 telescope gas guide tubes
28 guide tube
29 telescope tube
30 chimney
31 guide
32 travel limiter
33 opening
34 2nd chimney
35 gas exit
36 blocking pin
37 gas distribution mattress
38 gas chamber 1
39 gas chamber 2
40 gas chamber 3
41 sewing
43 supporting wall
44 guide
45 holes
46 telescoping chimney
47 cover
48 gas through passing holes
101 generator
102 airbag
103 air distribution grid
104 gas outlet
105 gas distributor
106 hose
107 bullet
108 instrument panel
109 airbag housing
110 airbag module
111 angular surface
112 air connection
113 connection
114 windshield
115 lines
116 blow out housing
117 cut rivet
118 slot
119 travel limiter
120 air duct
121 housing
122 air distribution slot
123 ribbons or cords
124 second generator stage
125 first generator stage
126 connecting tube
127 in between walls
128 perforated sheet metal
129 steel wool
130 ignition
131 steering wheel
132 sticking ribbon
133 beam
134 source
135 detection
202 airbag
203 instrument panel
204 channel
206 windshield defogging grid
207 defroster slot
209 blow out hoses
216 driver bag generator
217 bowl
218 hose connections
220 hoses
223 steering wheel
224 cover skin
225 joint lines
226 segments
228 driver bag
229 gas distributor
230 hose ends
231 two half of textile
239 gas channel
301 module
302 instrument panel shell
303 instrument panel cross member
304 defroster slot
305 seal
306 angular gas channel
307 telescope tube
308 cork/bullet
309 airbag
310 guide sheet metal
311 hoses
312 sewing
313 textile
314 generator
315 reinforcement
316 upper airbag
317 windshield
318 instrument panel surface
319 lower airbag
320 molding
321 guide bag
322 hose sewing
323 upper corner of the instrument panel
324 channel
325 piston valve
326 holes
327 blocking linkage
328 guide slot
329 pressure plate
330 pressure hoses
331 brackets
332 aluminum elements
333 pressure chimney
334 "rolling" piston
401 guide bag
402 trim
403 hose segments
405 roof bag
406 roof frame
407 hoses
408 formed headliner
409 roof
501 longitudinal aluminum profile
502 transversal aluminum profile
503 roof bag in the roof frame
504 roof bag between front and rear passengers
505 sunroof airbag
506 guide bag
507 trim
508 cutting seam
509 sunroof frame
510 generators 511 gas channel
512 guide
513 roof frame
514 extruded profile front

What is claimed is:

1. An airbag system comprising:
an airbag including textile material,
a gas generating device, and
deployment means operative to initiate deployment of the airbag in a predetermined direction and to a predetermined deployment base before a substantial amount of generated gas enters the airbag for inflation, said deployment means including,
at least one hose pointing in a predetermined direction, wherein said hose is closed by corks or sewings to build up pressure,
at least one projectile associated with said hose, and
means cooperative with said hose to advance said at least one projectile against said textile material in a direction substantially perpendicular to a direction towards a target occupant location.

2. The airbag system according to claim 1, wherein said predetermined direction is substantially perpendicular to a direction towards a target occupant location.

3. The airbag system according to claim 1, wherein said predetermined direction is substantially perpendicular to a direction towards a target occupant location, and wherein said means operative to initiate deployment are further operative to increase the size of the deployment base.

4. The airbag system according to claim 1, wherein said deployment base is increased to expand the area wherein a target occupant may safely be located, thereby decreasing a risk of injury, due to airbag deployment, to an out of position occupant.

5. The airbag system according to claim 1, wherein said means operative to initiate deployment of the airbag are further operative to open at least one cover before final airbag inflation.

6. The airbag system according to claim 5, wherein said at least one cover is opened in a predetermined direction to a predetermined location.

7. The airbag system according to claim 1, wherein said gas generating device produces a gas supply, and wherein said gas supply is in a predetermined location, substantially offset from the center of the airbag.

8. The airbag system according to claim 7, where the gas supply is perpendicular to a direction towards a target occupant location.

9. The airbag system according to claim 1, further comprising means cooperative with said gas generating device operative to release a first quantity of gas into the airbag at a first pressure, effective to open at least one cover, and after which releases a second quantity of gas into the airbag at a second pressure, effective to fully inflate the airbag.

10. The airbag system according to claim 1, wherein the textile material is folded, and wherein said means operative to initiate deployment are operative to unfold said textile material in a direction substantially perpendicular to a direction towards a target occupant location.

11. The airbag system according to claim 1, wherein said at least one hose is supplied with gas before the gas enters the airbag.

12. The airbag system according to claim 1, wherein said at least one hose is tilted up to the level of an outer instrument panel when the airbag system is a passenger airbag system.

13. The airbag system according to claim 12, wherein the at least one hose is lifted by internal pressure.

14. The airbag system according to claim 13, wherein the hose is lifted by pistons in cylinders driven by the gas pressure.

15. The airbag system according to claim 1, further including tubes equipped with joints to be able to tilt in the predetermined direction and to be bent down in case of a head impact.

16. The airbag system according to claim 15, wherein the tubes are telescope tubes to be elongated to pull the textile material to a predetermined location.

17. The airbag system according to claim 15, wherein the tubes are packaged and are elongated by telescope to move their ends to the upper surface of the instrument panel.

18. The airbag system according to claim 15, wherein the tubes are tilted by pistons in cylinders driven by gas pressure.

19. The airbag system according to claim 16, wherein telescopic movement of the tubes opens holes to let the gas pass into the textile material.

20. The airbag system according to claim 1, wherein a telescope chimney, hoses, or tubes are connected to lift up the system for a better pull angle, and move parallel to the surface of the instrument panel to lift the airbag.

21. The airbag system according to claim 1, wherein a predetermined portion of the generated gas enters directly into the airbag through pass holes.

22. The airbag systems according to claim 1, further comprising an airbag molding at least partially covering the airbag and a piston, the piston driven by gas pressure to open the molding.

23. The airbag system according to claim 1, wherein the deployment means is an integrated part of the airbag system.

24. The airbag system according to claim 1, wherein the deployment means has one or more gas pressure channels.

25. The airbag system according to claim 1, further comprising shaped guide sheets to guide the textile material very quickly and with low resistance.

26. The airbag system according to claim 1, wherein the at least one hose moves gas exhaust on outside on an outer surface of an instrument panel to avoid gas pressure and damage inside the instrument panel.

27. The airbag system according to claim 26, wherein the airbag and instrument panel are not damaged after a crash and the airbag can be reinstalled.

28. The airbag system according to claim 1, wherein said system is located in the defroster channel of the windshield.

29. The airbag system according to claim 28, wherein during normal use the air flow passes through or besides the airbag.

30. The airbag system according to claim 27, wherein a window defogging vent covers an airbag outlet.

31. The airbag system according to claim 27, wherein the airbag lifts moldings of the instrument panel without damage and deploys.

32. The airbag system according to claim 1, wherein during the first active deployment and subsequent opening of the gas flow, the textile material is pulled through its small slot.

33. The airbag system according to claim 1, wherein the at least one projectile moves the airbag from a multipurpose hole exit to a predetermined location.

34. The airbag system according to claim 1, wherein diameter and shape of the gas outlet is tailored to the requirement of the defroster channel size shape and location.

35. The airbag system according to claim 1, wherein the system is a passenger system including an upper and a lower airbag.

36. The airbag system according to claim 35, wherein the upper airbag moves out of the defroster channel.

37. The airbag system according to claim 35, wherein the upper airbag is top mounted in the instrument panel.

38. The airbag system according to claim 35, wherein the lower airbag deploys out of an outlet behind a styling molding and the cover is pulled into the instrument panel.

39. The airbag system according to claim 38, wherein the gas flow moves into a guide bag first, the guide bag deploys, the sewn hoses tilt out, and the final bag is pulled out to a fraction.

40. The airbag system according to claim 38, wherein the sewing of the tilted-out hose cracks and the gas flows perpendicular to an occupant into the final bag.

41. The airbag system according to claim 38, wherein the system with guide bag and gas flow is tailored so that the rear most corner of the instrument panel is protected by the upper part of the lower airbag.

42. The airbag system according to claim 41, wherein the lower part of the lower airbag protects the knees of an occupant.

43. The airbag system according to claim 35, wherein the upper and lower airbags are supplied by one gas generator connected by gas flow channels to the intakes.

44. The airbag system according to claim 43, wherein the gas flow behind the molding is first closed by a valve.

45. The airbag system according to claim 44, wherein a valve mechanic tilts the molding and opens the gas flow into the lower airbag.

46. The airbag system according to claim 1, wherein a detection against an out-of-position child seat location switches the airbag ignition off upon out-of-position detection.

47. The airbag system according claim 46, wherein the detection is a beam from a laser, an infrared light, an ultrasonic, or a magnetic field between a source and a receiver.

48. The airbag system according claim 47, wherein the beam is disturbed by out-of-position detection and an electronic circuit switches off the system.

49. The airbag system according to claim 1, wherein said system is a roof system including guide bags.

50. The airbag system according to claim 49, wherein the guide bags pre-open all trim before gas enters the main bag.

51. The airbag system according to claim 49, wherein the guide bags pull the main bag out of a packaged location into a pre-deployed condition before gas enters the main airbag.

52. The airbag system according claim 49, wherein the guide bags open gas flow into the main airbag at a pre-determined location.

53. The airbag system according to claim 49, wherein the guide bags pro-open between front and rear passengers and tilts a formed headliner section.

54. The airbag system according to claim 1, wherein said system is a roof system installed inside the extruded profiles of a sunroof frame.

55. The airbag system according to claim 54, wherein the airbags are all around the sunroof frame, the side bags, the bags between front and rear passenger, and the bag to close the sunroof opening.

56. The airbag system according to claim 54, wherein a base of the airbag is slid into position.

57. The airbag system according to claim 54, wherein gas channels between generator and intake are integrated in the extruded profiles and connected by holes, with the ends plugged.

58. The airbag system according to claim 54, wherein the sliding measures of the sunroof opening airbag are included in the extruded profiles.

59. The airbag system according to claim 54, wherein the sunroof opening airbag is located in the front of the extruded frame, in the rear of the extruded frame, or in both locations.

60. An airbag system according to claim 1, wherein said system is a defroster slot airbag system packaged in an instrument panel including pressure channel, telescope tubes, and folding out hoses, and is arranged for quick pull out.

61. The defroster slot airbag system according to claim 60, further including a telescope tube system to bring the gas exhaust outside the instrument panel and pull the airbag out.

62. An airbag system comprising:
an airbag including textile material,
a gas generating device, and
deployment means operative to initiate deployment of the airbag in a predetermined direction and to a predetermined deployment base before a substantial amount of generated gas enters the airbag for inflation, said deployment means including,
a guide bag covering the gas generating device and including sewn on hose segments for lifting of a cover covering the airbag and directing gas exhaust into the airbag,
at least one projectile operatively associated with said sewn on hose segments, and
means cooperative with said guide bag to advance said at least one projectile against said textile material in a direction substantially perpendicular to a direction towards a target occupant location.

63. The airbag system according to claim 62, wherein the sewn on hoses are tilt in during normal use and tilt out during crash elongating and moving to lift the cover and move out the airbag.

64. The airbag system according to claim 62, wherein the sewn on hoses are reinforced, thereby preventing folding of the airbag during pressurizing.

65. The airbag system according to claim 62, further comprising blocking pins to keep the hoses outside of an instrument panel during gas flow.

66. The airbag system according to claim 62, wherein the guide bag opens an integrated lid to let the airbag move out with low aggressiveness.

67. The airbag system according to claim 66, wherein the guide bag tilts the tilted in sewing section hoses to the outside and thereby moves the airbag to a larger deployment base in a direction perpendicular to the direction towards the target occupant location.

68. The airbag system according to claim 66, wherein sewing on the end of the section hoses cracks and the gas flows into an outer periphery of the airbag.

69. The airbag system according to claim 66, wherein the guide bag is mounted on a pressure plate which is lifted up by gas pressure by pistons or pressure in gas supply tubes.

70. The airbag system according to claim 69, wherein the pressure plate only can move towards an instrument panel shell.

71. The airbag system according to claim 62, further comprising an airbag molding at least partially covering the airbag and a piston, the piston driven by gas pressure to open the molding.

72. The airbag system according to claim 71, wherein the airbag molding is built up by two extruded profiles with connecting walls on the side.

73. The airbag system according claim 72, wherein the piston is a rolling piston and between the extruded profiles said rolling piston can move.

74. The airbag system according to claim 73, wherein the rolling piston is tooth-rod guided along a tooth segment to only roll straight and parallel to the profiles.

75. The airbag system according to claim 73, wherein the rolling piston is driven by gas, rolling up to allow gas to enter into a gas pressure chimney.

76. The airbag system according to claim 73, wherein the rolling piston pulls two ribbons connected to the moldings thereby opening the molding.

77. The airbag system according to claim 75, wherein the gas pressure chimney is equipped with a guide bag or gas pressure hoses.

78. An airbag system, wherein said system is a roof system equipped with a guide bag system as described in claim 62.

79. The airbag system according to claim 78, wherein the final airbag system is housed inside the extruded profiles.

80. The airbag system according to claim 78, wherein the guide bags pre-open all trim before gas enters the main bag.

81. An airbag system comprising:
an airbag including textile material,
a gas generating device, and
deployment means operative to initiate deployment of the airbag in a predetermined direction and to a predetermined deployment base before a substantial amount of generated gas enters the airbag for inflation, said deployment means including,
at least one hose pointing in a predetermined direction, wherein said hose is opened by exceeding a predetermined gas pressure level after the deployment means has initiated deployment of the airbag,
at least one projectile associated with said hose, and
means cooperative with said hose to advance said at least one projectile against said textile material in a direction substantially perpendicular to a direction towards a target occupant location.

82. An airbag system comprising:
an airbag including textile material,
a gas generating device, and
deployment means operative to initiate deployment of the airbag in a predetermined direction and to a predetermined deployment base before a substantial amount of generated gas enters the airbag for inflation, said deployment means including,
at least one hose pointing in a predetermined direction, wherein said hose is closed by sewing and tilted inwards,
at least one projectile associated with said hose, and
means cooperative with said hose to advance said at least one projectile against said textile material in a direction substantially perpendicular to a direction towards a target occupant location.

83. The airbag system according to claim 82, wherein the at least one hose is elongated by tilting out by the gas pressure and pulling the textile material sideways.

84. The airbag system according to claim 82, wherein the sewing of the hose cracks after the gas has reached a predetermined pressure level and the gas flows lateral in a transverse direction into the airbag.

85. An airbag system comprising:
an airbag including textile material,
a gas generating device, and
deployment means operative to initiate deployment of the airbag in a predetermined direction and to a predetermined deployment base before a substantial amount of generated gas enters the airbag for inflation, said deployment means including,
at least one hose pointing in a predetermined direction,
at least one projectile associated with said hose, wherein a release pin blocks advancement of said projectile prior to said hose reaching a predetermined starting location, and
means cooperative with said hose to advance said at least one projectile against said textile material in a direction substantially perpendicular to a direction towards a target occupant location.

86. The airbag system according to claim 85, wherein the release pin is travel controlled.

87. An airbag system comprising:
an airbag including textile material,
a gas generating device, and
deployment means operative to initiate deployment of the airbag in a predetermined direction and to a predetermined deployment base before a substantial amount of generated gas enters the airbag for inflation, said deployment means including,
a plurality of cells configured and arranged like an air mattress,
at least one hose pointing in a predetermined direction,
at least one projectile associated with said hose, and
means cooperative with said hose to advance said at least one projectile against said textile material in a direction substantially perpendicular to a direction towards a target occupant location.

88. The airbag system according to claim 87, wherein the plurality of cells is connected directly to the gas pressure.

89. The airbag system according to claim 87, wherein the plurality of cells blow up, moving the airbag in the predetermined direction.

90. The airbag system according to claim 87, wherein sewing or gluing between cells of the plurality of cells cracks at a predetermined pressure.

91. The tag airbag system according to claim 87, wherein separate cells of the plurality of cells are built up in line substantially perpendicular to a direction towards a target occupant location.

92. The airbag system according to claim 87, wherein the plurality of cells by different length of the upper and lower layer is moved around a corner to pull in a transverse direction.

93. The airbag system according to claim 87, wherein the plurality of cells are mounted in the periphery of the system to pressure chimneys.

94. The airbag system according to claim 93, wherein the pressure chimney is located in the middle of the system.

95. The airbag system according to claim 93, wherein the pressure chimney is capable of telescopic movement during pressurizing.

* * * * *